United States Patent
Babaei

(10) Patent No.: US 11,419,093 B2
(45) Date of Patent: Aug. 16, 2022

(54) WIRELESS DEVICE AND WIRELESS NETWORK PROCESSES FOR PAGING ENHANCEMENT

(71) Applicant: Alireza Babaei, Fairfax, VA (US)

(72) Inventor: Alireza Babaei, Fairfax, VA (US)

(73) Assignee: PanPsy Technologies, LLC, Fairfax, VA (US)

( * ) Notice: Subject to any disclaimer, the term of this patent is extended or adjusted under 35 U.S.C. 154(b) by 0 days.

(21) Appl. No.: 17/502,989

(22) Filed: Oct. 15, 2021

(65) Prior Publication Data
US 2022/0124674 A1 Apr. 21, 2022

Related U.S. Application Data

(60) Provisional application No. 63/092,431, filed on Oct. 15, 2020.

(51) Int. Cl.
*H04W 68/02* (2009.01)
*H04W 72/12* (2009.01)
*H04W 76/28* (2018.01)

(52) U.S. Cl.
CPC ....... *H04W 68/02* (2013.01); *H04W 72/1289* (2013.01); *H04W 76/28* (2018.02)

(58) Field of Classification Search
CPC .. H04W 68/02; H04W 72/1289; H04W 76/28
USPC ........................................................ 370/328
See application file for complete search history.

(56) References Cited

U.S. PATENT DOCUMENTS

2012/0122495 A1 * 5/2012 Weng .................. H04W 68/025
455/458

FOREIGN PATENT DOCUMENTS

| CA | 2750554 A1 * | 5/2012 | .......... H04W 68/025 |
| EP | 3005793 B1 * | 11/2020 | ....... H04N 21/26208 |
| WO | WO-2017076624 A1 * | 5/2017 | ............ H04W 68/02 |
| WO | WO-2019160496 A1 * | 8/2019 | ........ H04W 52/0229 |
| WO | WO-2020206458 A1 * | 10/2020 | ........ H04W 52/0229 |
| WO | WO-2021018531 A1 * | 2/2021 | ............ H04W 68/02 |

OTHER PUBLICATIONS

3GPP TS 38.211 V16.3.0 (Sep. 2020); Technical Specification; 3rd Generation Partnership Project; Technical Specification Group Radio Access Network; NR; Physical channels and modulation; (Release 16).
3GPP TS 38.212 V16.3.0 (Sep. 2020); Technical Specification; 3rd Generation Partnership Project; Technical Specification Group Radio Access Network; NR; Multiplexing and channel coding; (Release 16).

(Continued)

*Primary Examiner* — Peter G Solinsky
(74) *Attorney, Agent, or Firm* — Alireza Babaei

(57) ABSTRACT

A wireless device may receive system information comprising a parameter indicating a number of paging sub-groups. The wireless device may determine that the wireless device is associated with a first paging sub-group based on the number and a wireless device identifier. The wireless device may receive a DCI indicating first paging sub-group(s) for a paging occasion. The wireless device may monitor a control channel in the paging occasion in response to the first paging sub-group(s) comprising the first paging sub-group. The wireless device may receive paging information.

29 Claims, 36 Drawing Sheets

(56) References Cited

OTHER PUBLICATIONS

3GPP TS 38.213 V16.3.0 (Sep. 2020); Technical Specification; 3rd Generation Partnership Project; Technical Specification Group Radio Access Network; NR; Physical layer procedures for control; (Release 16).
3GPP TS 38.214 V16.3.0 (Sep. 2020); Technical Specification; 3rd Generation Partnership Project; Technical Specification Group Radio Access Network; NR; Physical layer procedures for data; (Release 16).
3GPP TS 38.300 V16.3.0 (Sep. 2020); Technical Specification; 3rd Generation Partnership Project; Technical Specification Group Radio Access Network; NR; NR and NG-RAN Overall Description; Stage 2; (Release 16).
3GPP TS 38.321 V16.1.0 (Jul. 2020); Technical Specification; 3rd Generation Partnership Project; Technical Specification Group Radio Access Network; NR; Medium Access Control (MAC) protocol specification; (Release 16).
3GPP TS 38.331 V16.2.0 (Sep. 2020); Technical Specification; 3rd Generation Partnership Project; Technical Specification Group Radio Access Network; NR; Radio Resource Control (RRC); Protocol specification; (Release 16).
3GPP TSG RAN WG1 Meeting #102-e; R1-2005262; E-meeting, Aug. 17-28, 2020; Agenda Item: 8.7.1.1; Source: Huawei, HiSilicon; Title: Paging enhancement(s) for UE power saving in IDLE/inactive mode; Document for: Discussion and Decision.
3GPP TSG RAN WG1#102-e; R1-2005388; e-Meeting, Aug. 17-28, 2020; Source: vivo; Title: Discussion on paging enhancements for idle/inactive mode UE power saving; Agenda Item: 8.7.1.1; Document for: Discussion and Decision.
3GPP TSG RAN WG1 #102-e; R1-2005520; e-Meeting, Aug. 17-28, 2020; Title: Discussion on power saving enhancements for paging; Source: ZTE; Agenda Item: 8 7.1.1; Document for: Discussion and Decision.
3GPP TSG RAN WG1 #102e; R1-2005582; e-Meeting, Aug. 17-Aug. 28, 2020; Source: Sony; Title: Considerations on paging enhancements; Agenda Item: 8.7.1.1; Document for: Discussion.
3GPP TSG RAN WG1 #102-e; R1-2005615; e-Meeting, Aug. 17-28, 2020; Agenda Item: 8.7.1.1; Source: MediaTek Inc.; Title: Evaluation methodology and paging enhancements for idle/inactive mode UE power saving; Document for: Discussion and Decision.
3GPP TSG RAN WG1 #102e; R1- 2005719; e-Meeting, Aug. 17-28, 2020; Source: CATT; Title: Paging enhancement for UE power saving; Agenda Item: 8.7.1.1; Document for: Discussion and Decision.
3GPP TSG RAN WG1 #102; R1-2005738; e-Meeting, Aug. 17-28, 2020; Agenda item: 8.7.1.1; Source: Xiaomi; Title: Paging enhancements for power saving; Document for: Discussion.
3GPP TSG RAN WG1 Meeting #102-E; R1-2005884; e-Meeting, Aug. 17-28, 2020; Source: Intel Corporation; Title: On paging enhancements for UE power saving; Agenda item: 8 7.1.1; Document for: Discussion and Decision.
3GPP TSG RAN WG1 Meeting #102-e; R1-2005935; e-Meeting, Aug. 17-28, 2020; Agenda item: 8.7.1.1; Source: Lenovo, Motorola Mobility; Title: Power efficient paging; Document for: Discussion and Decision.
3GPP TSG RAN WG1 #102-e; R1-2006041; e-Meeting, Aug. 17-28, 2020; Source: OPPO; Title: Paging enhancements for power saving; Agenda Item: 8.7.1.1; Document for: Discussion.
3GPP TSG RAN WG1 #102; R1-2006159; e-Meeting, Aug. 17-Jun. 28, 2020; Agenda Item: 8.7.1.1; Source: Samsung; Title: On potential paging enhancements; Document for: Discussion and decision.
3GPP TSG RAN WG1 #102-e; R1-2006221; e-Meeting, Aug. 17-28, 2020; Source: CMCC; Title: Discussion on paging enhancement; Agenda item: 8.7.1.1; Document for: Discussion & Decision.
3GPP TSG RAN WG1 Meeting #102; R1-2006291; e-Meeting, Aug. 17-Aug. 28, 2020; Agenda Item: 8.7.1.1; Source: Spreadtrum Communications; Title: Discussion on potential paging enhancements; Document for: Discussion and decision.

3GPP TSG RAN WG1 #102-e; R1-2006311; e-Meeting, Aug. 17-28, 2020; Agenda Item: 8.7.1.1; Source: LG Electronics; Title: Discussion on potential paging enhancements; Document for: Discussion and decision.
3GPP TSG-RAN WG1 #102-e; R1-2006385; e-Meeting, Aug. 17-28, 2020; Agenda Item: 8.7.1.1; Source: Panasonic; Title: Potential paging enhancements for idle/inactive-mode UE power saving; Document for: Discussion/Decision.
3GPP TSG RAN WG1 #102-e; R1-2006527; e-Meeting, Aug. 17-28, 2020; Agenda Item: 8.7.1.1; Source: Apple Inc.; Title: Potential paging enhancements for idle/inactive-mode UE power saving; Document for: Discussion/Decision.
3GPP TSG RAN WG1 #102-e; R1-2006544; e-Meeting, Aug. 17-Aug. 28, 2020; Agenda Item: 8.7.1.1; Source: InterDigital, Inc.; Title: Paging enhancements for UE power saving; Document for: Discussion.
3GPP TSG RAN WG1 #102-e; Tdoc R1-2006665; e-Meeting, Aug. 17-Aug. 28, 2020; Agenda Item: 8.7.1.1; Source: Ericsson; Title: Discussion on potential paging enhancements for UE power savings; Document for: Discussion and Decision.
3GPP TSG RAN WG1 #102-e; R1-2006736; e-Meeting, Aug. 17-28, 2020; Source: NTT DOCOMO, Inc.; Title: Discussion on paging enhancements; Agenda Item: 8 7.1.1; Document for: Discussion and Decision.
3GPP TSG-RAN WG1 #102-e; R1-2006815; e-Meeting, Aug. 17-Aug. 28, 2020; Agenda item: 8.7.1.1; Source: Qualcomm Incorporated; Title: Paging enhancements and evaluation methodology; Document for: Discussion/Decision.
3GPP TSG RAN WG1 #102-e; R1-2006896; e-Meeting, Aug. 17-28, 2020; Agenda item: 8.7.1.1; Source: Nokia, Nokia Shanghai Bell; Title: On paging enhancements for UE power saving; Document for: Discussion and Decision.
3GPP TSG-RAN WG2 Meeting #111 e; R2-2006608; Online, Aug. 17-28, 2020; Agenda item: 8.9.2; Source: Qualcomm Inc; Title: Power saving enhancements for paging reception; WID/SID: NR_UE_pow_sav_enh-Core; Document for: Discussion and Decision.
3GPP TSG-RAN WG2 #111-e; R2-2006654; Online meeting, Aug. 17-28, 2020; Title: UE power saving for paging procedures; Source: ETRI; Agenda item: 8.9.2; Document for: Discussion.
3GPP TSG-RAN WG2 Meeting #111-e; R2-2006689; Electronic, Aug. 17-Aug. 28, 2020; Source: vivo; Title: Coordination between RAN1 and RAN2 for paging enhancement; Agenda Item: 7.9.2; Document for: Discussion and Decision.
3GPP TSG-RAN WG2 Meeting #111-e; R2-2006690; E-Meeting, Aug. 17-Aug. 28, 2020; Source: vivo; Title: Paging enhancement in idle/inactive mode for power saving; Agenda Item: 8.9.2; Document for: Discussion and Decision.
3GPP TSG RAN WG2 Meeting #111-e; R2-2006720; Electronic meeting, Aug. 17-28, 2020; Agenda item: 8.9.2; Source: Intel Corporation; Title: Paging enhancements to reduce UE power consumption; Document for: Discussion and decision.
3GPP TSG-RAN WG2 Meeting #111 electronic; R2-2006729; Online, Aug. 17-28, 2020; Agenda Item: 8.9.2; Source: Xiaomi Communications; Title: Discussion on UE Power saving for RRC-IDLE/RRC-INACTIVE State; Document for: Discussion and Decision.
3GPP TSG-RAN2 Meeting #111 Electronic; R2-2006774; Aug. 17-Aug. 28, 2020; Agenda item: 8.9.2; Source: Samsung; Title: Paging Enhancements to Reduce Unnecessary Paging receptions; Document for: Discussion & Decision.
3GPP TSG-RAN2 Meeting #111 Electronic; R2-2006775; Aug. 17-Aug. 28, 2020; Agenda item: 8.9.2; Source: Samsung; Title: Power Consumption by UE in RRC IDLE/INACTIVE; Document for: Discussion & Decision.
3GPP TSG-RAN WG2 Meeting #111 electronic; R2-2006790; Online, Aug. 17-28, 2020; Agenda Item: 8.9.2; Source: OPPO; Title: Paging enhancement for power saving; Document for: Discussion, Decision.
3GPP TSG-RAN WG2 Meeting#111; R2-2006874; Electronic, Aug. 17-28, 2020; Source: ZTE Corporation, Sanechips; Title: Solutions to reduce unnecessary paging reception; Agenda item: 8.9.2; Document for: Discussion and Decision.

(56) References Cited

OTHER PUBLICATIONS

3GPP TSG-RAN WG2 Meeting #111 electronic; R2-2006990; Online, Aug. 17-28, 2020; Source: CATT; Title: Considerations on Paging Enhancements for Power Saving; Agenda Item: 8.9.2; Document for: Discussion and Decision.

3GPP TSG-RAN WG2 Meeting #111-e; R2-2007115; Electronic, Aug. 17-Aug. 28, 2020; Agenda Item: [8.9.2] [UE Power Saving in NR]; Source: Apple Inc; Title: False Paging Mitigation; Document for: Discussion and Decision.

3GPP TSG-RAN WG2 Meeting #111-e; R2-2007116; Electronic, Aug. 17-Aug. 28, 2020; Agenda Item: [8.9.2] [UE PowerSaving in NR]; Source: Apple Inc; Title: Wakeup and Paging Reception; Document for: Discussion and Decision.

3GPP TSG-RAN WG2 Meeting #111 e; R2-2007182; Electronic, Aug. 17-28, 2020; Agenda item: 8.9.2; Source: Sony; Title: Discussion on reduction of unnecessary UE paging receptions; Document for: Discussion.

3GPP TSG-RAN WG2 Meeting #111 electronic; R2-2007190; Online, Aug. 17-28, 2020; Agenda Item: 8.9.2; Source: MediaTek Inc.; Title: Paging Enhancements for UE PowerSaving in NR; Document for: Discussion and decision.

3GPP TSG RAN WG2#111 electronic; R2-2007249; Online, Aug. 17-28, 2020; Agenda Item: 8.9.2; Source: ITRI; Title: Discussion on the UE grouping based solution for idle/inactive-mode UE power saving; Document for: Discussion.

3GPP TSG-RAN2 Meeting #111-e; R2-2007260; eMeeting, Aug. 17-28, 2020; Agenda Item: 8.9.2 Idle/Inactive-mode UE power saving; Source: Ericsson; Title: Paging enhancement to reduce unnecessary UE paging receptions Document for: Discussion and Decision.

3GPP TSG-RAN WG2 Meeting #111 electronic; R2-2007437; Online, Aug. 17-28, 2020; Agenda item: 8.9.2; Source: CMCC; Title: Paging enhancement for idle inactive-mode UE power saving; Document for: Discussion, Decision.

3GPP TSG-RAN WG2 Meeting #111 electronic; R2-2007441; Online, Aug. 17-28, 2020; Agenda Item: 8.9.2; Source: Huawei, HiSilicon; Title: Discussion on paging enhancements; Document for: Discussion and decision.

3GPP TSG-RAN WG2 Meeting RAN2#111 electronic; R2-2007468; Online, Aug. 17-28, 2020; Agenda item: 8.9.2; Source: Lenovo, Motorola Mobility; Title: Consideration on Idle/inactive-mode UE power saving; Document for: Discussion and Decision.

3GPP TSG-RAN WG2 Meeting #111 Electronic; R2-2007563; Elbonia, Aug. 17-28, 2020; Agenda item: 8.9.2; Source: Nokia, Nokia Shanghai Bell; Title: IDLE / INACTIVE mode UE power saving; WID/SID: NR_UE_pow_sav_enh-Core—Release 17; Document for: Discussion and Decision.

3GPP TSG-RAN WG2 Meeting #111 electronic; R2-2007990; Online, Aug. 17-28, 2020; Agenda item: 8.9.2; Source LG Electronics Inc; Title Paging enhancement for power saving; Document for Discussion and Decision.

* cited by examiner

```
RRCRelease ::=
    ...
    NrOfPagingGroups     INTEGER (1..maxNrofPagingGroups)
    ...
```

FIG. 16

```
RRCRelease ::=
   ...
   PagingGroupID     INTEGER (0..maxNrofPagingGroups-1)
   ...
```

FIG. 17

```
DownlinkConfigCommonSIB ::=      SEQUENCE {
    pcch-Config                          PCCH-Config,
    ...
}
...
PCCH-Config ::=         SEQUENCE {
    defaultPagingCycle              PagingCycle,
    nAndPagingFrameOffset           CHOICE {
        oneT                            NULL,
        halfT                           INTEGER (0..1),
        quarterT                        INTEGER (0..3),
        oneEighthT                      INTEGER (0..7),
        oneSixteenthT                   INTEGER (0..15)
    },
    ns                              ENUMERATED {four, two, one},
    firstPDCCH-MonitoringOccasionOfPO
    nrofPDCCH-MonitoringOccasionPerSSB-InPO-r16     INTEGER (2..4)
    NrOfPagingGroups                INTEGER (1..maxNrofPagingGroups)
}
```

FIG. 18

```
RRCRelease ::=                    SEQUENCE {
    criticalExtensions               CHOICE {
        rrcRelease                       RRCRelease-IEs,
        criticalExtensionsFuture         SEQUENCE {}
    }
}

RRCRelease-IEs ::=                SEQUENCE {
    suspendConfig                    SuspendConfig
...
}
...

SuspendConfig ::=                 SEQUENCE {
    fullI-RNTI                       I-RNTI-Value,
    shortI-RNTI                      ShortI-RNTI-Value,
    ran-PagingCycle                  PagingCycle,
    ran-NotificationAreaInfo         RAN-NotificationAreaInfo
    t380                             PeriodicRNAU-TimerValue
    nextHopChainingCount             NextHopChainingCount,
    NrOfPagingGroups                 INTEGER (1..maxNrofPagingGroups)
...
}
```

FIG. 19

```
RRCRelease ::=                    SEQUENCE {
    criticalExtensions                CHOICE {
        rrcRelease                        RRCRelease-IEs,
        criticalExtensionsFuture          SEQUENCE {}
    }
}

RRCRelease-IEs ::=                SEQUENCE {
    suspendConfig                     SuspendConfig
    ...
}

SuspendConfig ::=                 SEQUENCE {
    fullI-RNTI                        I-RNTI-Value,
    shortI-RNTI                       ShortI-RNTI-Value,
    ran-PagingCycle                   PagingCycle,
    ran-NotificationAreaInfo          RAN-NotificationAreaInfo
    t380                              PeriodicRNAU-TimerValue
    nextHopChainingCount              NextHopChainingCount,
    PagingGroupID                     INTEGER (0..maxNrofPagingGroups-1)
    ...
}
```

FIG. 20

NG-5G-S-TMSI ::= BIT STRING (SIZE (48))

FIG. 21

Example Paging DCI or paging early indication DCI

```
RRCRelease ::=
...
PaginEarlyIndicationOffset    INTEGER (1.. maxPaginEarlyIndicationOffset)
...
```

FIG. 26

```
RRCRelease ::=                      SEQUENCE {
    criticalExtensions                  CHOICE {
        rrcRelease                          RRCRelease-IEs,
        criticalExtensionsFuture            SEQUENCE {}
    }
}

RRCRelease-IEs ::=                  SEQUENCE {
    suspendConfig                       SuspendConfig
    ...
}

SuspendConfig ::=                   SEQUENCE {
    fullI-RNTI                          I-RNTI-Value,
    shortI-RNTI                         ShortI-RNTI-Value,
    ran-PagingCycle                     PagingCycle,
    ran-NotificationAreaInfo            RAN-NotificationAreaInfo
    t380                                PeriodicRNAU-TimerValue
    nextHopChainingCount                NextHopChainingCount,
    PagingearlyIndicationOffset         INTEGER (1.. maxPaginEarlyIndicationOffset)
    ...
}
```

FIG. 27

```
DownlinkConfigConfigCommonSIB ::=       SEQUENCE {
    ...
    pcch-Config                         PCCH-Config,
    ...
}
...
PCCH-Config ::=                         SEQUENCE {
    defaultPagingCycle                      PagingCycle,
    nAndPagingFrameOffset                   CHOICE {
        oneT                                    NULL,
        halfT                                   INTEGER (0..1),
        quarterT                                INTEGER (0..3),
        oneEighthT                              INTEGER (0..7),
        oneSixteenthT                           INTEGER (0..15)
    },
    ns                                      ENUMERATED {four, two, one},
    firstPDCCH-MonitoringOccasionOfPO
    nrofPDCCH-MonitoringOccasionPerSSB-InPO-r16     INTEGER (2..4)
    PagingearlyIndicationOffset             INTEGER (1.. maxPagingEarlyIndicationOffset)
}
```

FIG. 28

Receive system information comprising a 1st parameter indicating a 1st number of paging sub-groups

3310 that the wireless device is associated with a 1st paging sub-group, of the paging sub-groups, based on the 1st number and a wireless device identifier

3320

Receive a 1st DCI indicating 1st paging sub-group(s) for a 1st paging occasion

3330

Monitor a control channel in the 1st paging occasion in response to the 1st paging sub-group(s), indicated by the 1st DCI, comprising the 1st paging sub-group associated with the wireless device

3340

Receive paging information

```
┌─────────────────────────────────────────────────────────────┐
│                                                             │
│    Receive, in a paging early indication monitoring        │
│    occasion associated with a paging occasion, a DCI       │
│    comprising fields associated with paging sub-groups     │
│                                                             │
│    A 1st field in the fields is associated with a 1st      │
│    paging sub-group of the paging sub-groups                │
│                                                             │
│    The 1st field comprises bit(s)                           │
│                                                             │
│    The wireless device is associated with the 1st          │
│    paging sub-group                                         │
│                                                             │
│                         3610                                │
└─────────────────────────────────────────────────────────────┘
                              │
                              ▼
┌─────────────────────────────────────────────────────────────┐
│                                                             │
│    Monitor the paging occasion based on a value of the     │
│    bit(s) indicating the 1st paging sub-group in the       │
│    paging occasion                                          │
│                                                             │
│                         3620                                │
└─────────────────────────────────────────────────────────────┘
```

FIG. 36

WIRELESS DEVICE AND WIRELESS NETWORK PROCESSES FOR PAGING ENHANCEMENT

CROSS-REFERENCE TO RELATED APPLICATIONS

This application claims the benefit of U.S. Provisional Application No. 63/092,431, filed Oct. 15, 2020, which is hereby incorporated by reference in its entirety.

BRIEF DESCRIPTION OF THE DRAWINGS

FIG. 16 shows an example message in accordance with several of various embodiments of the present disclosure.

FIG. 17 shows an example message in accordance with several of various embodiments of the present disclosure.

FIG. 18 shows an example message in accordance with several of various embodiments of the present disclosure.

FIG. 19 shows an example message in accordance with several of various embodiments of the present disclosure.

FIG. 20 shows an example message in accordance with several of various embodiments of the present disclosure.

FIG. 21 shows an example information element in accordance with several of various embodiments of the present disclosure.

FIG. 26 shows an example message comprising an information element in accordance with several of various embodiments of the present disclosure.

FIG. 27 shows an example message comprising an information element in accordance with several of various embodiments of the present disclosure.

FIG. 28 shows an example message comprising an information element in accordance with several of various embodiments of the present disclosure.

FIG. 33 shows an example flow diagram in accordance with several of various embodiments of the present disclosure.

FIG. 36 shows an example flow diagram in accordance with several of various embodiments of the present disclosure.

DETAILED DESCRIPTION

The exemplary embodiments of the disclosed technology enable processes for a wireless device and/or one or more base stations for paging enhancement. The exemplary disclosed embodiments may be implemented in the technical field of wireless communication systems. More particularly, the embodiments of the disclosed technology may relate to power saving using enhanced paging processes in a radio resource control (RRC) inactive state or an RRC idle state.

The devices and/or nodes of the mobile communications system disclosed herein may be implemented based on various technologies and/or various releases/versions/amendments of a technology. The various technologies include various releases of long-term evolution (LTE) technologies, various releases of 5G new radio (NR) technologies, various wireless local area networks technologies and/or a combination thereof and/or alike. For example, a base station may support a given technology and may communicate with wireless devices with different characteristics. The wireless devices may have different categories that define their capabilities in terms of supporting various features. The wireless device with the same category may have different capabilities. The wireless devices may support various technologies such as various releases of LTE technologies, various releases of 5G NR technologies and/or a combination thereof and/or alike. At least some of the wireless devices in the mobile communications system of the present disclosure may be stationary or almost stationary. In this disclosure, the terms "mobile communications system" and "wireless communications system" may be used interchangeably.

Figure 1A:
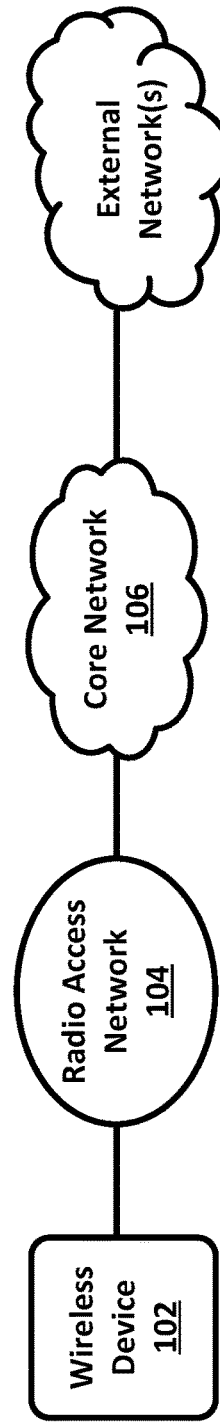
FIG. 1A and FIG. 1B show examples of mobile communications systems in accordance with several of various embodiments of the present disclosure.

FIG. 1A shows an example of a mobile communications system 100 in accordance with several of various embodiments of the present disclosure. The mobile communications system 100 may be, for example, run by a mobile network operator (MNO) or a mobile virtual network operator (MVNO). The mobile communications system 100 may be a public land mobile network (PLMN) run by a network operator providing a variety of service including voice, data, short messaging service (SMS), multimedia messaging service (MMS), emergency calls, etc. The mobile communications system 100 includes a core network (CN) 106, a radio access network (RAN) 104 and at least one wireless device 102.

The CN 106 connects the RAN 104 to one or more external networks (e.g., one or more data networks such as the Internet) and is responsible for functions such as authentication, charging and end-to-end connection establishment. Several radio access technologies (RATs) may be served by the same CN 106.

The RAN 104 may implement a RAT and may operate between the at least one wireless device 102 and the CN 106. The RAN 104 may handle radio related functionalities such as scheduling, radio resource control, modulation and coding, multi-antenna transmissions and retransmission protocols. The wireless device and the RAN may share a portion of the radio spectrum by separating transmissions from the wireless device to the RAN and the transmissions from the RAN to the wireless device. The direction of the transmissions from the wireless device to the RAN is known as the uplink and the direction of the transmissions from the RAN to the wireless device is known as the downlink. The separation of uplink and downlink transmissions may be achieved by employing a duplexing technique. Example duplexing techniques include frequency division duplexing (FDD), time division duplexing (TDD) or a combination of FDD and TDD.

In this disclosure, the term wireless device may refer to a device that communicates with a network entity or another device using wireless communication techniques. The wireless device may be a mobile device or a non-mobile (e.g., fixed) device. Examples of the wireless device include cellular phone, smart phone, tablet, laptop computer, wearable device (e.g., smart watch, smart shoe, fitness trackers, smart clothing, etc.), wireless sensor, wireless meter, extended reality (XR) devices including augmented reality (AR) and virtual reality (VR) devices, Internet of Things (IoT) device, vehicle to vehicle communications device, road-side units (RSU), automobile, relay node or any combination thereof. In some examples, the wireless device (e.g., a smart phone, tablet, etc.) may have an interface (e.g., a graphical user interface (GUI)) for configuration by an end user. In some examples, the wireless device (e.g., a wireless sensor device, etc.) may not have an interface for configuration by an end user. The wireless device may be referred to as a user equipment (UE), a mobile station (MS), a subscriber unit, a handset, an access terminal, a user terminal, a wireless transmit and receive unit (WTRU) and/or other terminology.

The at least one wireless device may communicate with at least one base station in the RAN 104. In this disclosure, the term base station may encompass terminologies associated with various RATs. For example, a base station may be referred to as a Node B in a 3G cellular system such as Universal Mobile Telecommunication Systems (UMTS), an evolved Node B (eNB) in a 4G cellular system such as evolved universal terrestrial radio access (E-UTRA), a next generation eNB (ng-eNB), a Next Generation Node B (gNB) in NR and/or a 5G system, an access point (AP) in Wi-Fi and/or other wireless local area networks. A base station may be referred to as a remote radio head (RRH), a baseband unit (BBU) in connection with one or more RRHs, a repeater or relay for coverage extension and/or any combination thereof. In some examples, all protocol layers of a base station may be implemented in one unit. In some examples, some of the protocol layers (e.g., upper layers) of the base station may be implemented in a first unit (e.g., a central unit (CU)) and some other protocol layer (e.g., lower layers) may be implemented in one or more second units (e.g., distributed units (DUs)).

A base station in the RAN 104 includes one or more antennas to communicate with the at least one wireless device. The base station may communicate with the at least one wireless device using radio frequency (RF) transmissions and receptions via RF transceivers. The base station antennas may control one or more cells (or sectors). The size and/or radio coverage area of a cell may depend on the range that transmissions by a wireless device can be successfully received by the base station when the wireless device transmits using the RF frequency of the cell. The base station may be associated with cells of various sizes. At a given location, the wireless device may be in coverage area of a first cell of the base station and may not be in coverage area of a second cell of the base station depending on the sizes of the first cell and the second cell.

A base station in the RAN 104 may have various implementations. For example, a base station may be implemented by connecting a BBU (or a BBU pool) coupled to one or more RRHs and/or one or more relay nodes to extend the cell coverage. The BBU pool may be located at a centralized site like a cloud or data center. The BBU pool may be connected to a plurality of RRHs that control a plurality of cells. The combination of BBU with the one or more RRHs may be referred to as a centralized or cloud RAN (C-RAN) architecture. In some implementations, the BBU functions may be implemented on virtual machines (VMs) on servers at a centralized location. This architecture may be referred to as virtual RAN (vRAN). All, most or a portion of the protocol layer functions (e.g., all or portions of physical layer, medium access control (MAC) layer and/or higher layers) may be implemented at the BBU pool and the processed data may be transmitted to the RRHs for further processing and/or RF transmission. The links between the BBU pool and the RRHs may be referred to as fronthaul.

In some deployment scenarios, the RAN 104 may include macrocell base stations with high transmission power levels and large coverage areas. In other deployment scenarios, the RAN 104 may include base stations that employ different transmission power levels and/or have cells with different coverage areas. For example, some base station may be macrocell base stations with high transmission powers and/or large coverage areas and other base station may be small cell base stations with comparatively smaller transmission powers and/or coverage areas. In some deployment scenarios, a small cell base station may have coverage that is within or has overlap with coverage area of a macrocell base station. A wireless device may communicate with the macrocell base station while within the coverage area of the macrocell base station. For additional capacity, the wireless device may communicate with both the macrocell base station and the small cell base station while in the overlapped coverage area of the macrocell base station and the small cell base station. Depending on their coverage areas, a small cell base station may be referred to as a microcell base station, a picocell base station, a femtocell base station or a home base station.

Different standard development organizations (SDOs) have specified, or may specify in future, mobile communications systems that have similar characteristics as the mobile communications system 100 of FIG. 1A. For example, the Third-Generation Partnership Project (3GPP) is a group of SDOs that provides specifications that define 3GPP technologies for mobile communications systems that are akin to the mobile communications system 100. The 3GPP has developed specifications for third generation (3G) mobile networks, fourth generation (4G) mobile networks and fifth generation (5G) mobile networks. The 3G, 4G and 5G networks are also known as Universal Mobile Telecommunications System (UMTS), Long Term Evolution (LTE) and 5G system (5GS), respectively. In this disclosure, embodiments are described with respect to the RAN implemented in a 3GPP 5G mobile network that is also referred to as next generation RAN (NG-RAN). The embodiments may also be implemented in other mobile communications systems such as 3G or 4G mobile networks or mobile networks that may be standardized in future such as sixth generation (6G) mobile networks or mobile networks that are implemented by standards bodies other than 3GPP. The NG-RAN may be based on a new RAT known as new radio (NR) and/or other radio access technologies such as LTE and/or non-3GPP RATs.

Figure 1B:
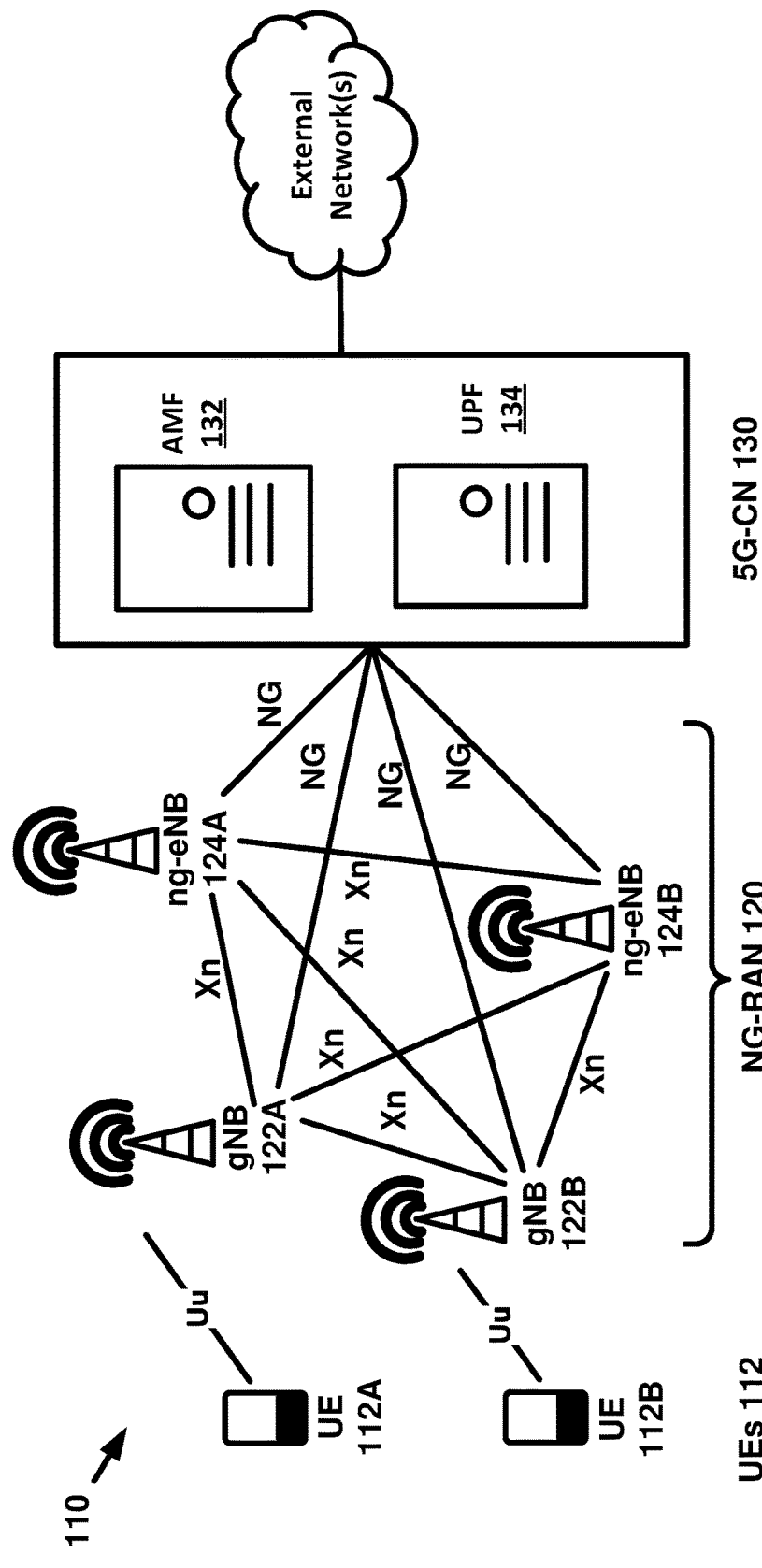

FIG. 1B shows an example of a mobile communications system 110 in accordance with several of various embodiments of the present disclosure. The mobile communications system 110 of FIG. 1B is an example of a 5G mobile network and includes a 5G CN (5G-CN) 130, an NG-RAN 120 and UEs (collectively 112 and individually UE 112A and UE 112B). The 5G-CN 130, the NG-RAN 120 and the UEs 112 of FIG. 1B operate substantially alike the CN 106, the RAN 104 and the at least one wireless device 102, respectively, as described for FIG. 1A.

The 5G-CN 130 of FIG. 1B connects the NG-RAN 120 to one or more external networks (e.g., one or more data networks such as the Internet) and is responsible for functions such as authentication, charging and end-to-end connection establishment. The 5G-CN has new enhancements compared to previous generations of CNs (e.g., evolved packet core (EPC) in the 4G networks) including service-based architecture, support for network slicing and control plane/user plane split. The service-based architecture of the 5G-CN provides a modular framework based on service and functionalities provided by the core network wherein a set of network functions are connected via service-based interfaces. The network slicing enables multiplexing of independent logical networks (e.g., network slices) on the same physical network infrastructure. For example, a network slice may be for mobile broadband applications with full mobility support and a different network slice may be for non-mobile latency-critical applications such as industry automation. The control plane/user plane split enables independent scaling of the control plane and the user plane. For example, the control plane capacity may be increased without affecting the user plane of the network.

The 5G-CN 130 of FIG. 1B includes an access and mobility management function (AMF) 132 and a user plane function (UPF) 134. The AMF 132 may support termination of non-access stratum (NAS) signaling, NAS signaling security such as ciphering and integrity protection, inter-3GPP access network mobility, registration management, connection management, mobility management, access authentication and authorization and security context management. The NAS is a functional layer between a UE and the CN and the access stratum (AS) is a functional layer between the UE and the RAN. The UPF 134 may serve as an interconnect point between the NG-RAN and an external data network. The UPF may support packet routing and forwarding, packet inspection and Quality of Service (QoS) handling and packet filtering. The UPF may further act as a Protocol Data Unit (PDU) session anchor point for mobility within and between RATs.

The 5G-CN 130 may include additional network functions (not shown in FIG. 1B) such as one or more Session Management Functions (SMFs), a Policy Control Function (PCF), a Network Exposure Function (NEF), a Unified Data Management (UDM), an Application Function (AF), and/or an Authentication Server Function (AUSF). These network functions along with the AMF 132 and UPF 134 enable a service-based architecture for the 5G-CN.

The NG-RAN 120 may operate between the UEs 112 and the 5G-CN 130 and may implement one or more RATs. The NG-RAN 120 may include one or more gNBs (e.g., gNB 122A or gNB 122B or collectively gNBs 122) and/or one or more ng-eNBs (e.g., ng-eNB 124A or ng-eNB 124B or collectively ng-eNBs 124). The general terminology for gNBs 122 and/or an ng-eNBs 124 is a base station and may be used interchangeably in this disclosure. The gNBs 122 and the ng-eNBs 124 may include one or more antennas to communicate with the UEs 112. The one or more antennas of the gNBs 122 or ng-eNBs 124 may control one or more cells (or sectors) that provide radio coverage for the UEs 112.

A gNB and/or an ng-eNB of FIG. 1B may be connected to the 5G-CN 130 using an NG interface. A gNB and/or an ng-eNB may be connected with other gNBs and/or ng-eNBs using an Xn interface. The NG or the Xn interfaces are logical connections that may be established using an underlying transport network. The interface between a UE and a gNB or between a UE and an ng-eNBs may be referred to as the Uu interface. An interface (e.g., Uu, NG or Xn) may be established by using a protocol stack that enables data and control signaling exchange between entities in the mobile communications system of FIG. 1B. When a protocol stack is used for transmission of user data, the protocol stack may be referred to as user plane protocol stack. When a protocol stack is used for transmission of control signaling, the protocol stack may be referred to as control plane protocol stack. Some protocol layer may be used in both of the user plane protocol stack and the control plane protocol stack while other protocol layers may be specific to the user plane or control plane.

The NG interface of FIG. 1B may include an NG-User plane (NG-U) interface between a gNB and the UPF 134 (or an ng-eNB and the UPF 134) and an NG-Control plane (NG-C) interface between a gNB and the AMF 132 (or an ng-eNB and the AMF 132). The NG-U interface may provide non-guaranteed delivery of user plane PDUs between a gNB and the UPF or an ng-eNB and the UPF. The NG-C interface may provide services such as NG interface management, UE context management, UE mobility management, transport of NAS messages, paging, PDU session management, configuration transfer and/or warning message transmission.

The UEs 112 and a gNB may be connected using the Uu interface and using the NR user plane and control plane protocol stack. The UEs 112 and an ng-eNB may be connected using the Uu interface using the LTE user plane and control plane protocol stack.

In the example mobile communications system of FIG. 1B, a 5G-CN is connected to a RAN comprised of 4G LTE and/or 5G NR RATs. In other example mobile communications systems, a RAN based on the 5G NR RAT may be connected to a 4G CN (e.g., EPC). For example, earlier releases of 5G standards may support a non-standalone mode of operation where a NR based RAN is connected to the 4G EPC. In an example non-standalone mode, a UE may be connected to both a 5G NR gNB and a 4G LTE eNB (e.g., a ng-eNB) and the control plane functionalities (such as initial access, paging and mobility) may be provided through the 4G LTE eNB. In a standalone of operation, the 5G NR gNB is connected to a 5G-CN and the user plane and the control plane functionalities are provided by the 5G NR gNB.

Figure 2A:
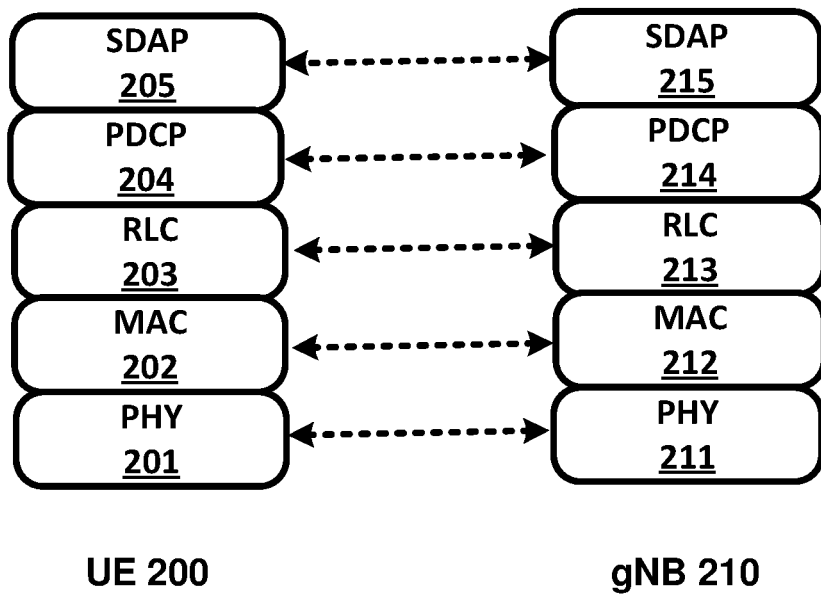
FIG. 2A and FIG. 2B show examples of user plane and control plane protocol layers in accordance with several of various embodiments of the present disclosure.

FIG. 2A shows an example of the protocol stack for the user plan of an NR Uu interface in accordance with several of various embodiments of the present disclosure. The user plane protocol stack comprises five protocol layers that terminate at the UE 200 and the gNB 210. The five protocol layers, as shown in FIG. 2A, include physical (PHY) layer referred to as PHY 201 at the UE 200 and PHY 211 at the gNB 210, medium access control (MAC) layer referred to as MAC 202 at the UE 200 and MAC 212 at the gNB 210, radio link control (RLC) layer referred to as RLC 203 at the UE 200 and RLC 213 at the gNB 210, packet data convergence protocol (PDCP) layer referred to as PDCP 204 at the UE 200 and PDCP 214 at the gNB 210, and service data application protocol (SDAP) layer referred to as SDAP 205 at the UE 200 and SDAP 215 at the gNB 210. The PHY layer, also known as layer 1 (L1), offers transport services to higher layers. The other four layers of the protocol stack (MAC, RLC, PDCP and SDAP) are collectively known as layer 2 (L2).

Figure 2B:
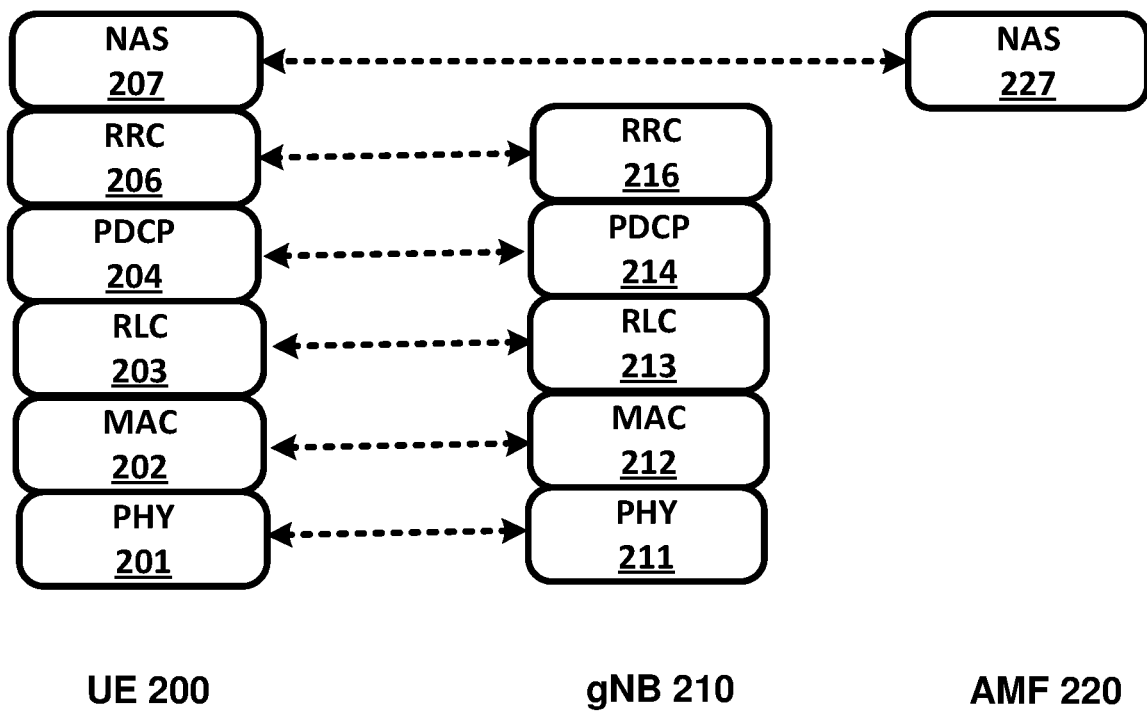

FIG. 2B shows an example of the protocol stack for the control plan of an NR Uu interface in accordance with several of various embodiments of the present disclosure. Some of the protocol layers (PHY, MAC, RLC and PDCP) are common between the user plane protocol stack shown in FIG. 2A and the control plan protocol stack. The control plane protocol stack also includes the RRC layer, referred to RRC 206 at the UE 200 and RRC 216 at the gNB 210, that also terminates at the UE 200 and the gNB 210. In addition, the control plane protocol stack includes the NAS layer that terminates at the UE 200 and the AMF 220. In FIG. 2B, the NAS layer is referred to as NAS 207 at the UE 200 and NAS 227 at the AMF 220.

Figure 3:
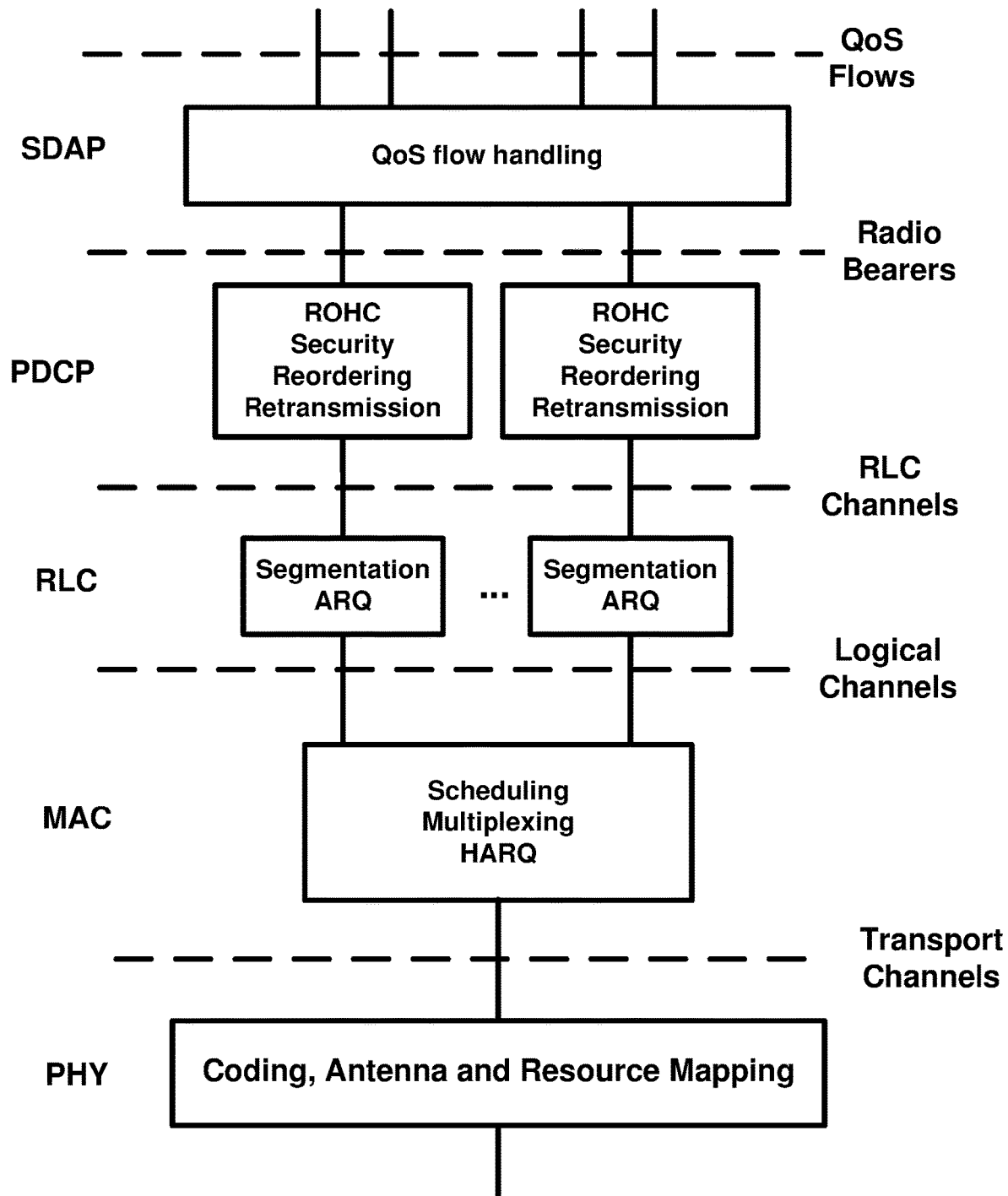
FIG. 3 shows example functions and services offered by protocol layers in a user plane protocol stack in accordance with several of various embodiments of the present disclosure.

FIG. 3 shows example functions and services offered to other layers by a layer in the NR user plane protocol stack of FIG. 2A in accordance with several of various embodiments of the present disclosure. For example, the SDAP layer of FIG. 3 (shown in FIG. 2A as SDAP 205 at the UE side and SDAP 215 at the gNB side) may perform mapping and de-mapping of QoS flows to data radio bearers. The mapping and de-mapping may be based on QoS (e.g., delay, throughput, jitter, error rate, etc.) associated with a QoS flow. A QoS flow may be a QoS differentiation granularity for a PDU session which is a logical connection between a UE 200 and a data network. A PDU session may contain one or more QoS flows. The functions and services of the SDAP layer include mapping and de-mapping between one or more QoS flows and one or more data radio bearers. The SDAP layer may also mark the uplink and/or downlink packets with a QoS flow ID (QFI).

The PDCP layer of FIG. 3 (shown in FIG. 2A as PDCP 204 at the UE side and PDCP 214 at the gNB side) may perform header compression and decompression (e.g., using Robust Header Compression (ROHC) protocol) to reduce the protocol header overhead, ciphering and deciphering and integrity protection and verification to enhance the security over the air interface, reordering and in-order delivery of packets and discarding of duplicate packets. A UE may be configured with one PDCP entity per bearer.

In an example scenario not shown in FIG. 3, a UE may be configured with dual connectivity and may connect to two different cell groups provided by two different base stations. For example, a base station of the two base stations may be referred to as a master base station and a cell group provided by the master base station may be referred to as a master cell group (MCG). The other base station of the two base stations may be referred to as a secondary base station and the cell group provided by the secondary base station may be referred to as a secondary cell group (SCG). A bearer may be configured for the UE as a split bearer that may be handled by the two different cell groups. The PDCP layer may perform routing of packets corresponding to a split bearer to and/or from RLC channels associated with the cell groups.

In an example scenario not shown in FIG. 3, a bearer of the UE may be configured (e.g., with control signaling) with PDCP packet duplication. A bearer configured with PDCP duplication may be mapped to a plurality of RLC channels each corresponding to different one or more cells. The PDCP layer may duplicate packets of the bearer configured with PDCP duplication and the duplicated packets may be mapped to the different RLC channels. With PDCP packet duplication, the likelihood of correct reception of packets increases thereby enabling higher reliability.

The RLC layer of FIG. 3 (shown in FIG. 2A as RLC 203 at the UE side and RLC 213 at the gNB side) provides service to upper layers in the form of RLC channels. The RLC layer may include three transmission modes: transparent mode (TM), Unacknowledged mode (UM) and Acknowledged mode (AM). The RLC layer may perform error correction through automatic repeat request (ARQ) for the AM transmission mode, segmentation of RLC service data units (SDUs) for the AM and UM transmission modes and re-segmentation of RLC SDUs for AM transmission mode, duplicate detection for the AM transmission mode, RLC SDU discard for the AM and UM transmission modes, etc. The UE may be configured with one RLC entity per RLC channel.

The MAC layer of FIG. 3 (shown in FIG. 2A as MAC 202 at the UE side and MAC 212 at the gNB side) provides services to the RLC layer in form of logical channels. The MAC layer may perform mapping between logical channels and transport channels, multiplexing/demultiplexing of MAC SDUs belonging to one or more logical channels into/from transport blocks (TBs) delivered to/from the physical layer on transport channels, reporting of scheduling information, error correction through hybrid automatic repeat request (HARQ), priority handling between UEs by means of dynamic scheduling, priority handling between logical channels of one UE by means of logical channel prioritization and/or padding. In case of carrier aggregation, a MAC entity may comprise one HARQ entity per cell. A MAC entity may support multiple numerologies, transmission timings and cells. The control signaling may configure logical channels with mapping restrictions. The mapping restrictions in logical channel prioritization may control the numerology(ies), cell(s), and/or transmission timing(s)/duration(s) that a logical channel may use.

The PHY layer of FIG. 3 (shown in FIG. 2A as PHY 201 at the UE side and PHY 211 at the gNB side) provides transport services to the MAC layer in form of transport channels. The physical layer may handle coding/decoding, HARQ soft combining, rate matching of a coded transport channel to physical channels, mapping of coded transport channels to physical channels, modulation and demodulation of physical channels, frequency and time synchronization, radio characteristics measurements and indication to higher layers, RF processing, and mapping to antennas and radio resources.

Figure 4:
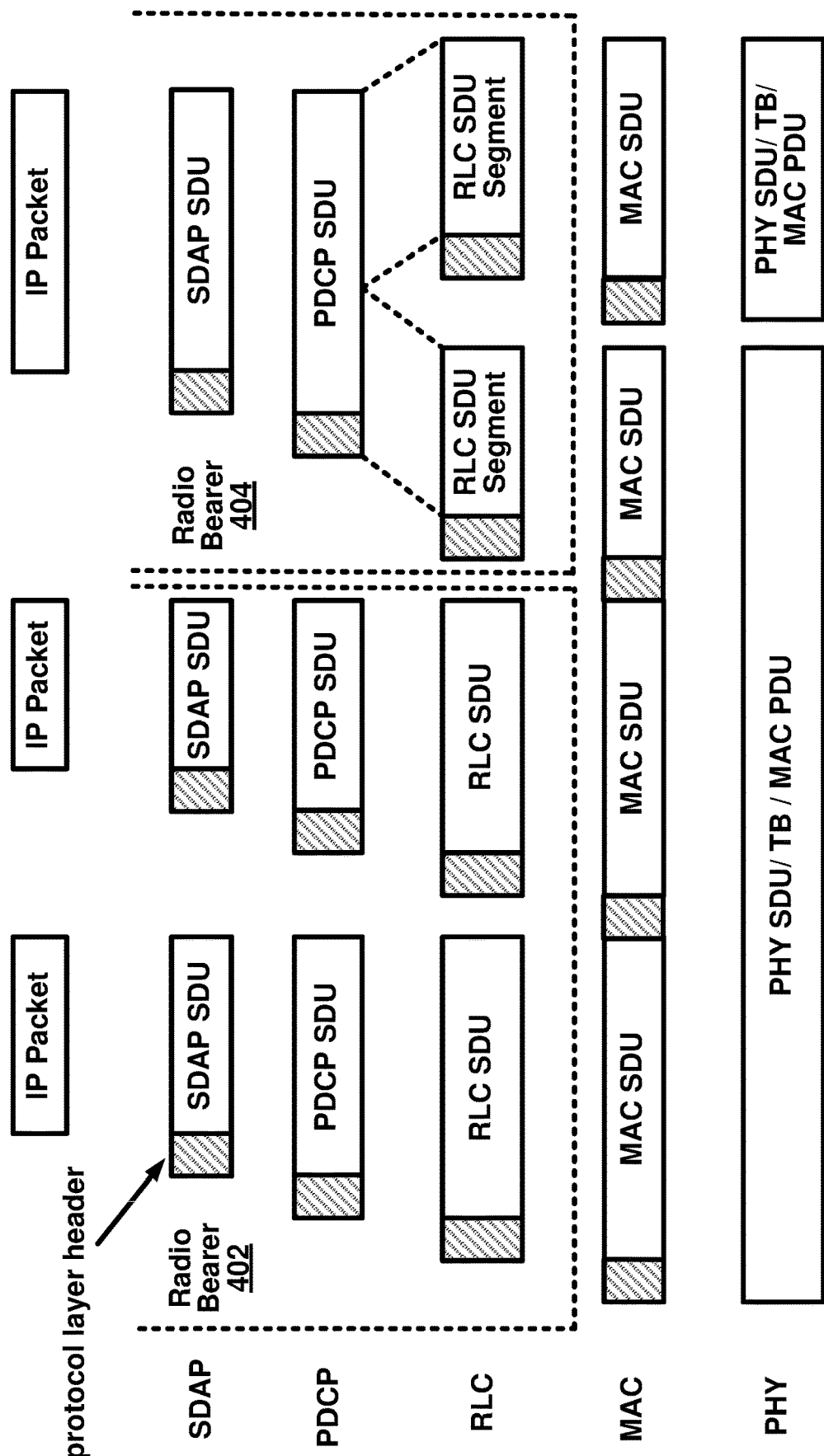
FIG. 4 shows example flow of packets through the protocol layers in accordance with several of various embodiments of the present disclosure.

FIG. 4 shows example processing of packets at different protocol layers in accordance with several of various embodiments of the present disclosure. In this example, three Internet Protocol (IP) packets that are processed by the different layers of the NR protocol stack. The term SDU shown in FIG. 4 is the data unit that is entered from/to a higher layer. In contrast, a protocol data unit (PDU) is the data unit that is entered to/from a lower layer. The flow of packets in FIG. 4 is for downlink. An uplink data flow through layers of the NR protocol stack is similar to FIG. 4. In this example, the two leftmost IP packets are mapped by the SDAP layer (shown as SDAP 205 and SDAP 215 in FIG. 2A) to radio bearer 402 and the rightmost packet is mapped by the SDAP layer to the radio bearer 404. The SDAP layer adds SDAP headers to the IP packets which are entered into the PDCP layer as PDCP SDUs. The PDCP layer is shown as PDCP 204 and PDCP 214 in FIG. 2A. The PDCP layer adds the PDCP headers to the PDCP SDUs which are entered into the RLC layer as RLC SDUs. The RLC layer is shown as RLC 203 and RLC 213 in FIG. 2A. An RLC SDU may be segmented at the RLC layer. The RLC layer adds RLC headers to the RLC SDUs after segmentation (if segmented) which are entered into the MAC layer as MAC SDUs. The MAC layer adds the MAC headers to the MAC SDUs and multiplexes one or more MAC SDUs to form a PHY SDU (also referred to as a transport block (TB) or a MAC PDU).

In FIG. 4, the MAC SDUs are multiplexed to form a transport block. The MAC layer may multiplex one or more MAC control elements (MAC CEs) with zero or more MAC SDUs to form a transport block. The MAC CEs may also be referred to as MAC commands or MAC layer control signaling and may be used for in-band control signaling. The MAC CEs may be transmitted by a base station to a UE (e.g., downlink MAC CEs) or by a UE to a base station (e.g., uplink MAC CEs). The MAC CEs may be used for transmission of information useful by a gNB for scheduling (e.g., buffer status report (BSR) or power headroom report (PHR)), activation/deactivation of one or more cells, activation/deactivation of configured radio resources for or one or more processes, activation/deactivation of one or more processes, indication of parameters used in one or more processes, etc.

Figure 5A:
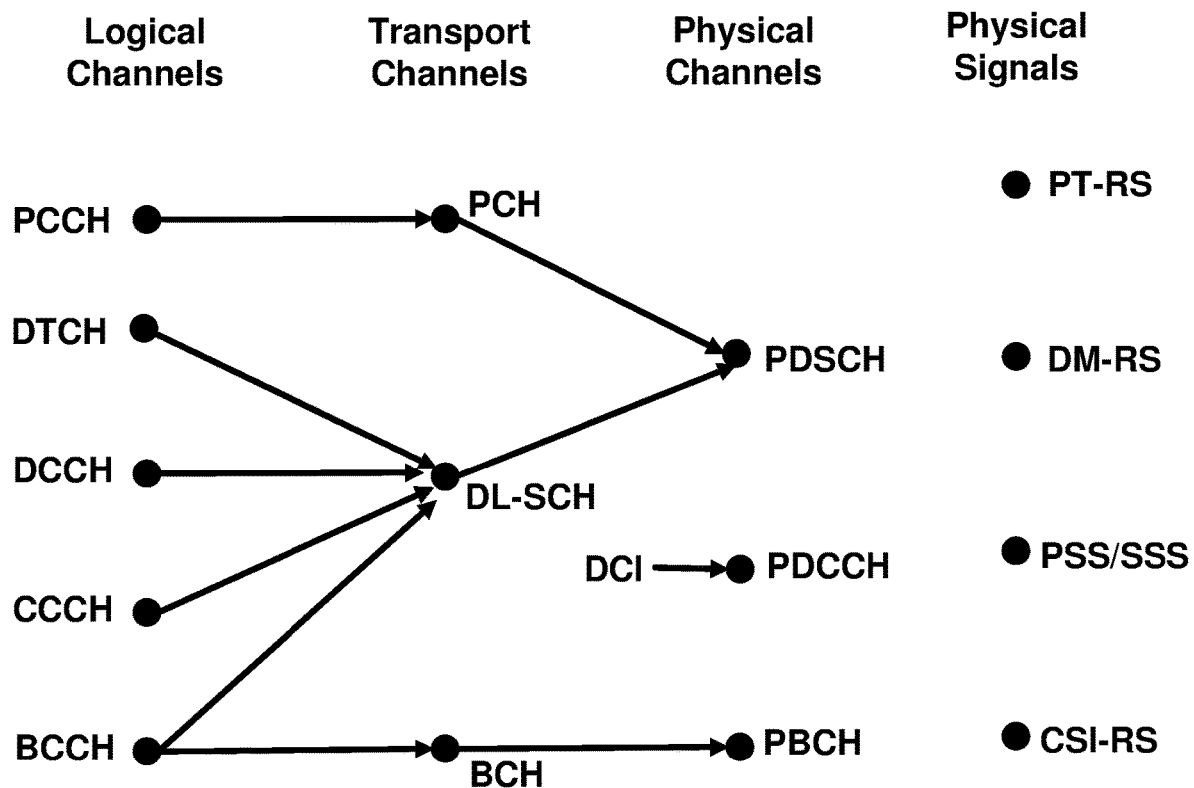
FIG. 5A shows example mapping of channels between layers of the protocol stack and different physical signals in downlink in accordance with several of various embodiments of the present disclosure.
Figure 5B:
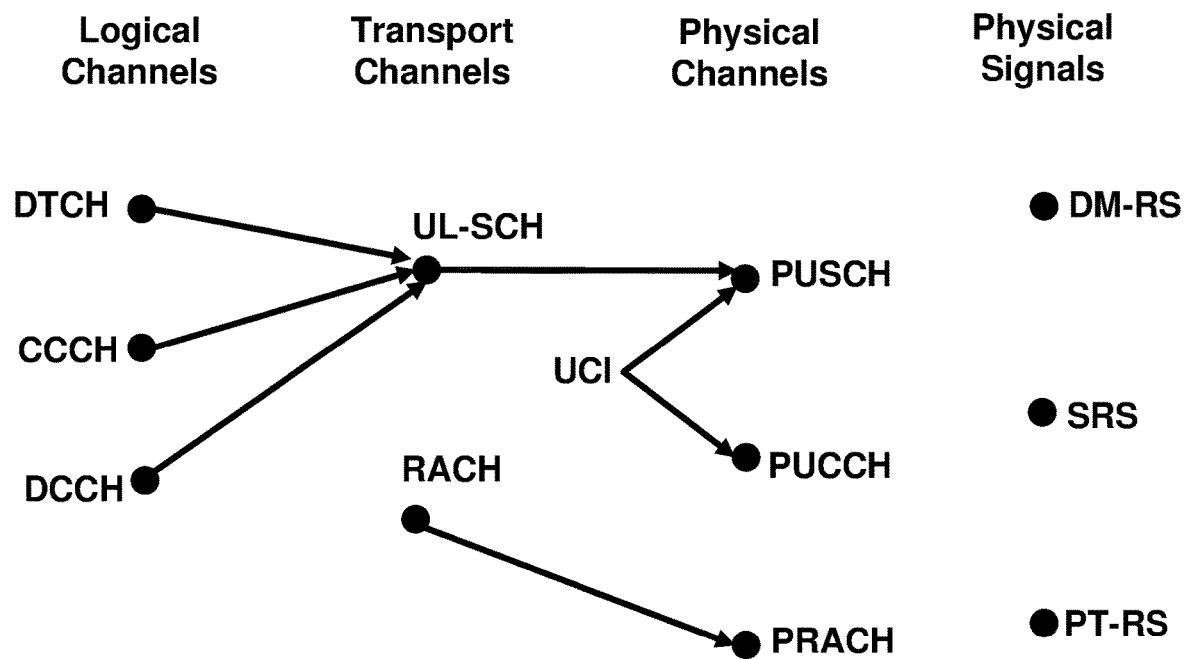
FIG. 5B shows example mapping of channels between layers of the protocol stack and different physical signals in uplink in accordance with several of various embodiments of the present disclosure.

FIG. 5A and FIG. 5B show example mapping between logical channels, transport channels and physical channels for downlink and uplink, respectively in accordance with several of various embodiments of the present disclosure. As discussed before, the MAC layer provides services to higher layer in the form of logical channels. A logical channel may be classified as a control channel, if used for transmission of control and/or configuration information, or a traffic channel if used for transmission of user data. Example logical channels in NR include Broadcast Control Channel (BCCH) used for transmission of broadcast system control information, Paging Control Channel (PCCH) used for carrying paging messages for wireless devices with unknown locations, Common Control Channel (CCCH) used for transmission of control information between UEs and network and for UEs that have no RRC connection with the network, Dedicated Control Channel (DCCH) which is a point-to-point bi-directional channel for transmission of dedicated control information between a UE that has an RRC connection and the network and Dedicated Traffic Channel (DTCH) which is point-to-point channel, dedicated to one UE, for the transfer of user information and may exist in both uplink and downlink.

As discussed before, the PHY layer provides services to the MAC layer and higher layers in the form of transport channels. Example transport channels in NR include Broadcast Channel (BCH) used for transmission of part of the BCCH referred to as master information block (MIB), Downlink Shared Channel (DL-SCH) used for transmission of data (e.g., from DTCH in downlink) and various control information (e.g., from DCCH and CCCH in downlink and part of the BCCH that is not mapped to the BCH), Uplink Shared Channel (UL-SCH) used for transmission of uplink data (e.g., from DTCH in uplink) and control information (e.g., from CCCH and DCCH in uplink) and Paging Channel (PCH) used for transmission of paging information from the PCCH. In addition, Random Access Channel (RACH) is a transport channel used for transmission of random access preambles. The RACH does not carry a transport block. Data on a transport channel (except RACH) may be organized in transport blocks, wherein One or more transport blocks may be transmitted in a transmission time interval (TTI).

The PHY layer may map the transport channels to physical channels. A physical channel may correspond to time-frequency resources that are used for transmission of information from one or more transport channels. In addition to mapping transport channels to physical channels, the physical layer may generate control information (e.g., downlink control information (DCI) or uplink control information (UCI)) that may be carried by the physical channels. Example DCI include scheduling information (e.g., downlink assignments and uplink grants), request for channel state information report, power control command, etc. Example UCI include HARQ feedback indicating correct or incorrect reception of downlink transport blocks, channel state information report, scheduling request, etc. Example physical channels in NR include a Physical Broadcast Channel (PBCH) for carrying information from the BCH, a Physical Downlink Shared Channel (PDSCH) for carrying information form the PCH and the DL-SCH, a Physical Downlink Control Channel (PDCCH) for carrying DCI, a Physical Uplink Shared Channel (PUSCH) for carrying information from the UL-SCH and/or UCI, a Physical Uplink Control Channel (PUCCH) for carrying UCI and Physical Random Access Channel (PRACH) for transmission of RACH (e.g., random access preamble).

The PHY layer may also generate physical signals that are not originated from higher layers. As shown in FIG. 5A, example downlink physical signals include Demodulation Reference Signal (DM-RS), Phase Tracking Reference Signal (PT-RS), Channel State Information Reference Signal (CSI-RS), Primary Synchronization Signal (PSS) and Secondary Synchronization Signal (SSS). As shown in FIG. 5B, example uplink physical signals include DM-RS, PT-RS and sounding reference signal (SRS).

As indicated earlier, some of the protocol layers (PHY, MAC, RLC and PDCP) of the control plane of an NR Uu interface, are common between the user plane protocol stack (as shown in FIG. 2A) and the control plane protocol stack (as shown in FIG. 2B). In addition to PHY, MAC, RLC and PDCP, the control plane protocol stack includes the RRC protocol layer and the NAS protocol layer.

The NAS layer, as shown in FIG. 2B, terminates at the UE 200 and the AMF 220 entity of the 5G-C 130. The NAS layer is used for core network related functions and signaling including registration, authentication, location update and session management. The NAS layer uses services from the AS of the Uu interface to transmit the NAS messages.

The RRC layer, as shown in FIG. 2B, operates between the UE 200 and the gNB 210 (more generally NG-RAN 120) and may provide services and functions such as broadcast of system information (SI) related to AS and NAS as well as paging initiated by the 5G-C 130 or NG-RAN 120. In addition, the RRC layer is responsible for establishment, maintenance and release of an RRC connection between the UE 200 and the NG-RAN 120, carrier aggregation configuration (e.g., addition, modification and release), dual connectivity configuration (e.g., addition, modification and release), security related functions, radio bearer configuration/maintenance and release, mobility management (e.g., maintenance and context transfer), UE cell selection and reselection, inter-RAT mobility, QoS management functions, UE measurement reporting and control, radio link failure (RLF) detection and NAS message transfer. The RRC layer uses services from PHY, MAC, RLC and PDCP layers to transmit RRC messages using signaling radio bearers (SRBs). The SRBs are mapped to CCCH logical channel during connection establishment and to DCCH logical channel after connection establishment.

Figure 6:
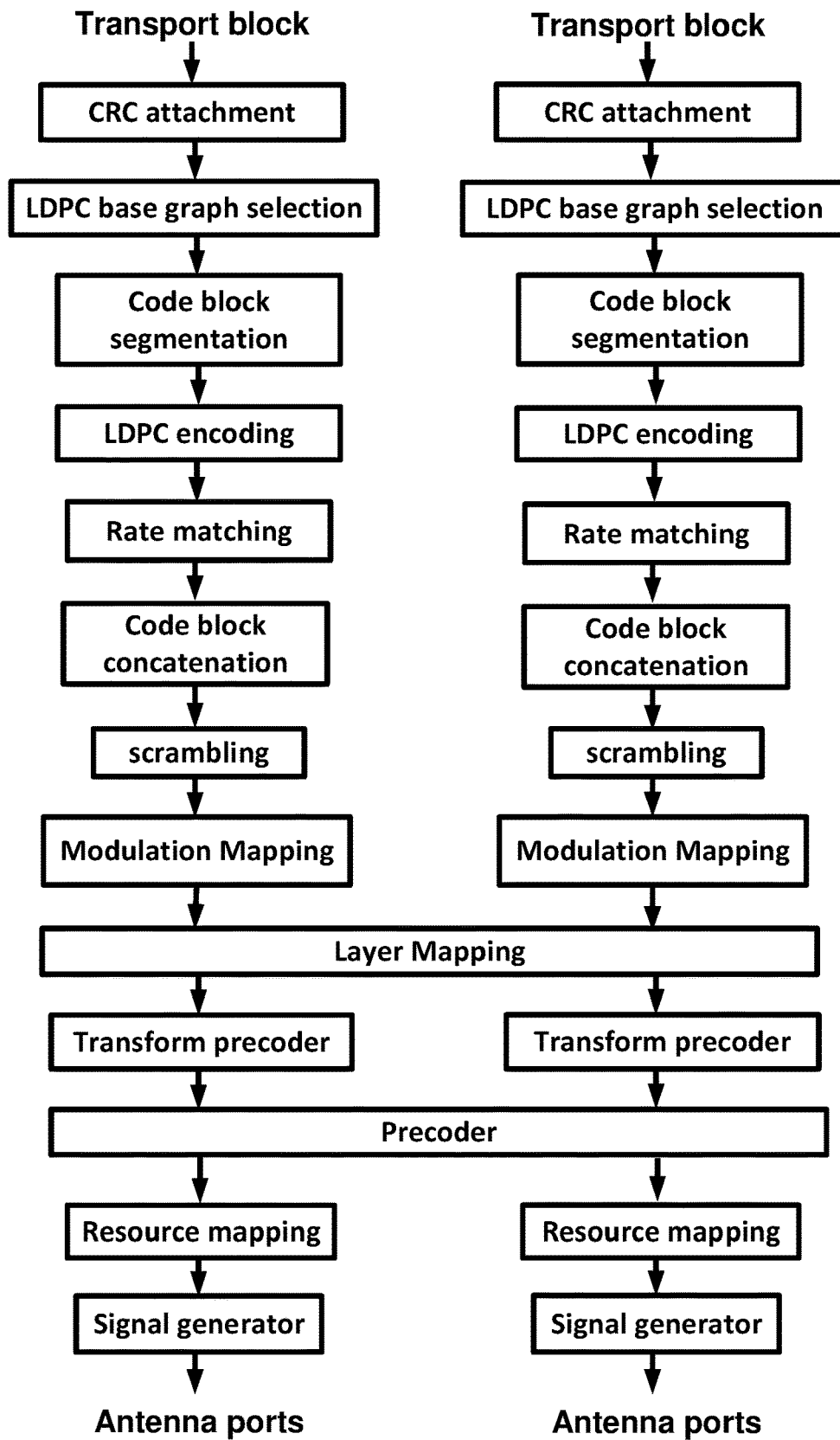
FIG. 6 shows example physical layer processes for signal transmission in accordance with several of various embodiments of the present disclosure.

FIG. 6 shows example physical layer processes for signal transmission in accordance with several of various embodiments of the present disclosure. Data and/or control streams from MAC layer may be encoded/decoded to offer transport and control services over the radio transmission link. For example, one or more (e.g., two as shown in FIG. 6) transport blocks may be received from the MAC layer for transmission via a physical channel (e.g., a physical downlink shared channel or a physical uplink shared channel). A cyclic redundancy check (CRC) may be calculated and attached to a transport block in the physical layer. The CRC calculation may be based on one or more cyclic generator polynomials. The CRC may be used by the receiver for error detection. Following the transport block CRC attachment, a low-density parity check (LDPC) base graph selection may be performed. In example embodiments, two LDPC base graphs may be used wherein a first LDPC base graph may be optimized for small transport blocks and a second LDPC base graph may be optimized for comparatively larger transport blocks.

The transport block may be segmented into code blocks and code block CRC may be calculated and attached to a code block. A code block may be LDPC coded and the LDPC coded blocks may be individually rate matched. The code blocks may be concatenated to create one or more codewords. The contents of a codeword may be scrambled and modulated to generate a block of complex-valued modulation symbols. The modulation symbols may be mapped to a plurality of transmission layers (e.g., multiple-input multiple-output (MIMO) layers) and the transmission layers may be subject to transform precoding and/or precoding. The precoded complex-valued symbols may be mapped to radio resources (e.g., resource elements). The signal generator block may create a baseband signal and up-convert the baseband signal to a carrier frequency for transmission via antenna ports. The signal generator block may employ mixers, filters and/or other radio frequency (RF) components prior to transmission via the antennas. The functions and blocks in FIG. 6 are illustrated as examples and other mechanisms may be implemented in various embodiments.

Figure 7:
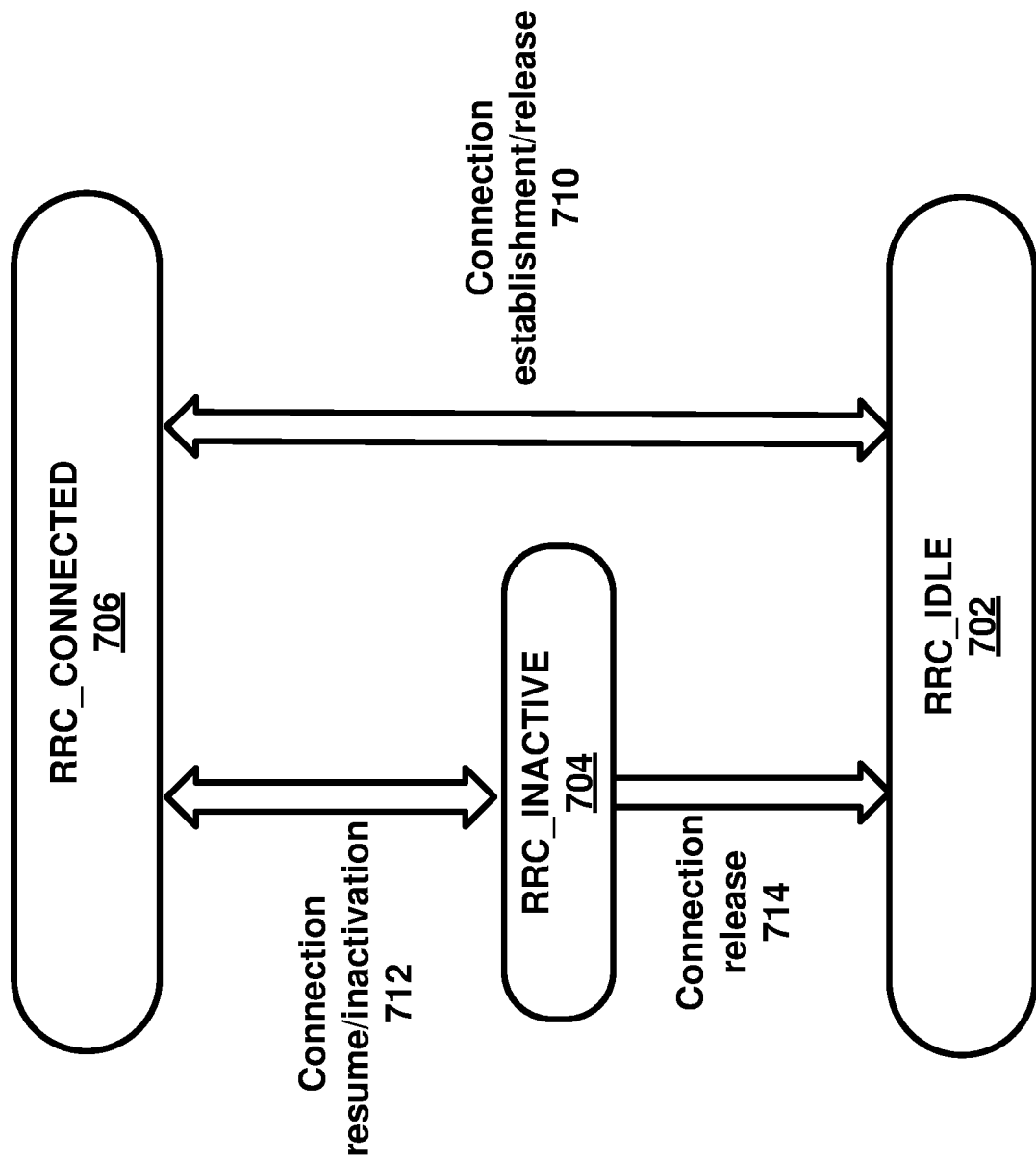
FIG. 7 shows examples of RRC states and RRC state transitions in accordance with several of various embodiments of the present disclosure.

FIG. 7 shows examples of RRC states and RRC state transitions at a UE in accordance with several of various embodiments of the present disclosure. A UE may be in one of three RRC states: RRC_IDLE 702, RRC INACTIVE 704 and RRC_CONNECTED 706. In RRC_IDLE 702 state, no RRC context (e.g., parameters needed for communications between the UE and the network) may be established for the UE in the RAN. In RRC_IDLE 702 state, no data transfer between the UE and the network may take place and uplink synchronization is not maintained. The wireless device may sleep most of the time and may wake up periodically to receive paging messages. The uplink transmission of the UE may be based on a random access process and to enable transition to the RRC_CONNECTED 706 state. The mobility in RRC_IDLE 702 state is through a cell reselection procedure where the UE camps on a cell based on one or more criteria including signal strength that is determined based on the UE measurements.

In RRC_CONNECTED 706 state, the RRC context is established and both the UE and the RAN have necessary parameters to enable communications between the UE and the network. In the RRC_CONNECTED 706 state, the UE is configured with an identity known as a Cell Radio Network Temporary Identifier (C-RNTI) that is used for signaling purposes (e.g., uplink and downlink scheduling, etc.) between the UE and the RAN. The wireless device mobility in the RRC_CONNECTED 706 state is managed by the RAN. The wireless device provides neighboring cells and/or current serving cell measurements to the network and the network may make hand over decisions. Based on the wireless device measurements, the current serving base station may send a handover request message to a neighboring base station and may send a handover command to the wireless device to handover to a cell of the neighboring base station. The transition of the wireless device from the RRC_IDLE 702 state to the RRC_CONNECTED 706 state or from the RRC_CONNECTED 706 state to the RRC_IDLE 702 state may be based on connection establishment and connection release procedures (shown collectively as connection establishment/release 710 in FIG. 7).

To enable a faster transition to the RRC_CONNECTED 706 state (e.g., compared to transition from RRC_IDLE 702 state to RRC_CONNECTED 706 state), an RRC_INACTIVE 704 state is used for an NR UE wherein, the RRC context is kept at the UE and the RAN. The transition from the RRC_INACTIVE 704 state to the RRC_CONNECTED 706 state is handled by RAN without CN signaling. Similar to the RRC_IDLE 702 state, the mobility in RRC_INACTIVE 704 state is based on a cell reselection procedure without involvement from the network. The transition of the wireless device from the RRC_INACTIVE 704 state to the RRC_CONNECTED 706 state or from the RRC_CONNECTED 706 state to the RRC_INACTIVE 704 state may be based on connection resume and connection inactivation procedures (shown collectively as connection resume/inactivation 712 in FIG. 7). The transition of the wireless device from the RRC_INACTIVE 704 state to the RRC_IDLE 702 state may be based on a connection release 714 procedure as shown in FIG. 7.

In NR, Orthogonal Frequency Division Multiplexing (OFDM), also called cyclic prefix OFDM (CP-OFDM), is the baseline transmission scheme in both downlink and uplink of NR and the Discrete Fourier Transform (DFT) spread OFDM (DFT-s-OFDM) is a complementary uplink transmission in addition to the baseline OFDM scheme. OFDM is multi-carrier transmission scheme wherein the transmission bandwidth may be composed of several narrowband sub-carriers. The subcarriers are modulated by the complex valued OFDM modulation symbols resulting in an OFDM signal. The complex valued OFDM modulation symbols are obtained by mapping, by a modulation mapper, the input data (e.g., binary digits) to different points of a modulation constellation diagram. The modulation constellation diagram depends on the modulation scheme. NR may use different types of modulation schemes including Binary Phase Shift Keying (BPSK), π/2-BPSK, Quadrature Phase Shift Keying (QPSK), 16 Quadrature Amplitude Modulation (16QAM), 64QAM and 256QAM. Different and/or higher order modulation schemes (e.g., M-QAM in general) may be used. An OFDM signal with N subcarriers may be generated by processing N subcarriers in parallel for example by using Inverse Fast Fourier Transform (IFFT) processing. The OFDM receiver may use FFT processing to recover the transmitted OFDM modulation symbols. The subcarrier spacing of subcarriers in an OFDM signal is inversely proportional to an OFDM modulation symbol duration. For example, for a 15 KHz subcarrier spacing, duration of an OFDM signal is nearly 66.7μs. To enhance the robustness of OFDM transmission in time dispersive channels, a cyclic prefix (CP) may be inserted at the beginning of an OFDM symbol. For example, the last part of an OFDM symbol may be copied and inserted at the beginning of an OFDM symbol. The CP insertion enhanced the OFDM transmission scheme by preserving subcarrier orthogonality in time dispersive channels.

In NR, different numerologies may be used for OFDM transmission. A numerology of OFDM transmission may indicate a subcarrier spacing and a CP duration for the OFDM transmission. For example, a subcarrier spacing in NR may generally be a multiple of 15 KHz and expressed as $\Delta f = 2^\mu \cdot 15$ KHz ($\mu = 0, 1, 2, \ldots$). Example subcarrier spacings used in NR include 15 KHz ($\mu=0$), 30 KHz ($\mu=1$), 60 KHz ($\mu=2$), 120 KHz ($\mu=3$) and 240 KHz ($\mu=4$). As discussed before, a duration of OFDM symbol is inversely proportional to the subcarrier spacing and therefor OFDM symbol duration may depend on the numerology (e.g., the p value).

Figure 8:
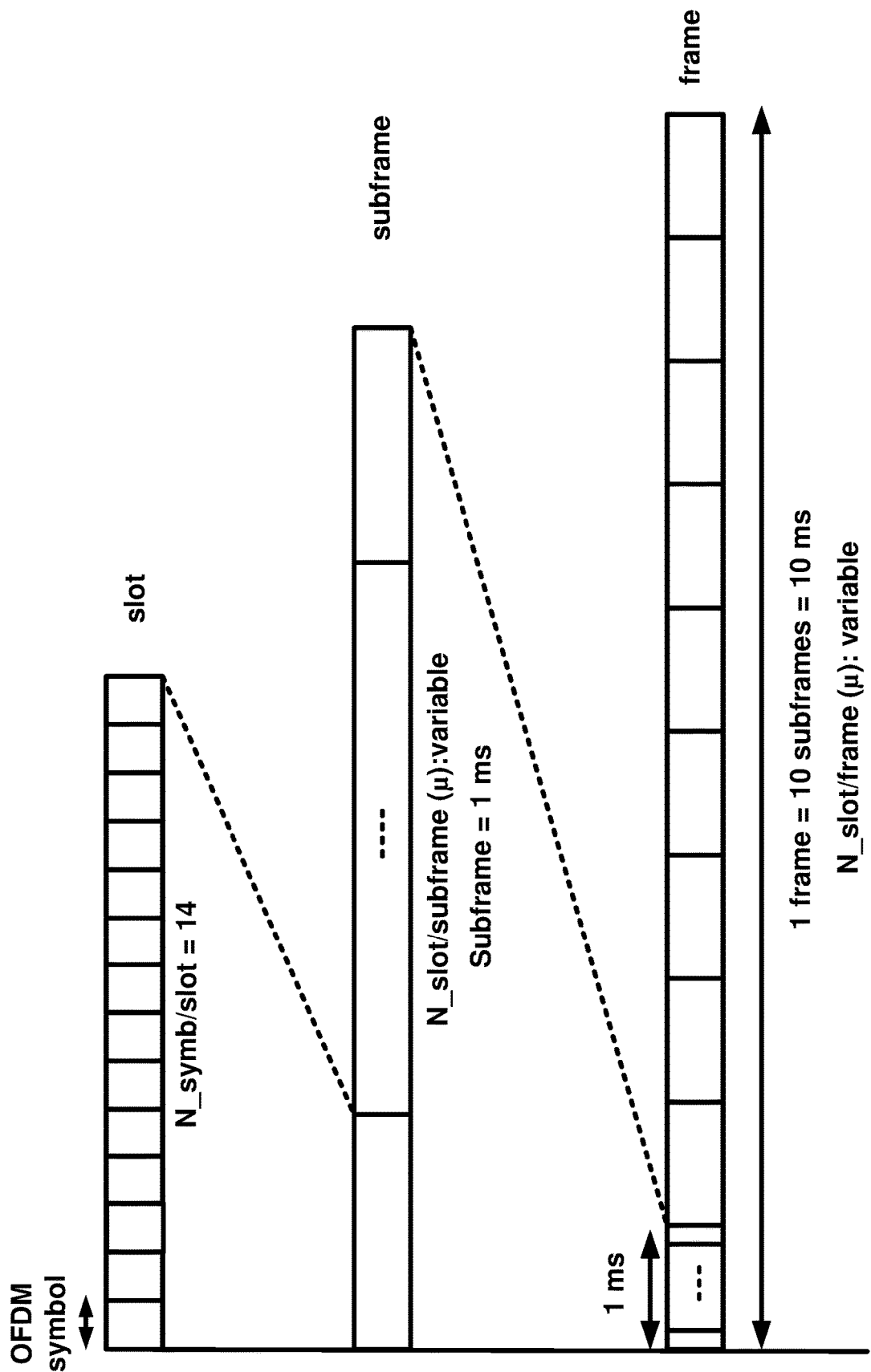
FIG. 8 shows an example time domain transmission structure in NR by grouping OFDM symbols into slots, subframes and frames in accordance with several of various embodiments of the present disclosure.

FIG. 8 shows an example time domain transmission structure in NR wherein OFDM symbols are grouped into slots, subframes and frames in accordance with several of various embodiments of the present disclosure. A slot is a group of $N_{symb}^{slot}$ OFDM symbols, wherein the $N_{symb}^{slot}$ may have a constant value (e.g., 14). Since different numerologies results in different OFDM symbol durations, duration of a slot may also depend on the numerology and may be variable. A subframe may have a duration of 1 ms and may be composed of one or more slots, the number of which may depend on the slot duration. The number of slots per subframe is therefore a function of p and may generally be expressed as $N_{slot}^{subframe,\mu}$ and the number of symbols per subframe may be expressed as $N_{symb}^{subframe,\mu} = N_{symb}^{slot} N_{slot}^{subframe,\mu}$. A frame may have a duration of 10 ms and may consist of 10 subframes. The number of slots per frame may depend on the numerology and therefore may be variable. The number of slots per frame may generally be expressed as $N_{slot}^{frame,\mu}$.

An antenna port may be defined as a logical entity such that channel characteristics over which a symbol on the antenna port is conveyed may be inferred from the channel characteristics over which another symbol on the same antenna port is conveyed. For example, for DM-RS associated with a PDSCH, the channel over which a PDSCH symbol on an antenna port is conveyed may be inferred from the channel over which a DM-RS symbol on the same antenna port is conveyed, for example, if the two symbols are within the same resource as the scheduled PDSCH and/or in the same slot and/or in the same precoding resource block group (PRG). For example, for DM-RS associated with a PDCCH, the channel over which a PDCCH symbol on an antenna port is conveyed may be inferred from the channel over which a DM-RS symbol on the same antenna port is conveyed if, for example, the two symbols are within resources for which the UE may assume the same precoding being used. For example, for DM-RS associated with a PBCH, the channel over which a PBCH symbol on one antenna port is conveyed may be inferred from the channel over which a DM-RS symbol on the same antenna port is conveyed if, for example, the two symbols are within a SS/PBCH block transmitted within the same slot, and with the same block index. The antenna port may be different from a physical antenna. An antenna port may be associated with an antenna port number and different physical channels may correspond to different ranges of antenna port numbers.

Figure 9:
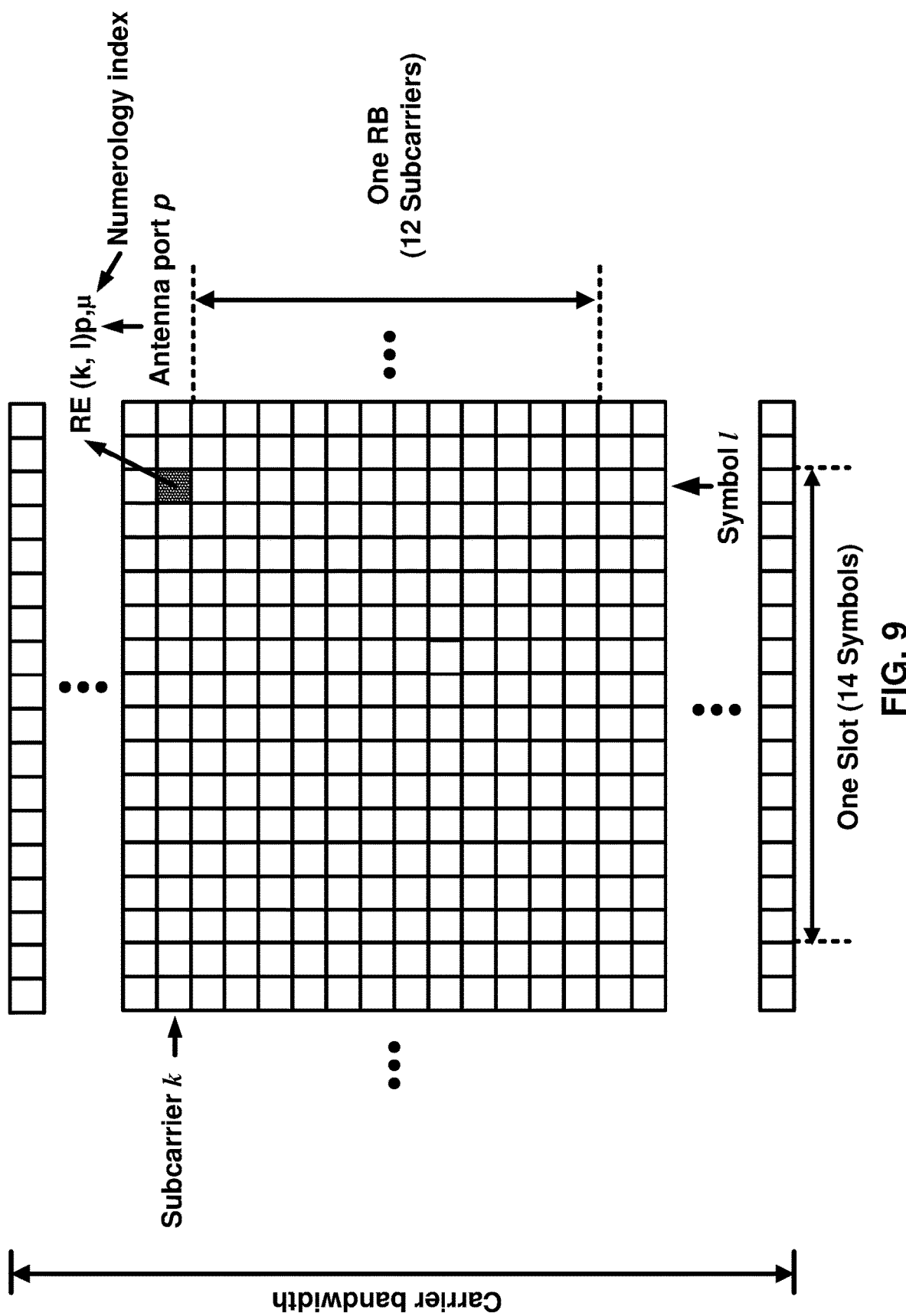
FIG. 9 shows an example of time-frequency resource grid in accordance with several of various embodiments of the present disclosure.

FIG. 9 shows an example of time-frequency resource grid in accordance with several of various embodiments of the present disclosure. The number of subcarriers in a carrier bandwidth may be based on the numerology of OFDM transmissions in the carrier. A resource element, corresponding to one symbol duration and one subcarrier, may be the smallest physical resource in the time-frequency grid. A resource element (RE) for antenna port p and subcarrier spacing configuration p may be uniquely identified by $(k,l)_{p,\mu}$ where k is the index of a subcarrier in the frequency domain and l may refer to the symbol position in the time domain relative to some reference point. A resource block may be defined as $N_{SC}^{RB} = 12$ subcarriers. Since subcarrier spacing depends on the numerology of OFDM transmission, the frequency domain span of a resource block may be variable and may depend on the numerology. For example, for a subcarrier spacing of 15 KHz (e.g., $\mu=0$), a resource block may be 180 KHz and for a subcarrier spacing of 30 KHz (e.g., $\mu=1$), a resource block may be 360 KHz.

With large carrier bandwidths defined in NR and due to limited capabilities for some UEs (e.g., due to hardware limitations), a UE may not support an entire carrier bandwidth. Receiving on the full carrier bandwidth may imply high energy consumption. For example, transmitting downlink control channels on the full downlink carrier bandwidth may result in high power consumption for wide carrier bandwidths. NR may use a bandwidth adaptation procedure to dynamically adapt the transmit and receive bandwidths. The transmit and receive bandwidth of a UE on a cell may be smaller than the bandwidth of the cell and may be adjusted. For example, the width of the transmit and/or receive bandwidth may change (e.g., shrink during period of low activity to save power); the location of the transmit and/or receive bandwidth may move in the frequency domain (e.g., to increase scheduling flexibility); and the subcarrier spacing of the transmit or receive bandwidth may change (e.g., to allow different services). A subset of the cell bandwidth may be referred to as a Bandwidth Part (BWP) and bandwidth adaptation may be achieved by configuring the UE with one or more BWPs. The base station may configure a UE with a set of downlink BWPs and a set of uplink BWPs. A BWP may be characterized by a numerology (e.g., subcarrier spacing and cyclic prefix) and a set of consecutive resource blocks in the numerology of the BWP. One or more first BWPs of the one or more BWPs of the cell may be active at a time. An active BWP may be an active downlink BWP or an active uplink BWP.

Figure 10:
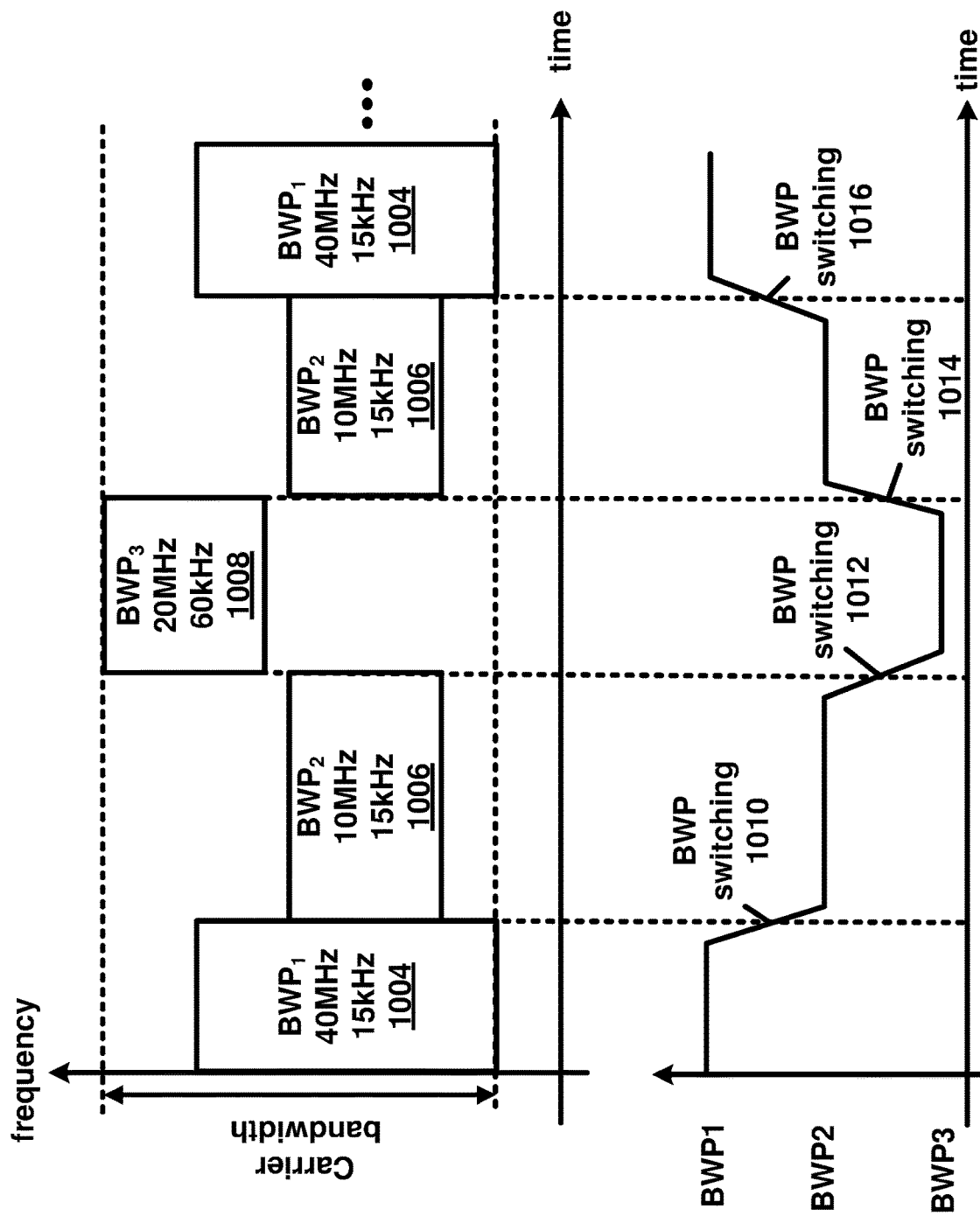
FIG. 10 shows example adaptation and switching of bandwidth parts in accordance with several of various embodiments of the present disclosure.

FIG. 10 shows an example of bandwidth part adaptation and switching. In this example, three BWPs ($BWP_1$ 1004, $BWP_2$ 1006 and $BWP_3$ 1008) are configured for a UE on a carrier bandwidth. The $BWP_1$ is configured with a bandwidth of 40 MHz and a numerology with subcarrier spacing of 15 KHz, the $BWP_2$ is configured with a bandwidth of 10 MHz and a numerology with subcarrier spacing of 15 KHz and the $BWP_3$ is configured with a bandwidth of 20 MHz and a subcarrier spacing of 60 KHz. The wireless device may switch from a first BWP (e.g., $BWP_1$) to a second BWP (e.g., $BWP_2$). An active BWP of the cell may change from the first BWP to the second BWP in response to the BWP switching.

The BWP switching (e.g., BWP switching 1010, BWP switching 1012, BWP switching 1014, or BWP switching 1016 in FIG. 10) may be based on a command from the base station. The command may be a DCI comprising scheduling information for the UE in the second BWP. In case of uplink BWP switching, the first BWP and the second BWP may be uplink BWPs and the scheduling information may be an uplink grant for uplink transmission via the second BWP. In case of downlink BWP switching, the first BWP and the second BWP may be downlink BWPs and the scheduling information may be a downlink assignment for downlink reception via the second BWP.

The BWP switching (e.g., BWP switching 1010, BWP switching 1012, BWP switching 1014, or BWP switching 1016 in FIG. 10) may be based on an expiry of a timer. The base station may configure a wireless device with a BWP inactivity timer and the wireless device may switch to a default BWP (e.g., default downlink BWP) based on the expiry of the BWP inactivity timer. The expiry of the BWP inactivity timer may be an indication of low activity on the current active downlink BWP. The base station may configure the wireless device with the default downlink BWP. If the base station does not configure the wireless device with the default BWP, the default BWP may be an initial downlink BWP. The initial active BWP may be the BWP that the wireless device receives scheduling information for remaining system information upon transition to an RRC_CONNECTED state.

A wireless device may monitor a downlink control channel of a downlink BWP. For example, the UE may monitor a set of PDCCH candidates in configured monitoring occasions in one or more configured COntrol REsource SETs (CORESETs) according to the corresponding search space configurations. A search space configuration may define how/where to search for PDCCH candidates. For example, the search space configuration parameters may comprise a monitoring periodicity and offset parameter indicating the slots for monitoring the PDCCH candidates. The search space configuration parameters may further comprise a parameter indicating a first symbol with a slot within the slots determined for monitoring PDCCH candidates. A search space may be associated with one or more CORESETs and the search space configuration may indicate one or more identifiers of the one or more CORESETs. The search space configuration parameters may further indicate that whether the search space is a common search space or a UE-specific search space. A common search space may be monitored by a plurality of wireless devices and a UE-specific search space may be dedicated to a specific UE.

Figure 11A:
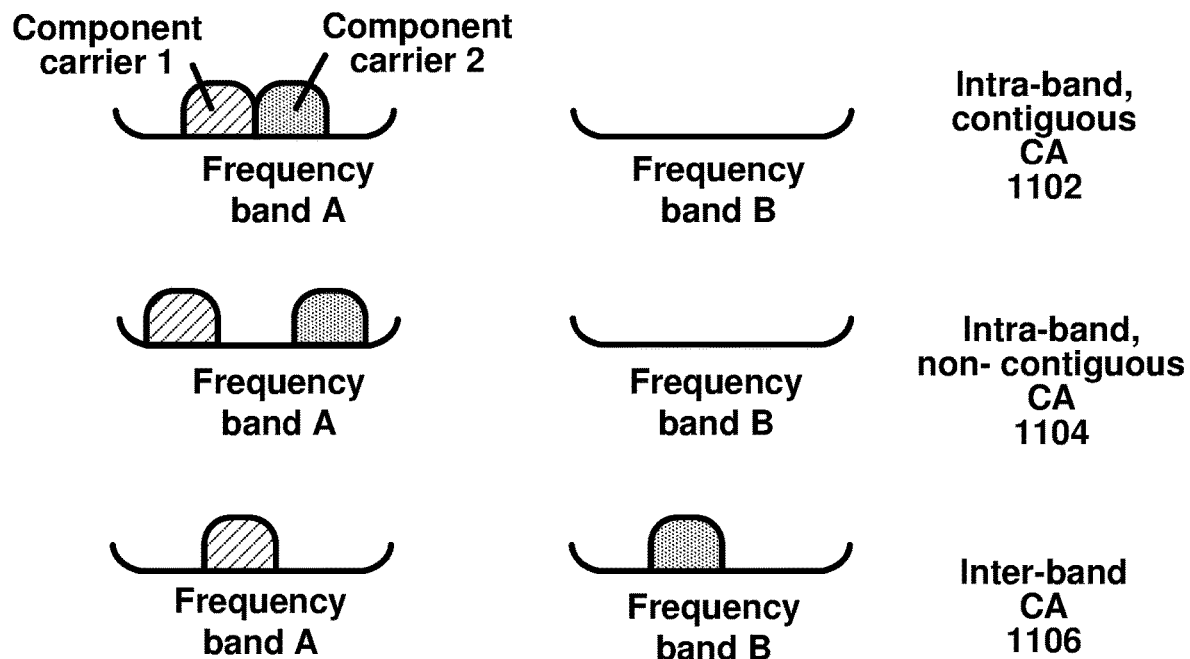
FIG. 11A shows example arrangements of carriers in carrier aggregation in accordance with several of various embodiments of the present disclosure.

FIG. 11A shows example arrangements of carriers in carrier aggregation in accordance with several of various embodiments of the present disclosure. With carrier aggregation, multiple NR component carriers (CCs) may be aggregated. Downlink transmissions to a wireless device may take place simultaneously on the aggregated downlink CCs resulting in higher downlink data rates. Uplink transmissions from a wireless device may take place simultaneously on the aggregated uplink CCs resulting in higher uplink data rates. The component carriers in carrier aggregation may be on the same frequency band (e.g., intra-band carrier aggregation) or on different frequency bands (e.g., inter-band carrier aggregation). The component carriers may also be contiguous or non-contiguous. This results in three possible carrier aggregation scenarios, intra-band contiguous CA 1102, intra-band non-contiguous CA 1104 and inter-band CA 1106 as shown in FIG. 11A. Depending on the UE capability for carrier aggregation, a UE may transmit and/or receive on multiple carriers or for a UE that is not capable of carrier aggregation, the UE may transmit and/or receive on one component carrier at a time. In this disclosure, the carrier aggregation is described using the term cell and a carrier aggregation capable UE may transmit and/or receive via multiple cells.

In carrier aggregation, a UE may be configured with multiple cells. A cell of the multiple cells configured for the UE may be referred to as a Primary Cell (PCell). The PCell may be the first cell that the UE is initially connected to. One or more other cells configured for the UE may be referred to as Secondary Cells (SCells). The base station may configure a UE with multiple SCells. The configured SCells may be deactivated upon configuration and the base station may dynamically activate or deactivate one or more of the configured SCells based on traffic and/or channel conditions. The base station may activate or deactivate configured SCells using a SCell Activation/Deactivation MAC CE. The SCell Activation/Deactivation MAC CE may comprise a bitmap, wherein each bit in the bitmap may correspond to a SCell and the value of the bit indicates an activation status or deactivation status of the SCell.

An SCell may also be deactivated in response to expiry of a SCell deactivation timer of the SCell. The expiry of an SCell deactivation timer of an SCell may be an indication of low activity (e.g., low transmission or reception activity) on the SCell. The base station may configure the SCell with an SCell deactivation timer. The base station may not configure an SCell deactivation timer for an SCell that is configured with PUCCH (also referred to as a PUCCH SCell). The configuration of the SCell deactivation timer may be per configured SCell and different SCells may be configured with different SCell deactivation timer values. The SCell deactivation timer may be restarted based on one or more criteria including reception of downlink control information on the SCell indicating uplink grant or downlink assignment for the SCell or reception of downlink control information on a scheduling cell indicating uplink grant or downlink assignment for the SCell or transmission of a MAC PDU based on a configured uplink grant or reception of a configured downlink assignment.

A PCell for a UE may be an SCell for another UE and a SCell for a UE may be PCell for another UE. The configuration of PCell may be UE-specific. One or more SCells of the multiple SCells configured for a UE may be configured as downlink-only SCells, e.g., may only be used for downlink reception and may not be used for uplink transmission. In case of self-scheduling, the base station may transmit signaling for uplink grants and/or downlink assignments on the same cell that the corresponding uplink or downlink transmission takes place. In case of cross-carrier scheduling, the base station may transmit signaling for uplink grants and/or downlink assignments on a cell different from the cell that the corresponding uplink or downlink transmission takes place.

Figure 11B:
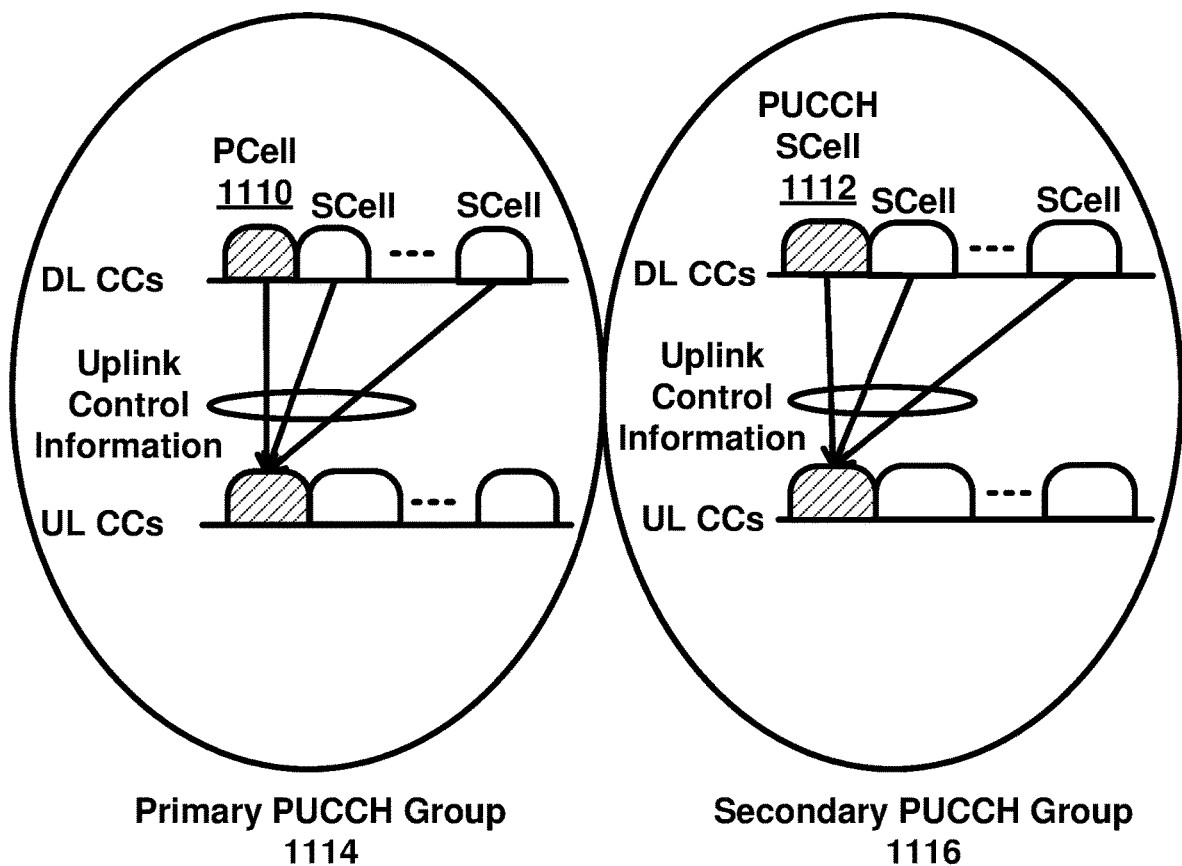
FIG. 11B shows examples of uplink control channel groups in accordance with several of various embodiments of the present disclosure.

FIG. 11B shows examples of uplink control channel groups in accordance with several of various embodiments of the present disclosure. A base station may configure a UE with multiple PUCCH groups wherein a PUCCH group comprises one or more cells. For example, as shown in FIG. 11B, the base station may configure a UE with a primary PUCCH group 1114 and a secondary PUCCH group 1116. The primary PUCCH group may comprise the PCell 1110 and one or more first SCells. First UCI corresponding to the PCell and the one or more first SCells of the primary PUCCH group may be transmitted by the PUCCH of the PCell. The first UCI may be, for example, HARQ feedback for downlink transmissions via downlink CCs of the PCell and the one or more first SCells. The secondary PUCCH group may comprise a PUCCH SCell and one or more second SCells. Second UCI corresponding to the PUCCH SCell and the one or more second SCells of the secondary PUCCH group may be transmitted by the PUCCH of the PUCCH SCell. The second UCI may be, for example, HARQ feedback for downlink transmissions via downlink CCs of the PUCCH SCell and the one or more second SCells.

Figures 12A, 12B, 12C:
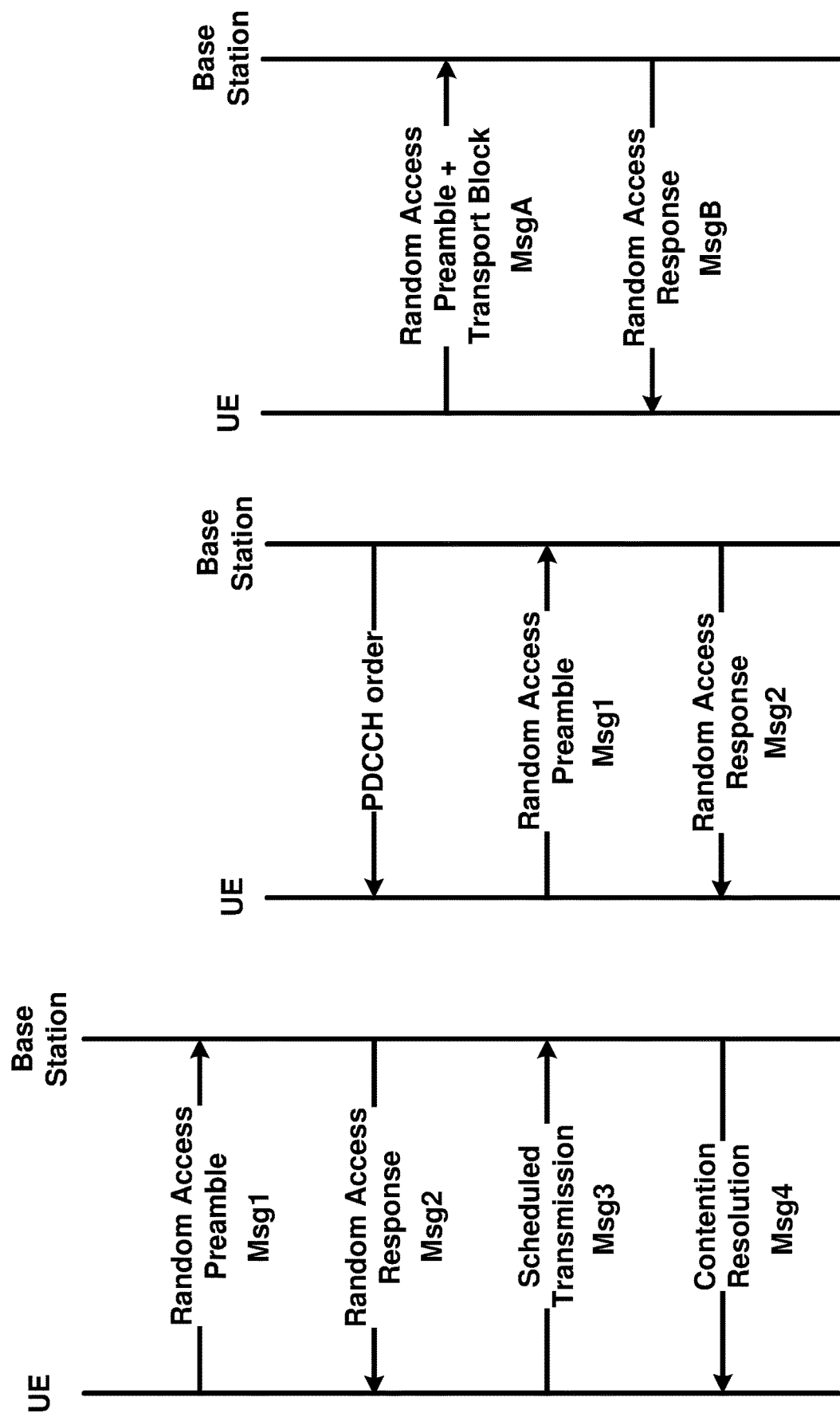
FIG. 12A, FIG. 12B and FIG. 12C show example random access processes in accordance with several of various embodiments of the present disclosure.

FIG. 12A, FIG. 12B and FIG. 12C show example random access processes in accordance with several of various embodiments of the present disclosure. FIG. 12A shows an example of four step contention-based random access (CBRA) procedure. The four-step CBRA procedure includes exchanging four messages between a UE and a base station. Msg1 may be for transmission (or retransmission) of a random access preamble by the wireless device to the base station. Msg2 may be the random access response (RAR) by the base station to the wireless device. Msg3 is the scheduled transmission based on an uplink grant indicated in Msg2 and Msg4 may be for contention resolution.

The base station may transmit one or more RRC messages comprising configuration parameters of the random access parameters. The random access parameters may indicate radio resources (e.g., time-frequency resources) for transmission of the random access preamble (e.g., Msg1), configuration index, one or more parameters for determining the power of the random access preamble (e.g., a power ramping parameter, a preamble received target power, etc.), a parameter indicating maximum number of preamble transmission, RAR window for monitoring RAR, cell-specific random access parameters and UE specific random access parameters. The UE-specific random access parameters may indicate one or more PRACH occasions for random access preamble (e.g., Msg1) transmissions. The random access parameters may indicate association between the PRACH occasions and one or more reference signals (e.g., SSB or CSI-RS). The random access parameters may further indicate association between the random access preambles and one or more reference signals (e.g., SBB or CSI-RS). The UE may use one or more reference signals (e.g., SSB(s) or CSI-RS(s)) and may determine a random access preamble to use for Msg1 transmission based on the association between the random access preambles and the one or more reference signals. The UE may use one or more reference signals (e.g., SSB(s) or CSI-RS(s)) and may determine the PRACH occasion to use for Msg1 transmission based on the association between the PRACH occasions and the reference signals. The UE may perform a retransmission of the random access preamble if no response is received with the RAR window following the transmission of the preamble. UE may use a higher transmission power for retransmission of the preamble. UE may determine the higher transmission power of the preamble based on the power ramping parameter.

Msg2 is for transmission of RAR by the base station. Msg2 may comprise a plurality of RARs corresponding to a plurality of random access preambles transmitted by a plurality of UEs. Msg2 may be associated with a random access temporary radio identifier (RA-RNTI) and may be received in a common search space of the UE. The RA-RNTI may be based on the PRACH occasion (e.g., time and frequency resources of a PRACH) in which a random access preamble is transmitted. RAR may comprise a timing advance command for uplink timing adjustment at the UE, an uplink grant for transmission of Msg3 and a temporary C-RNTI. In response to the successful reception of Msg2, the UE may transmit the Msg3. Msg3 and Msg4 may enable contention resolution in case of CBRA. In a CBRA, a plurality of UEs may transmit the same random access preamble and may consider the same RAR as being corresponding to them. UE may include a device identifier in Msg3 (e.g., a C-RNTI, temporary C-RNTI or other UE identity). Base station may transmit the Msg4 with a PDSCH and UE may assume that the contention resolution is successful in response to the PDSCH used for transmission of Msg4 being associated with the UE identifier included in Msg3.

FIG. 12B shows an example of a contention-free random access (CFRA) process. Msg 1 (random access preamble) and Msg 2 (random access response) in FIG. 12B for CFRA may be analogous to Msg 1 and Msg 2 in FIG. 12A for CBRA. In an example, the CFRA procedure may be initiated in response to a PDCCH order from a base station. The PDCCH order for initiating the CFRA procedure by the wireless device may be based on a DCI having a first format (e.g., format 1_0). The DCI for the PDCCH order may comprise a random access preamble index, an UL/SUL indicator indicating an uplink carrier of a cell (e.g., normal uplink carrier or supplementary uplink carrier) for transmission of the random access preamble, a SS/PBCH index indicating the SS/PBCH that may be used to determine a RACH occasion for PRACH transmission, a PRACH mask index indicating the RACH occasion associated with the SS/PBCH indicated by the SS/PBCH index for PRACH transmission, etc. In an example, the CFRA process may be started in response to a beam failure recovery process. The wireless device may start the CFRA for the beam failure recovery without a command (e.g., PDCCH order) from the base station and by using the wireless device dedicated resources.

FIG. 12C shows an example of a two-step random access process comprising two messages exchanged between a wireless device and a base station. Msg A may be transmitted by the wireless device to the base station and may comprise one or more transmissions of a preamble and/or one or more transmissions of a transport block. The transport block in Msg A and Msg 3 in FIG. 12A may have similar and/or equivalent contents. The transport block of Msg A may comprise data and control information (e.g., SR, HARQ feedback, etc.). In response to the transmission of Msg A, the wireless device may receive Msg B from the base station. Msg B in FIG. 12C and Msg 2 (e.g., RAR) illustrated in FIGS. 12A and 12B may have similar and/or equivalent content.

The base station may periodically transmit synchronization signals (SSs), e.g., primary SS (PSS) and secondary SS (SSS) along with PBCH on each NR cell. The PSS/SSS together with PBCH is jointly referred to as a SS/PBCH block. The SS/PBCH block enables a wireless device to find a cell when entering to the mobile communications network or find new cells when moving within the network. The SS/PBCH block spans four OFDM symbols in time domain. The PSS is transmitted in the first symbol and occupies 127 subcarriers in frequency domain. The SSS is transmitted in the third OFDM symbol and occupies the same 127 subcarriers as the PSS. There are eight and nine empty subcarriers on each side of the SSS. The PBCH is transmitted on the second OFDM symbol occupying 240 subcarriers, the third OFDM symbol occupying 48 subcarriers on each side of the SSS, and on the fourth OFDM symbol occupying 240 subcarriers. Some of the PBCH resources indicated above may be used for transmission of the demodulation reference signal (DMRS) for coherent demodulation of the PBCH. The SS/PBCH block is transmitted periodically with a period ranging from 5 ms to 160 ms. For initial cell search or for cell search during inactive/idle state, a wireless device may assume that that the SS/PBCH block is repeated at least every 20 ms.

In NR, transmissions using of antenna arrays, with many antenna elements, and beamforming plays an important role specially in higher frequency bands. Beamforming enables higher capacity by increasing the signal strength (e.g., by focusing the signal energy in a specific direction) and by lowering the amount interference received at the wireless devices. The beamforming techniques may generally be divided to analog beamforming and digital beamforming techniques. With digital beamforming, signal processing for beamforming is carried out in the digital domain before digital-to-analog conversion and detailed control of both amplitude and phase of different antenna elements may be possible. With analog beamforming, the signal processing for beamforming is carried out in the analog domain and after the digital to analog conversion. The beamformed transmissions may be in one direction at a time. For example, the wireless devices that are in different directions relative to the base station may receive their downlink transmissions at different times. For analog receiver-side beamforming, the receiver may focus its receiver beam in one direction at a time.

In NR, the base station may use beam sweeping for transmission of SS/PBCH blocks. The SS/PBCH blocks may be transmitted in different beams using time multiplexing. The set of SS/PBCH blocks that are transmitted in one beam sweep may be referred to as a SS/PBCH block set. The period of PBCH/SSB block transmission may be a time duration between a SS/PBCH block transmission in a beam and the next SS/PBCH block transmission in the same beam. The period of SS/PBCH block is, therefore, also the period of the SS/PBCH block set.

Figure 13A:
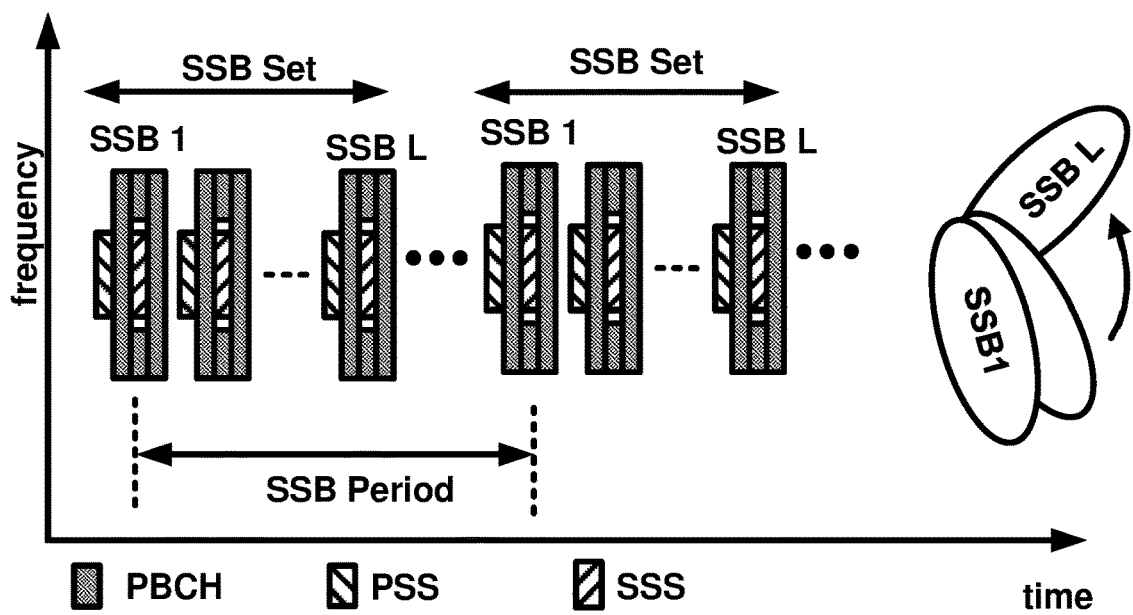
FIG. 13A shows example time and frequency structure of SSBs and their associations with beams in accordance with several of various embodiments of the present disclosure.

FIG. 13A shows example time and frequency structure of SS/PBCH blocks and their associations with beams in accordance with several of various embodiments of the present disclosure. In this example, a SS/PBCH block (also referred to as SSB) set comprise L SSBs wherein an SSB in the SSB set is associated with (e.g., transmitted in) one of L beams of a cell. The transmission of SBBs of an SSB set may be confined within a 5 ms interval, either in a first half-frame or a second half-frame of a 10 ms frame. The number of SSBs in an SSB set may depend on the frequency band of operation. For example, the number of SSBs in a SSB set may be up to four SSBs in frequency bands below 3 GHz enabling beam sweeping of up to four beams, up to eight SSBs in frequency bands between 3 GHz and 6 GHz enabling beam sweeping of up to eight beams, and up to sixty four SSBs in higher frequency bands enabling beam sweeping of up to sixty four beams. The SSs of an SSB may depend on a physical cell identity (PCI) of the cell and may be independent of which beam of the cell is used for transmission of the SSB. The PBCH of an SSB may indicate a time index parameter and the wireless device may determine the relative position of the SSB within the SSB set using the time index parameter. The wireless device may use the relative position of the SSB within an SSB set for determining the frame timing and/or determining RACH occasions for a random access process.

A wireless device entering the mobile communications network may first search for the PSS. After detecting the PSS, the wireless device may determine the synchronization up to the periodicity of the PSS. By detecting the PSS, the wireless device may determine the transmission timing of the SSS. The wireless device may determine the PCI of the cell after detecting the SSS. The PBCH of a SS/PBCH block is a downlink physical channel that carries the MIB. The MIB may be used by the wireless device to obtain remaining system information (RMSI) that is broadcast by the network. The RMSI may include System Information Block 1 (SIB1) that contains information required for the wireless device to access the cell.

As discussed earlier, the wireless device may determine a time index parameter from the SSB. The PBCH comprises a half-frame parameter indicating whether the SSB is in the first 5 ms half or the second 5 ms half of a 10 ms frame. The wireless device may determine the frame boundary using the time index parameter and the half-frame parameter. In addition, the PBCH may comprise a parameter indicating the system frame number (SFN) of the cell.

The base station may transmit CSI-RS and a UE may measure the CSI-RS to obtain channel state information (CSI). The base station may configure the CSI-RS in a UE-specific manner. In some scenarios, same set of CSI-RS resources may be configured for multiple UEs and one or more resource elements of a CSI-RS resource may be shared among multiple UEs. A CSI-RS resource may be configured such that it does not collide with a CORESET configured for the wireless device and/or with a DMRS of a PDSCH scheduled for the wireless device and/or transmitted SSBs. The UE may measure one or more CSI-RSs configured for the UE and may generate a CSI report based on the CSI-RS measurements and may transmit the CSI report to the base station for scheduling, link adaptation and/or other purposes.

NR supports flexible CSI-RS configurations. A CSI-RS resource may be configured with single or multiple antenna ports and with configurable density. Based on the number of configured antenna ports, a CSI-RS resource may span different number of OFDM symbols (e.g., 1, 2, and 4 symbols). The CSI-RS may be configured for a downlink BWP and may use the numerology of the downlink BWP. The CSI-RS may be configured to cover the full bandwidth of the downlink BWP or a portion of the downlink BWP. In some case, the CSI-RS may be repeated in every resource block of the CSI-RS bandwidth, referred to as CSI-RS with density equal to one. In some cases, the CSI-RS may be configured to be repeated in every other resource block of the CSI-RS bandwidth. CSI-RS may be non-zero power (NZP) CSI-RS or zero-power (ZP) CSI-RS.

The base station may configure a wireless device with one or more sets of NZP CSI-RS resources. The base station may configure the wireless device with a NZP CSI-RS resource set using an RRC information element (IE) NZP-CSI-RS-ResourceSet indicating a NZP CSI-RS resource set identifier (ID) and parameters specific to the NZP CSI-RS resource set. An NZP CSI-RS resource set may comprise one or more CSI-RS resources. An NZP CSI-RS resource set may be configured as part of the CSI measurement configuration.

The CSI-RS may be configured for periodic, semi-persistent or aperiodic transmission. In case of the periodic and semi-persistent CSI-RS configurations, the wireless device may be configured with a CSI resource periodicity and offset parameter that indicate a periodicity and corresponding offset in terms of number of slots. The wireless device may determine the slots that the CSI-RSs are transmitted. For semi-persistent CSI-RS, the CSI-RS resources for CSI-RS transmissions may be activated and deactivated by using a semi-persistent (SP) CSI-CSI Resource Set Activation/Deactivation MAC CE. In response to receiving a MAC CE indicating activation of semi-persistent CSI-RS resources, the wireless device may assume that the CSI-RS transmissions will continue until the CSI-RS resources for CSI-RS transmissions are activated.

As discussed before, CSI-RS may be configured for a wireless device as NZP CSI-RS or ZP CSI-RS. The configuration of the ZP CSI-RS may be similar to the NZP CSI-RS with the difference that the wireless device may not carry out measurements for the ZP CSI-RS. By configuring ZP CSI-RS, the wireless device may assume that a scheduled PDSCH that includes resource elements from the ZP CSI-RS is rate matched around those ZP CSI-RS resources. For example, a ZP CSI-RS resource configured for a wireless device may be an NZP CSI-RS resource for another wireless device. For example, by configuring ZP CSI-RS resources for the wireless device, the base station may indicate to the wireless device that the PDSCH scheduled for the wireless device is rate matched around the ZP CSI-RS resources.

A base station may configure a wireless device with channel state information interference measurement (CSI-IM) resources. Similar to the CSI-RS configuration, configuration of locations and density of CSI-IM resources may be flexible. The CSI-IM resources may be periodic (configured with a periodicity), semi-persistent (configured with a periodicity and activated and deactivated by MAC CE) or aperiodic (triggered by a DCI).

Tracking reference signals (TRSs) may be configured for a wireless device as a set of sparse reference signals to assist the wireless in time and frequency tracking and compensating time and frequency variations in its local oscillator. The wireless device may further use the TRSs for estimating channel characteristics such as delay spread or doppler frequency. The base station may use a CSI-RS configuration for configuring TRS for the wireless device. The TRS may be configured as a resource set comprising multiple periodic NZP CSI-RS resources.

A base station may configure a UE and the UE may transmit sounding reference signals (SRSs) to enable uplink channel sounding/estimation at the base station. The SRS may support up to four antenna ports and may be designed with low cubic metric enabling efficient operation of the wireless device amplifier. The SRS may span one or more (e.g., one, two or four) consecutive OFDM symbols in time domain and may be located within the last n (e.g., six) symbols of a slot. In the frequency domain, the SRS may have a structure that is referred to as a comb structure and may be transmitted on every Nth subcarrier. Different SRS transmissions from different wireless devices may have different comb structures and may be multiplexed in frequency domain.

A base station may configure a wireless device with one or more SRS resource sets and an SRS resource set may comprise one or more SRS resources. The SRS resources in an SRS resources set may be configured for periodic, semi-persistent or aperiodic transmission. The periodic SRS and the semi-persistent SRS resources may be configured with periodicity and offset parameters. The Semi-persistent SRS resources of a configured semi-persistent SRS resource set may be activated or deactivated by a semi-persistent (SP) SRS Activation/Deactivation MAC CE. The set of SRS resources included in an aperiodic SRS resource set may be activated by a DCI. A value of a field (e.g., an SRS request field) in the DCI may indicate activation of resources in an aperiodic SRS resource set from a plurality of SRS resource sets configured for the wireless device.

An antenna port may be associated with one or more reference signals. The receiver may assume that the one or more reference signals, associated with the antenna port, may be used for estimating channel corresponding to the antenna port. The reference signals may be used to derive channel state information related to the antenna port. Two antenna ports may be referred to as quasi co-located if characteristics (e.g., large-scale properties) of the channel over which a symbol is conveyed on one antenna port may be inferred from the channel over which a symbol is conveyed from another antenna port. For example, a UE may assume that radio channels corresponding to two different antenna ports have the same large-scale properties if the antenna ports are specified as quasi co-located. In some cases, the UE may assume that two antenna ports are quasi co-located based on signaling received from the base station. Spatial quasi-colocation (QCL) between two signals may be, for example, due to the two signals being transmitted from the same location and in the same beam. If a receive beam is good for a signal in a group of signals that are spatially quasi co-located, it may be assumed also be good for the other signals in the group of signals.

The CSI-RS in the downlink and the SRS in uplink may serve as quasi-location (QCL) reference for other physical downlink channels and physical uplink channels, respectively. For example, a downlink physical channel (e.g., PDSCH or PDCCH) may be spatially quasi co-located with a downlink reference signal (e.g., CSI-RS or SSB). The wireless device may determine a receive beam based on measurement on the downlink reference signal and may assume that the determined received beam is also good for reception of the physical channels (e.g., PDSCH or PDCCH)

that are spatially quasi co-located with the downlink reference signal. Similarly, an uplink physical channel (e.g., PUSCH or PUCCH) may be spatially quasi co-located with an uplink reference signal (e.g., SRS). The base station may determine a receive beam based on measurement on the uplink reference signal and may assume that the determined received beam is also good for reception of the physical channels (e.g., PUSCH or PUCCH) that are spatially quasi co-located with the uplink reference signal.

The Demodulation Reference Signals (DM-RSs) enables channel estimation for coherent demodulation of downlink physical channels (e.g., PDSCH, PDCCH and PBH) and uplink physical channels (e.g., PUSCH and PUCCH). The DM-RS may be located early in the transmission (e.g., front-loaded DM-RS) and may enable the receiver to obtain the channel estimate early and reduce the latency. The time-domain structure of the DM-RS (e.g., symbols wherein the DM-RS are located in a slot) may be based on different mapping types.

The Phase Tracking Reference Signals (PT-RSs) enables tracking and compensation of phase variations across the transmission duration. The phase variations may be, for example, due to oscillator phase noise. The oscillator phase noise may become more sever in higher frequencies (e.g., mmWave frequency bands). The base station may configure the PT-RS for uplink and/or downlink. The PT-RS configuration parameters may indicate frequency and time density of PT-RS, maximum number of ports (e.g., uplink ports), resource element offset, configuration of uplink PT-RS without transform precoder (e.g., CP-OFDM) or with transform precoder (e.g., DFT-s-OFDM), etc. The subcarrier number and/or resource blocks used for PT-RS transmission may be based on the C-RNTI of the wireless device to reduce risk of collisions between PT-RSs of wireless devices scheduled on overlapping frequency domain resources.

Figure 13B:
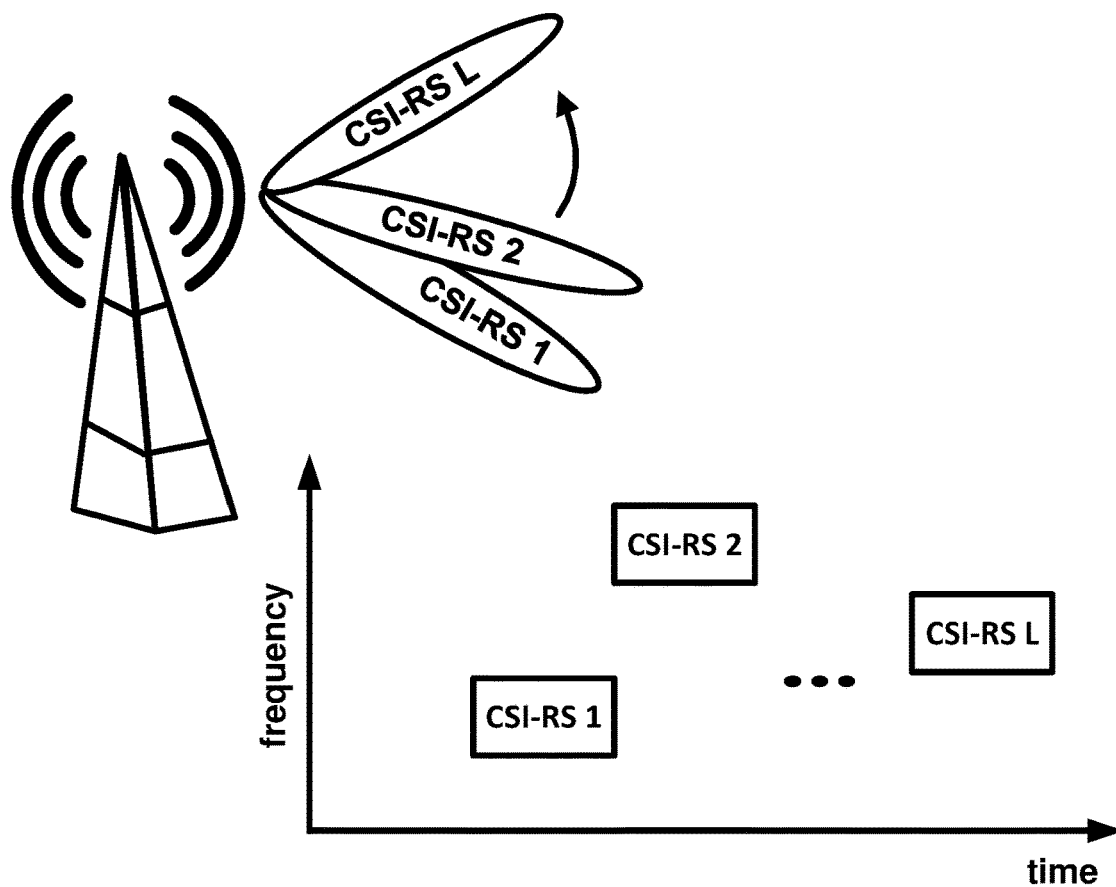
FIG. 13B shows example time and frequency structure of CSI-RSs and their association with beams in accordance with several of various embodiments of the present disclosure.

FIG. 13B shows example time and frequency structure of CSI-RSs and their association with beams in accordance with several of various embodiments of the present disclosure. A beam of the L beams shown in FIG. 13B may be associated with a corresponding CSI-RS resource. The base station may transmit the CSI-RSs using the configured CSI-RS resources and a UE may measure the CSI-RSs (e.g., received signal received power (RSRP) of the CSI-RSs) and report the CSI-RS measurements to the base station based on a reporting configuration. For example, the base station may determine one or more transmission configuration indication (TCI) states and may indicate the one or more TCI states to the UE (e.g., using RRC signaling, a MAC CE and/or a DCI). Based on the one or more TCI states indicated to the UE, the UE may determine a downlink receive beam and receive downlink transmissions using the receive beam. In case of a beam correspondence, the UE may determine a spatial domain filter of a transmit beam based on spatial domain filter of a corresponding receive beam. Otherwise, the UE may perform an uplink beam selection procedure to determine the spatial domain filter of the transmit beam. The UE may transmit one or more SRSs using the SRS resources configured for the UE and the base station may measure the SRSs and determine/select the transmit beam for the UE based the SRS measurements. The base station may indicate the selected beam to the UE. The CSI-RS resources shown in FIG. 13B may be for one UE. The base station may configure different CSI-RS resources associated with a given beam for different UEs by using frequency division multiplexing.

A base station and a wireless device may perform beam management procedures to establish beam pairs (e.g., transmit and receive beams) that jointly provide good connectivity. For example, in the downlink direction, the UE may perform measurements for a beam pair and estimate channel quality for a transmit beam by the base station (or a transmission reception point (TRP) more generally) and the receive beam by the UE. The UE may transmit a report indicating beam pair quality parameters. The report may comprise one or more parameters indicating one or more beams (e.g., a beam index, an identifier of reference signal associated with a beam, etc.), one or more measurement parameters (e.g., RSRP), a precoding matrix indicator (PMI), a channel quality indicator (CQI), and/or a rank indicator (RI).

Figure 14A:
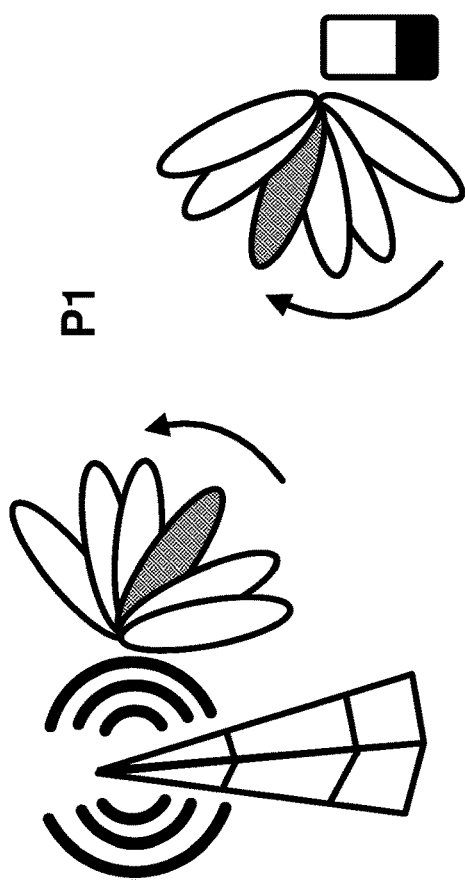
FIG. 14A, FIG. 14B and FIG. 14C show example beam management processes in accordance with several of various embodiments of the present disclosure.
Figure 14C:
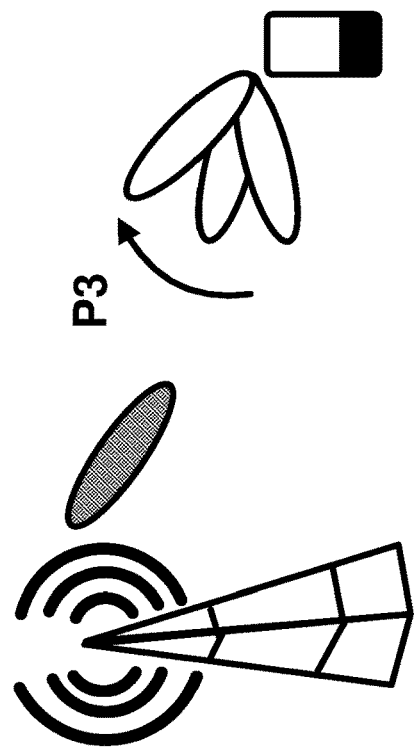
Figure 14B:
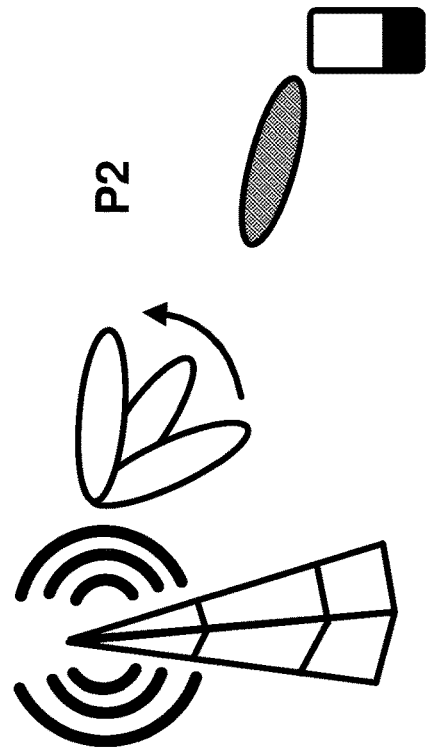

FIG. 14A, FIG. 14B and FIG. 14C show example beam management processes (referred to as P1, P2 and P3, respectively) in accordance with several of various embodiments of the present disclosure. The P1 process shown in FIG. 14A may enable, based on UE measurements, selection of a base station (or TRP more generally) transmit beam and/or a wireless device receive beam. The TRP may perform a beam sweeping procedure where the TRP may sequentially transmit reference signals (e.g., SSB and/or CSI-RS) on a set of beams and the UE may select a beam from the set of beams and may report the selected beam to the TRP. The P2 procedure as shown in FIG. 14B may be a beam refinement procedure. The selection of the TRP transmit beam and the UE receive beam may be regularly reevaluated due to movements and/or rotations of the UE or movement of other objects. In an example, the base station may perform the beam sweeping procedure over a smaller set of beams and the UE may select the best beam over the smaller set. In an example, the beam shape may be narrower compared to beam selected based on the P1 procedure. Using the P3 procedure as shown in FIG. 14C, the TRP may fix its transmit beam and the UE may refine its receive beam.

A wireless device may receive one or more messages from a base station. The one or more messages may comprise one or more RRC messages. The one or more messages may comprise configuration parameters of a plurality of cells for the wireless device. The plurality of cells may comprise a primary cell and one or more secondary cells. For example, the plurality of cells may be provided by a base station and the wireless device may communicate with the base station using the plurality of cells. For example, the plurality of cells may be provided by multiple base station (e.g., in case of dual and/or multi-connectivity). The wireless device may communicate with a first base station, of the multiple base stations, using one or more first cells of the plurality of cells. The wireless device may communicate with a second base station of the multiple base stations using one or more second cells of the plurality of cells.

The one or more messages may comprise configuration parameters used for processes in physical, MAC, RLC, PCDP, SDAP, and/or RRC layers of the wireless device. For example, the configuration parameters may include values of timers used in physical, MAC, RLC, PCDP, SDAP, and/or RRC layers. For example, the configuration parameters may include parameters for configurating different channels (e.g., physical layer channel, logical channels, RLC channels, etc.) and/or signals (e.g., CSI-RS, SRS, etc.).

Upon starting a timer, the timer may start running until the timer is stopped or until the timer expires. A timer may be restarted if it is running. A timer may be started if it is not running (e.g., after the timer is stopped or after the timer expires). A timer may be configured with or may be associated with a value (e.g., an initial value). The timer may be started or restarted with the value of the timer. The value of the timer may indicate a time duration that the timer may be running upon being started or restarted and until the timer expires. The duration of a timer may not be updated until the timer is stopped or expires (e.g., due to BWP switching). This specification may disclose a process that includes one or more timers. The one or more timers may be implemented in multiple ways. For example, a timer may be used by the wireless device and/or base station to determine a time window [t1, t2], wherein the timer is started at time t1 and expires at time t2 and the wireless device and/or the base station may be interested in and/or monitor the time window [t1, t2], for example to receive a specific signaling. Other examples of implementation of a timer may be provided.

Figure 15:
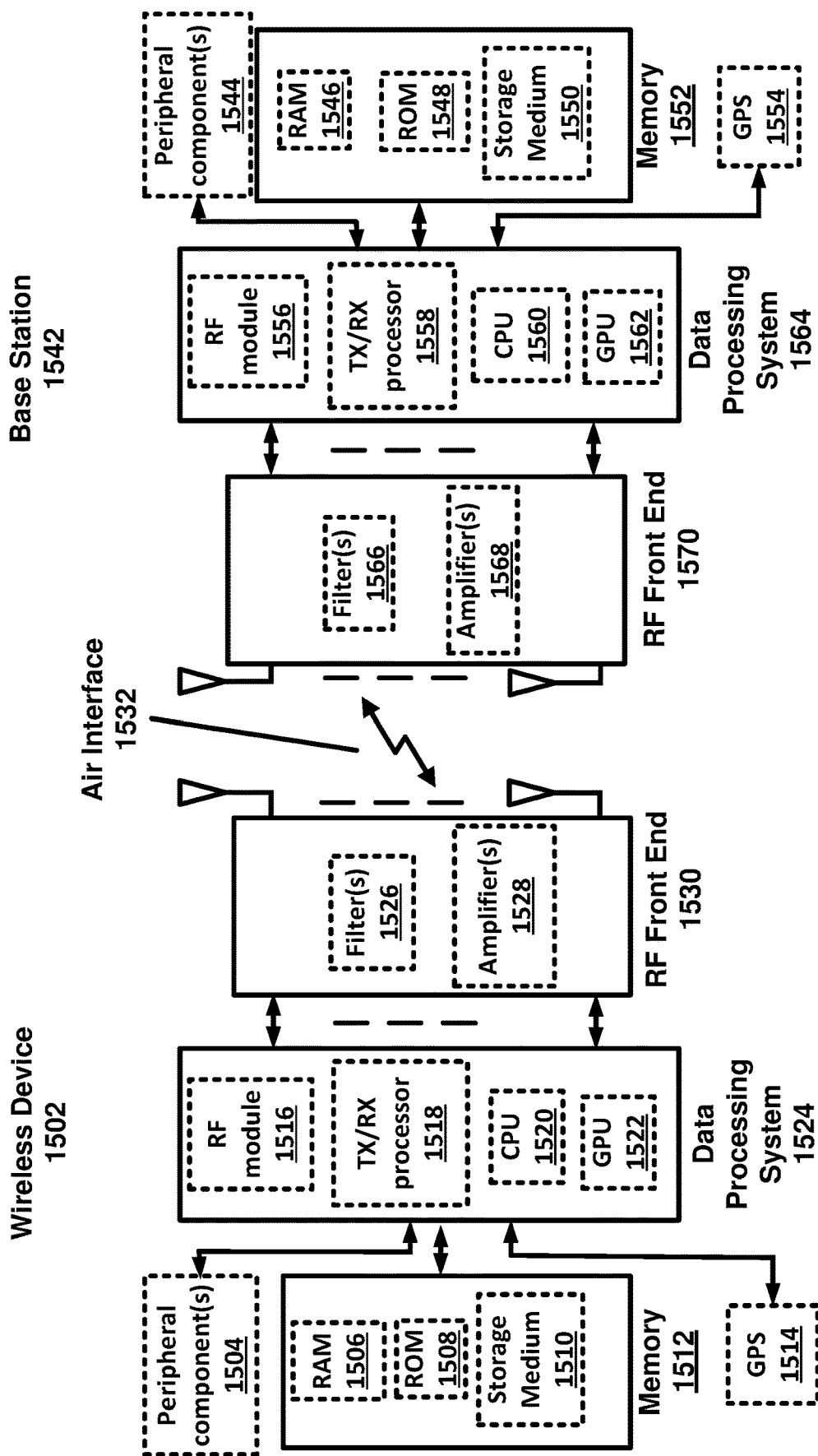
FIG. 15 shows example components of a wireless device and a base station that are in communication via an air interface in accordance with several of various embodiments of the present disclosure.

FIG. 15 shows example components of a wireless device and a base station that are in communication via an air interface in accordance with several of various embodiments of the present disclosure. The wireless device 1502 may communicate with the base station 1542 over the air interface 1532. The wireless device 1502 may include a plurality of antennas. The base station 1542 may include a plurality of antennas. The plurality of antennas at the wireless device 1502 and/or the base station 1542 enables different types of multiple antenna techniques such as beamforming, single-user and/or multi-user MIMO, etc.

The wireless device 1502 and the base station 1542 may have one or more of a plurality of modules/blocks, for example RF front end (e.g., RF front end 1530 at the wireless device 1502 and RF front end 1570 at the base station 1542), Data Processing System (e.g., Data Processing System 1524 at the wireless device 1502 and Data Processing System 1564 at the base station 1542), Memory (e.g., Memory 1512 at the wireless device 1502 and Memory 1542 at the base station 1542). Additionally, the wireless device 1502 and the base station 1542 may have other modules/blocks such as GPS (e.g., GPS 1514 at the wireless device 1502 and GPS 1554 at the base station 1542).

An RF front end module/block may include circuitry between antennas and a Data Processing System for proper conversion of signals between these two modules/blocks. An RF front end may include one or more filters (e.g., Filter(s) 1526 at RF front end 1530 or Filter(s) 1566 at the RF front end 1570), one or more amplifiers (e.g., Amplifier(s) 1528 at the RF front end 1530 and Amplifier(s) 1568 at the RF front end 1570). The Amplifier(s) may comprise power amplifier(s) for transmission and low-noise amplifier(s) (LNA(s)) for reception.

The Data Processing System 1524 and the Data Processing System 1564 may process the data to be transmitted or the received signals by implementing functions at different layers of the protocol stack such as PHY, MAC, RLC, etc. Example PHY layer functions that may be implemented by the Data Processing System 1524 and/or 1564 may include forward error correction, interleaving, rate matching, modulation, precoding, resource mapping, MIMO processing, etc. Similarly, one or more functions of the MAC layer, RLC layer and/or other layers may be implemented by the Data Processing System 1524 and/or the Data Processing System 1564. One or more processes described in the present disclosure may be implemented by the Data Processing System 1524 and/or the Data Processing System 1564. A Data Processing System may include an RF module (RF module 1516 at the Data Processing System 1524 and RF module 1556 at the Data Processing System 1564) and/or a TX/RX processor (e.g., TX/RX processor 1518 at the Data Processing System 1524 and TX/RX processor 1558 at the Data Processing System 1566) and/or a central processing unit (CPU) (e.g., CPU 1520 at the Data Processing System 1524 and CPU 1560 at the Data Processing System 1564) and/or a graphical processing unit (GPU) (e.g., GPU 1522 at the Data Processing System 1524 and GPU 1562 at the Data Processing System 1564).

The Memory 1512 may have interfaces with the Data Processing System 1524 and the Memory 1552 may have interfaces with Data Processing System 1564, respectively. The Memory 1512 or the Memory 1552 may include non-transitory computer readable mediums (e.g., Storage Medium 1510 at the Memory 1512 and Storage Medium 1550 at the Memory 1552) that may store software code or instructions that may be executed by the Data Processing System 1524 and Data Processing System 1564, respectively, to implement the processes described in the present disclosure. The Memory 1512 or the Memory 1552 may include random-access memory (RAM) (e.g., RAM 1506 at the Memory 1512 or RAM 1546 at the Memory 1552) or read-only memory (ROM) (e.g., ROM 1508 at the Memory 1512 or ROM 1548 at the Memory 1552) to store data and/or software codes.

The Data Processing System 1524 and/or the Data Processing System 1564 may be connected to other components such as a GPS module 1514 and a GPS module 1554, respectively, wherein the GPS module 1514 and a GPS module 1554 may enable delivery of location information of the wireless device 1502 to the Data Processing System 1524 and location information of the base station 1542 to the Data Processing System 1564. One or more other peripheral components (e.g., Peripheral Component(s) 1504 or Peripheral Component(s) 1544) may be configured and connected to the data Processing System 1524 and data Processing System 1564, respectively.

In example embodiments, a wireless device may be configured with parameters and/or configuration arrangements. For example, the configuration of the wireless device with parameters and/or configuration arrangements may be based on one or more control messages that may be used to configure the wireless device to implement processes and/or actions. The wireless device may be configured with the parameters and/or the configuration arrangements regardless of the wireless device being in operation or not in operation. For example, software, firmware, memory, hardware and/or a combination thereof and/or alike may be configured in a wireless device regardless of the wireless device being in operation or not operation. The configured parameters and/or settings may influence the actions and/or processes performed by the wireless device when in operation.

In example embodiments, a wireless device may receive one or more message comprising configuration parameters. For example, the one or more messages may comprise radio resource control (RRC) messages. A parameter of the configuration parameters may be in at least one of the one or more messages. The one or more messages may comprise information element (IEs). An information element may be a structural element that includes single or multiple fields. The fields in an IE may be individual contents of the IE. The terms configuration parameter, IE and field may be used equally in this disclosure. The IEs may be implemented using a nested structure, wherein an IE may include one or more other IEs and an IE of the one or more other IEs may include one or more additional IEs. With this structure, a parent IE contains all the offspring IEs as well. For example, a first IE containing a second IE, the second IE containing a third IE, and the third IE containing a fourth IE may imply that the first IE contains the third IE and the fourth IE.

In an example, the paging procedure may be used to transmit paging information to a UE in RRC_IDLE or RRC_INACTIVE. The network may initiate the paging procedure by transmitting the Paging message at the UE's paging occasion. The network may address multiple UEs within a Paging message by including one PagingRecord for each UE.

In an example, upon receiving the paging message, if in RRC_IDLE, for each of the PagingRecord, if any, included in the Paging message: if the ue-Identity included in the PagingRecord matches the UE identity allocated by upper layers: the UE may forward the ue-Identity and accessType (if present) to the upper layers.

In an example, upon receiving the paging message, if in RRC_INACTIVE, for each of the PagingRecord, if any, included in the Paging message: if the ue-Identity included in the PagingRecord matches the UE's stored fullI-RNTI: if the UE is configured by upper layers with Access Identity 1: the UE may initiate the RRC connection resumption procedure with resumeCause set to mps-PriorityAccess.

In an example, upon receiving the paging message, if in RRC_INACTIVE, for each of the PagingRecord, if any, included in the Paging message: if the ue-Identity included in the PagingRecord matches the UE's stored fullI-RNTI: if the UE is configured by upper layers with Access Identity 2: the UE may initiate the RRC connection resumption procedure according to 5.3.13 with resumeCause set to mcs-PriorityAccess.

In an example, upon receiving the paging message, if in RRC_INACTIVE, for each of the PagingRecord, if any, included in the Paging message: if the ue-Identity included in the PagingRecord matches the UE's stored fullI-RNTI: if the UE is configured by upper layers with one or more Access Identities equal to 11-15: the UE may initiate the RRC connection resumption procedure according to 5.3.13 with resumeCause set to highPriorityAccess.

In an example, upon receiving the paging message, if in RRC_INACTIVE, for each of the PagingRecord, if any, included in the Paging message: if the ue-Identity included in the PagingRecord matches the UE's stored fullI-RNTI: if the UE is not configured by higher layers with Access Identity 1, with Access identity 2, or with one or more Access Identities equal to 11-15: the UE may initiate the RRC connection resumption procedure with resumeCause set to mt-Access.

In an example, upon receiving the paging message, if in RRC_INACTIVE, for each of the PagingRecord, if any, included in the Paging message: if the ue-Identity included in the PagingRecord matches the UE identity allocated by upper layers: forward the ue-Identity to upper layers and accessType (if present) to the upper layers; and the UE may perform the actions upon going to RRC_IDLE with release cause 'other'.

In an example, the UE may initiate the RRC connection resume procedure when upper layers or AS (when responding to RAN paging, upon triggering RNA updates while the UE is in RRC_INACTIVE, or for sidelink communication) requests the resume of a suspended RRC connection. In an example, the UE may ensure having valid and up to date essential system information before initiating the RRC connection resume procedure.

In an example, upon initiation of the RRC connection resume procedure, if the resumption of the RRC connection is triggered by response to NG-RAN paging: if the resumption of the RRC connection is triggered by response to NG-RAN paging, the UE may: select '0' as the Access Category; perform the unified access control procedure using the selected Access Category and one or more Access Identities provided by upper layers. If the access attempt is barred, the UE may end the procedure.

In an example, the UE may receive a PCCH-Message. The PCCH-Message class may be the set of RRC messages that may be sent from the Network to the UE on the PCCH logical channel. In an example, the Paging message may be used for the notification of one or more UEs. The paging message may comprise a PagingRecord field comprising a ue-Identity IE and an accessType IE. The ue-Identity may indicate a Paging UE Identity. In an example, the Paging UE Identity may be one of a ng-5G-S-TMSI and a fullI-RNTI. The accessType IE may indicate whether the Paging message is originated due to the PDU sessions from the non-3GPP access.

In an example, an RRCRelease message may be used to command the release of an RRC connection or the suspension of the RRC connection. In an example, the RRCRelease message may comprise a suspendConfig field. The suspendConfig may comprise a fullI-RNTI IE, a shortI-RNTI IE, a ran-PagingCycle IE, a ran-NotificationAreaInfo IE, a t380 IE, etc. The fullI-RNTI IE and the shortI-RNTI IE may UE identifiers associated with RRC Inactive State. The ran-PagingCycle may indicate the UE specific cycle for RAN-initiated paging. The ran-NotificationAreaInfo IE may be used by the network to ensure that the UE in RRC_INACTIVE always has a valid ran-NotificationAreaInfo. The t380 IE may indicate a timer that triggers the periodic RNAU (RAN notification area update) procedure in UE.

In an example, the IE DownlinkConfigCommonSIB may provide common downlink parameters of a cell. The pcch-Config field may indicate the paging related configuration. The defaultPagingCycle IE may indicate a default Paging Cycle. A firstPDCCH-MonitoringOccasionOfPO may point out the first PDCCH monitoring occasion for paging of each paging occasion (PO) of a paging frame (PF). A nAndPagingFrameOffset IE may be used to derive the number of total paging frames in a paging cycle and paging frame offset. An ns IE may indicate a number of paging occasions per paging frame.

In an example, an IE PDCCH-ConfigCommon may be used to configure cell specific PDCCH parameters provided in SIB as well as in dedicated signalling. A paging-SearchSpace may indicate a ID of the Search space for paging. If the field is absent, the UE may not receive paging in the corresponding BWP.

In an example, short Messages may be transmitted on PDCCH using P-RNTI with or without associated Paging message using Short Message field in DCI format 1_0. Bit 1 (e.g., the most significant bit) of a Short Message, if set to 1 may provide an indication of a BCCH modification other than SIB6, SIB7 and SIB8. Bit 2 (e.g., the second most significant bit) of a Short Message, if set to 1 may provide an indication of an ETWS primary notification and/or an ETWS secondary notification and/or a CMAS notification. Bit 2 (e.g., the third most significant bit) of a Short Message, if set to 1 may indicate stopping monitoring PDCCH occasions(s) for paging in this Paging Occasion. In an example, if stopPagingMonitoring bit is set to 1, the UE may stop monitoring PDCCH monitoring occasion(s) for paging in that Paging Occasion (PO).

In an example, if the network needs to send a message or deliver data to the registered UE, it may know (in most cases) the set of tracking areas (in RRC_IDLE state) or RNA (in RRC_INACTIVE state) in which the UE is camped. It may then send a "paging" message for the UE on the control channels of all the cells in the corresponding set of areas. The UE will then receive the paging message and may respond.

In an example, the UE may use Discontinuous Reception (DRX) in RRC_IDLE and RRC_INACTIVE state in order to reduce power consumption. The UE may monitor one paging occasion (PO) per DRX cycle. A PO may be a set of PDCCH monitoring occasions and may consist of multiple time slots (e.g., subframe or OFDM symbol) where paging DCI may be sent. One Paging Frame (PF) may be one Radio Frame and may contain one or multiple PO(s) or starting point of a PO.

In an example, in multi-beam operations, the UE may assume that the same paging message and the same Short Message are repeated in all transmitted beams and thus the selection of the beam(s) for the reception of the paging message and Short Message may be up to UE implementation. The paging message may be same for both RAN initiated paging and CN initiated paging.

In an example, the UE initiates RRC Connection Resume procedure upon receiving RAN initiated paging. If the UE receives a CN initiated paging in RRC_INACTIVE state, the UE may move to RRC_IDLE and informs NAS.

In an example, the PF and PO for paging may be determined by the following formulae: SFN for the PF may be determined by: (SFN+PF_offset) mod T=(T div N)* (UE_ID mod N). An index (i_s), indicating the index of the PO may be determined by: i_s=floor (UE_ID/N) mod Ns.

In an example, the following parameters may be used for the calculation of PF and i_s above:

T: DRX cycle of the UE (T may be determined by the shortest of the UE specific DRX value(s), if configured by RRC and/or upper layers, and a default DRX value broadcast in system information. In RRC_IDLE state, if UE specific DRX is not configured by upper layers, the default value may be applied); N: number of total paging frames in T; Ns: number of paging occasions for a PF; PF_offset: offset used for PF determination; UE_ID: 5G-S-TMSI mod 1024. In an example, the parameters Ns, nAndPagingFrameOffset, nrofPDCCH-MonitoringOccasionPerSSB-InPO, and the length of default DRX Cycle may be signaled in SIB1. In an example, the values of N and PF_offset may be derived from the parameter nAndPagingFrameOffset. The parameter first-PDCCH-MonitoringOccasionOfPO may be signalled in SIB1 for paging in initial DL BWP. For paging in a DL BWP other than the initial DL BWP, the parameter first-PDCCH-MonitoringOccasionOfPO may be signaled in the corresponding BWP configuration In an example, if the UE has no 5G-S-TMSI, for instance when the UE has not yet registered onto the network, the UE may use as default identity UE_ID=0 in the PF and i_s formulas above. In an example, the 5G-S-TMSI may be a 48 bit long bit string. The 5G-S-TMSI may in the formulae above be interpreted as a binary number where the left most bit represents the most significant bit.

In an example, the PDCCH monitoring occasions for paging may be determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging may be same as for RMSI.

In an example, when SearchSpaceId=0 is configured for pagingSearchSpace, Ns may be either 1 or 2. For Ns=1, there may be one PO which may start from the first PDCCH monitoring occasion for paging in the PF. For Ns=2, PO may be either in the first half frame (is =0) or the second half frame (is =1) of the PF.

In an example, when SearchSpaceId other than 0 is configured for pagingSearchSpace, the UE may monitors the (i_s+1)th PO. A PO may be a set of 'S*X' consecutive PDCCH monitoring occasions where 'S' may be the number of actual transmitted SSBs determined according to ssb-PositionsInBurst in SIB1 and X may be the nrofPDCCH-MonitoringOccasionPerSSB-InPO if configured or may be equal to 1 otherwise. The [x*S+K]th PDCCH monitoring occasion for paging in the PO may correspond to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of (i_s+1)th PO may be the (i_s+1)th value of the firstPDCCH-MonitoringOccasionOfPO parameter; otherwise, it may be equal to i_s*S*X. If X>1, when the UE detects a PDCCH transmission addressed to P-RNTI within its PO, the UE may not be required to monitor the subsequent PDCCH monitoring occasions for this PO.

In an example, a PO associated with a PF may start in the PF or after the PF. In an example, the PDCCH monitoring occasions for a PO may span multiple radio frames. When SearchSpaceId other than 0 is configured for paging-SearchSpace the PDCCH monitoring occasions for a PO may span multiple periods of the paging search space.

In an example, a DCI format 1_0 may be used for the scheduling of PDSCH in one DL cell. In an example, the following information may be transmitted by means of the DCI format 1_0 with CRC scrambled by P-RNTI: Short Messages Indicator—2 bits; Short Messages—8 bits; Time domain resource assignment—4 bits; VRB-to-PRB mapping—1 bit; Modulation and coding scheme—5 bits; and TB scaling—2 bits.

In an example, a set of PDCCH candidates for a UE to monitor may be defined in terms of PDCCH search space sets. A search space set may be a common search space (CSS) set or a UE-specific search space (USS) set. A UE may monitor PDCCH candidates in a Type2-PDCCH CSS set configured by pagingSearchSpace in PDCCH-Config-Common for a DCI format with CRC scrambled by a P-RNTI on the primary cell of a master cell group MCG.

In an example, paging early indication before a target PO may be used to indicate to the UE whether to monitor PDCCH scrambled with P-RNTI at the PO. In an example, the paging early indication may be DCI-based (e.g., a DCI format 1_0 or a DCI format 2_6 or a different format). In an example, the paging early indication may be RS-based or sequence-based indication, e.g., based on TRS/CSI-RS or SSS. In an example, UE sub-grouping may be used for enhanced paging. The sub-grouping may be based on a paging DCI, a Paging early indication, additional reception occasions in time/frequency domain and/or multiple P-RNTIs.

In an example, to reduce the probability of an unpaged DRX cycle, the UEs that share the same PO may be sub-grouped, and sub-grouping information may be carried by a DCI (e.g., a paging DCI and/or a paging early indication DCI) and/or a signal. In an example, the UEs in the sub-group(s) being paged may monitor the control channel for a paging message. In an example, the UE may wake up before its PO to prepare and to detect paging DCI and determine whether the sub-group it belongs to is being paged or not. In an example, if the sub-group that the UE belongs to is not paged, the UE may skip corresponding PDSCH reception, otherwise, the UE may decode the message on PDSCH. In an example, indicating the UE sub-grouping information may be based on different P-RNTIs for different sub-groups, based on different CORESETs/ search spaces for receiving DCIs (e.g., paging DCIs or paging early indication DCIs) for different sub-groups, or by indicators in a paging DCI and/or paging early indication DCI indicating sub-group information explicitly.

In an example, the sub-group information may not be fully carried by the early transmitted paging DCI. In an example, part of the sub-group information may be transmitted in an early paging information. In an example, the UE sub-grouping may be indicated in early transmitted paging information and/or paging DCI.

In an example, group paging indication may be by using a paging PDCCH. In an example, a wake-up signal (WUS) may be configured before PO reception to early indicate whether to wake up the UE for paging reception. In an example, a sequence associated with the WUS may indicate whether to wake up the UE for paging reception and/or a paging group. In an example, the WUS may be a DCI.

In an example, the network may send an indication (e.g., a Paging early indication (PEI)) before a PO to indicate a UE whether paging PDCCH/PDSCH is present in the PO. The UE may not decode PDCCH/PDSCH if negative indication is received.

In an example, dividing UEs that monitor the same PO into subgroups may reduce the probability that a UE needs to decode PDSCH. In an example, a paging DCI may indicate UEs in different subgroups whether to further decode PDSCH. In an example, UE subgrouping may be combined with PEI to further maximize the power saving gain.

In an example, a sequence-based paging group indication (PGI) may be used. For example, different UE group PGI sequences (e.g., sequences for the Wale Up Signal (WUS)) may be orthogonal. In an example, a UE may be associated with a PGI sequence. The UE may monitor the PO if it detects the associated PGI sequence.

In an example, PDCCH-based paging group indication (PGI) may be used. The UE may receive a PGI PDCCH before a PO. In an example, a bitmap may be used in the PGI DCI to indicate which UE group(s) to monitor PO. In an example, a UE that is associated with a PO may first detect the PGI PDCCH and determine whether to monitor the following PO or not.

In an example, Paging DCI-based paging group indication (PGI) may be used. The UEs associated with a PO may first monitor the paging DCI and receive the scheduled paging message if the associated PGI bit is "1".

In an example, multiple paging RNTIs (P-RNTIs) may be used and may be assign to UEs. The UEs that share a common paging occasion may use different P-RNTIs to monitor and receive their paging messages, without unnecessarily decoding other UEs' messages.

In an example, the UEs may be grouped based on the UE identity information, e.g., 5G-S-TMSI, I-RNTI, etc. The UE identity may be known to both the UE and the network without. In an example, the UEs may be grouped based on UE paging probability information (e.g., the probability that the UE is paged by the network). Considering that UEs with higher paging probability may be more likely to cause false paging alarm to UEs with lower paging probability within the same PO, dividing UEs with similar paging probability into one group may minimize the false alarm rate. In an example, other grouping assistance information may be used.

In an example, the early transmitted paging information may be near SSB. The UE may receive the information after it performs pre-synchronization.

In an example, to avoid the wrong paging alarm, the UEs may be divided into several groups. A UE may monitor its UE paging group ID information indicated by PDCCH decoding procedure. If its group ID is indicated by the PDCCH procedure, the UE may decode the PDSCH, otherwise the UE may skip the PDSCH decoding procedure to save power. In an example, the PDCCH based grouping method may include the following options: DCI base grouping, P-RNTI based grouping and different CORESETs/ search spaces of paging DCIs for different groups.

In an example, grouping the UEs into groups may be based on a rule. In an example, a UE-ID based grouping may be used. In an example, the UE group ID may be equal to the value of mod(UE-ID, the number of UE groups). In an example, the paging probability-based grouping may be used to group UE for power saving.

In an example, the UEs monitoring the same paging occasion (PO) may be divided into subgroups, and the network may indicate whether a subgroup of UEs need to monitor paging message. In an example, paging for UE subgroups may be based on multiple P-RNTIs. Different UE subgroups may monitor paging PDCCHs with CRCs scrambled different P-RNTIs. In an example, paging for UE subgroups may be based on different time/frequency resources. The paging message of different UE subgroups may be transmitted on different time/frequency resources. In an example, paging indication for UE subgroups may be based on a paging DCI. In paging DCI, the network may indicate whether each subgroup of UEs needs to monitor the corresponding paging PDSCH. In an example, paging early indication or wake-up signal (WUS) for UE subgroups may be used. The network may transmit early indication or wake-up signal before paging occasion. The indication or WUS may apply to a subgroup of UEs. In an example, a UE may not monitor PO in case of negative indication.

Reception of paging information by wireless devices that are in RRC_INACTIVE or RRC_IDLE states may lead to high power consumption resulting in draining the battery power and user performance degradation. Grouping of wireless devices for paging purposes and indicating the paged groups/subgroups that are paged in a paging occasion may improve the power saving for wireless devices in RRC_INACTIVE or RRC_IDLE states. Existing paging processes may lead to degraded power saving and inefficient wireless device performance. There is a need to enhance the existing paging processes to enhance power saving for wireless device in RRC_INACTIVE or RRC_IDLE states. Example embodiments enhance paging grouping, paging group/sub-group indication and wireless device group/sub-group determination processes resulting in enhance power saving.

Figure 22:
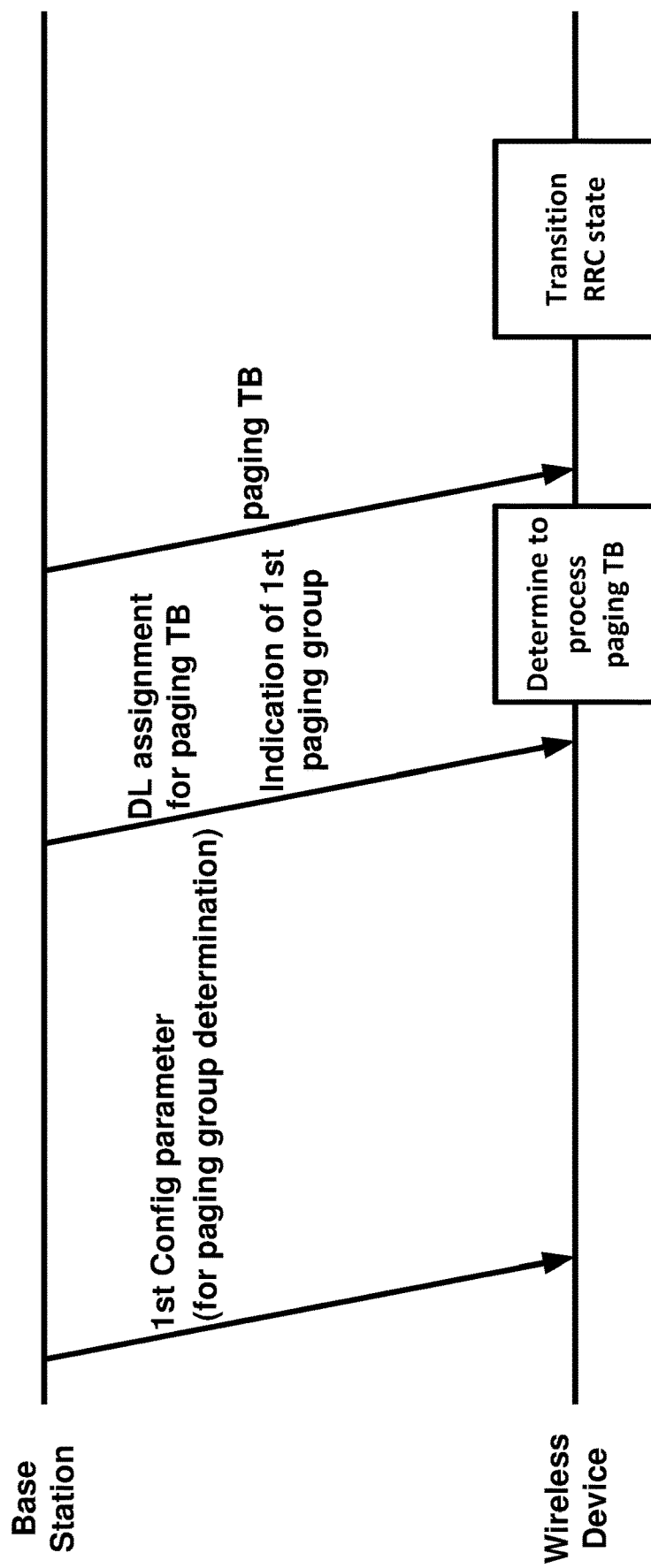
FIG. 22 shows an example process in accordance with several of various embodiments of the present disclosure.

In an example embodiment as shown in FIG. 22, a wireless device may receive a first configuration parameter for determining a paging group that the wireless device is associated with/belongs to. The wireless device may be in an RRC IDLE state or an RRC INACTIVE state. In an example, the first configuration parameter may indicate a number of paging groups, including the paging group that the wireless device belongs to, that the wireless devices (e.g., wireless devices in RRC INACTIVE and RRC IDLE state) may be belong to. In an example, the first configuration parameter may indicate an identifier of the wireless device. In an example, the wireless device may receive the first configuration parameter, used for determining the paging group for the wireless device, before transitioning to the RRC IDLE state or the RRC INACTIVE state, for example via an RRC release message (e.g., as shown in FIG. 16 when the first configuration parameter indicates a number of paging groups or as shown in FIG. 17 when the first configuration parameter indicates an identifier of the paging group) or a suspendconfig IE (e.g., as shown in FIG. 19 when the first configuration parameter indicates a number of paging groups or as shown in FIG. 20 when the first configuration parameter indicates an identifier of the paging group) of the RRC release message (indicating transitioning from an RRC CONNECTED state to the RRC IDLE or RRC INACTIVE state). In an example, the wireless device may receive the first configuration parameter via a broadcast message (e.g., a SIB message such as SIB1). For example, a DownlinkConfigCommonSIB IE may comprise the first configuration parameter (e.g., as shown in FIG. 18 when the first configuration parameter indicates a number of paging groups).

The wireless device may receive a downlink assignment (e.g., scheduling information such as radio resources, MCS, etc.) for receiving a downlink transport block via a downlink shared channel (e.g., PDSCH) that includes paging information. The wireless device may receive the downlink assignment/scheduling information via a paging DCI (e.g., a DCI format 1_0 with CRC scrambled with a P-RNTI) received by monitoring the control channel in a paging occasion (PO). The wireless device may determine the PO based on a DRX procedure in the RRC INACTIVE or the RRC IDLE state and using the DRX parameters such as a paging cycle, number of paging frames in a paging cycle, etc.

The wireless device may receive an indication that the downlink transport block, scheduled by the paging DCI, comprises first paging information associated with the first paging group. In an example, the wireless device may determine that the downlink transport block, scheduled by the paging DCI, comprises the first paging information associated with the first paging group based on the paging DCI. For example, a value of a field of the paging DCI may indicate that the downlink transport block, scheduled by the paging DCI, comprises the first paging information associated with the first paging group. In an example, a P-RNTI, associated with the paging DCI, may indicate that the downlink transport block, scheduled by the paging DCI, comprises the first paging information associated with the first paging group. In an example, a CORESET/search space that the paging DCI is received may indicate that the downlink transport block, scheduled by the paging DCI, comprises the first paging information associated with the first paging group.

In an example, the wireless device may receive a paging early indication (PEI). In an example, the paging early indication (PEI) may be via a second DCI/PEI DCI received before a PO of the paging DCI. In an example, the wireless device may determine that the downlink transport block, scheduled by the paging DCI, comprises the first paging information associated with the first paging group based on the second DCI/PEI DCI. For example, a value of a field of the second DCI/PEI DCI may indicate that the downlink transport block, scheduled by the paging DCI, comprises the first paging information associated with the first paging group. In an example, an RNTI, associated with the second DCI/PEI DCI, may indicate that the downlink transport block, scheduled by the paging DCI, comprises the first paging information associated with the first paging group. In an example, a CORESET/search space that the second DCI/PEI DCI is received may indicate that the downlink transport block, scheduled by the paging DCI, comprises the first paging information associated with the first paging group. In an example, the paging early indication may be based on a downlink signal/wake-up signal (WUS) (e.g., a TRS/CSI-RS or SSS). The wireless device may determine that the downlink transport block, scheduled by the paging DCI, comprises the first paging information associated with the first paging group based on a sequence associated with the downlink signal/WUS.

The wireless device may determine, based on the first configuration parameter, that the wireless device is associated with the first paging group. For example, the first configuration parameter may indicate a number of paging groups and the wireless device may determine that the wireless device is associated with the first paging group based on the number of paging groups. In an example, the wireless device may receive a second configuration parameter indicating a user identifier. In an example, the user identifier may be an inactive state UE identifier (e.g., a full I-RNTI or a short I-RNTI). In an example, the user identifier may be a 5G-S-TMSI and may be received by the wireless device from the Core Network (e.g., via a NAS message). The wireless device may receive a 5G-S-TMSI IE (e.g., as shown in FIG. 21) indicating the 5G-S-TMSI as a bit string of a fist size (e.g., size 48). The wireless device may determine that the wireless device is associated with the first paging group based on the number of paging groups (e.g., indicated by the first configuration parameter) and the user identifier (e.g., indicated by the second configuration parameter). The wireless device may use a procedure to determine a paging group associated with the wireless device and may determine that the paging group associated with the wireless device is the first paging group. For example, the wireless the wireless device may determine the paging group/paging group ID that the wireless device is associated with based on the user identifier divided by the number of paging groups (e.g., UE_ID/M, where M=number of paging groups). For example, the wireless the wireless device may determine the paging group/paging group ID that the wireless device is associated with based on a floor of (the user identifier divided by the number of paging groups) (e.g., floor(UE_ID/M), where M=number of paging groups). For example, the wireless the wireless device may determine the paging group/paging group ID that the wireless device is associated with based on or as a floor of (the user identifier divided by the number of paging groups) plus one (e.g., floor(UE_ID/M)+1, where M=number of paging groups). For example, the wireless the wireless device may determine the paging group/paging group ID that the wireless device is associated with based on or as a mod (the user identifier, the number of paging groups) (e.g., mod(UE_ID, M), where M=number of paging groups). In an example, the wireless device may further receive a third configuration parameter indicating a paging cycle. The wireless device may receive the paging cycle (e.g., as a default DRX cycle) in an RRC release message, e.g., a suspendconfig IE of the RRC release message or the wireless device may receive the paging cycle via a broadcast message (e.g., a SIB message such as SIB1, e.g., in a DownlinkConfigCommonSIB IE). The wireless device may further receive a fourth configuration parameter indicating a number of paging frames in a paging cycle. The wireless device may receive the fourth configuration parameter via a broadcast message (e.g., a SIB message such as SIB1, e.g., in a DownlinkConfigCommonSIB IE). The wireless device may determine the associated paging group and may determine to be associated with the first paging group further based on the number of the paging frames in the paging cycle. In an example, the wireless device may further receive a fifth configuration parameter indicating a number of paging occasions in a paging frame. The wireless device may determine the associated paging group and may determine to be associated with the first paging group further based on the number of paging occasions in the paging frame.

The wireless may process/receive the downlink transport block, scheduled by the paging DCI, based on receiving the indication that the downlink transport block includes first paging information associated with the first paging group. The downlink transport block may comprise one or more paging records for one or more wireless devices in the first paging group. The one or more paging records may comprise a first paging record for the wireless device. The first paging record may comprise the user identifier of the wireless device. Based on the downlink transport block comprising a paging record comprising the user identifier of the wireless device, the wireless device may transition to a new RRC state, for example, transition from the RRC INACTIVE state or the RRC IDLE state to an RRC CONNECTED state. In an example, the transitioning from the RRC INACTIVE state or the RRC IDLE state to the RRC CONNECTED state may be based on a random access process. In an example, the wireless device may start an RRC resume procedure for transitioning from the RRC INACTIVE state to the RRC Connected state. In an example, the wireless device may start an RRC connection (re-)establishment process for transitioning from the RRC IDLE state to the RRC CONNECTED state.

Figure 23:
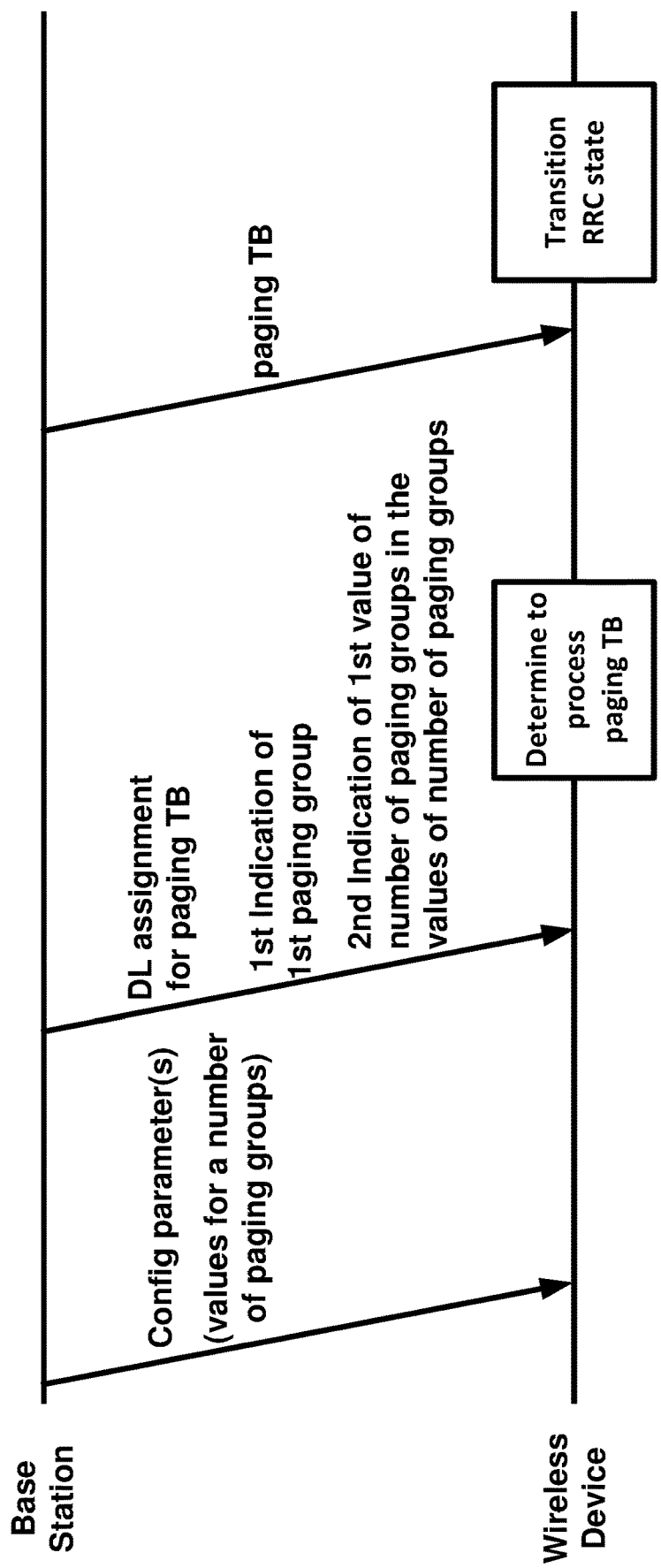
FIG. 23 shows an example process in accordance with several of various embodiments of the present disclosure.

In an example embodiment, as shown in FIG. 23, the wireless device may receive one or more configuration parameters indicating a plurality of values for the number of paging groups. In an example, the wireless device may receive the one or more configuration parameters via a dedicated RRC message or via a broadcast message. For example, the wireless device may receive the one or more configuration parameters in an RRC release message or a suspendconfig IE of the RRC release message. For example, the wireless device may receive the one or more configuration parameters in a system information block (SIB) message, e.g., SIB1 or in a DownlinkConfigCommonSIB IE.

The wireless device may receive a second indication of a first value of the number of paging groups in the plurality of numbers of the paging groups. In an example, the wireless device may receive the second indication via a paging DCI. For example, the paging DCI may comprise a field indicating (e.g., by providing an index to) the first value of the number of paging groups in the plurality of values of the number of paging groups. In an example, the wireless device may receive a second DCI, different from the paging DCI, (e.g., a paging early indication DCI) comprising a field indicating (e.g., by providing an index to) the first value of the number of paging groups in the plurality of values of the number of paging groups. In an example, the wireless device may receive a signal/wake-sup signal (WUS), wherein the signal/WUS indicates the first value of the number of paging groups in the plurality of values of the number of paging groups. For example, the signal/WUS may be associated with a sequence that indicates the first value of the number of paging groups in the plurality of values of the number of paging groups. In an example, the wireless device may receive a paging transport block comprising a field and the value of the field may indicate the first value of the number of paging groups in the plurality of values of the number of paging groups.

The wireless device may receive/process the downlink transport block, scheduled by the paging DCI, based on receiving the first indication that the downlink transport block includes first paging information associated with the first paging group and based on determining that the wireless device is associated with the first paging group. The determining that the wireless device is associated with the first paging group may be based on the first value of the number of paging groups indicated by the second indication. Based on the downlink transport block comprising a paging record comprising the user identifier of the wireless device, the wireless device may transition to a new RRC state, for example, transition from the RRC INACTIVE state or the RRC IDLE state to an RRC CONNECTED state. In an example, the transitioning from the RRC INACTIVE state or the RRC IDLE state to the RRC CONNECTED state may be based on a random access process. In an example, the wireless device may start an RRC resume procedure for transitioning from the RRC INACTIVE state to the RRC Connected state. In an example, the wireless device may start an RRC connection (re-)establishment process for transitioning from the RRC IDLE state to the RRC CONNECTED state.

Figure 24:
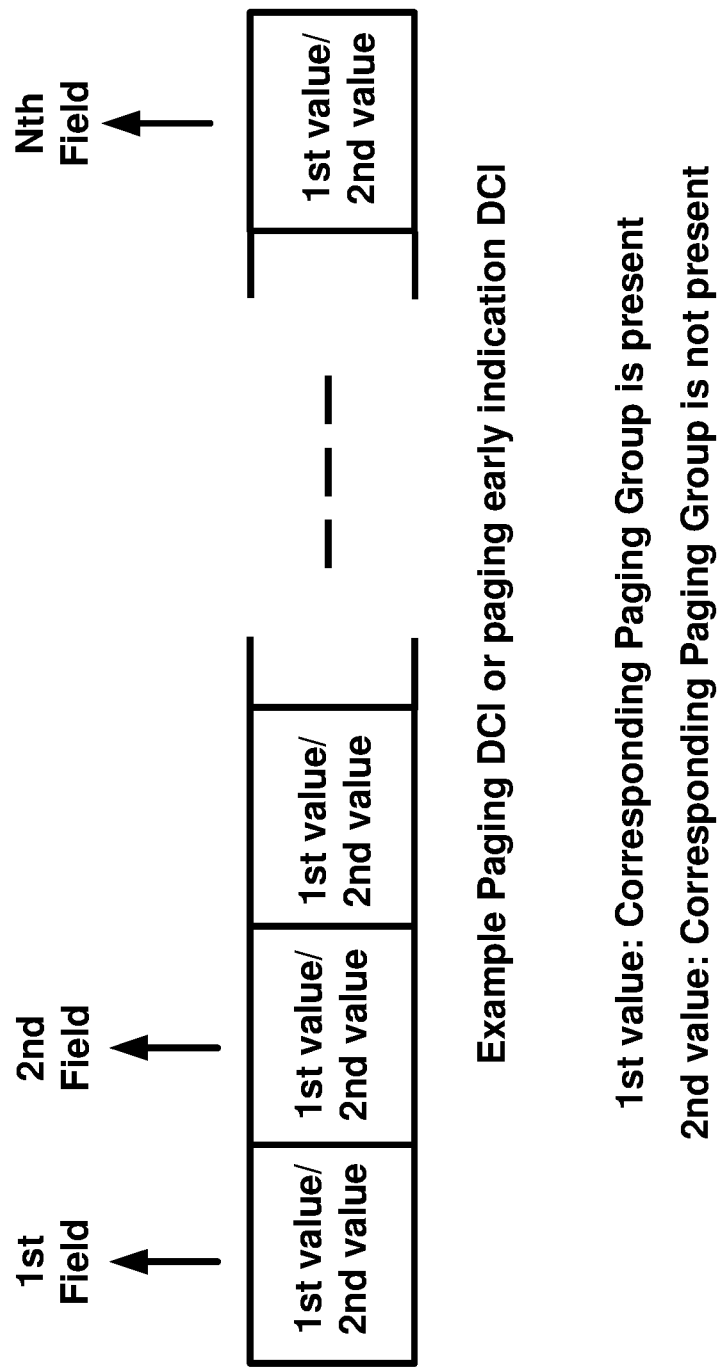
FIG. 24 shows an example content of a downlink control information in accordance with several of various embodiments of the present disclosure.

In an example embodiment as shown in FIG. 24, a wireless device may receive a DCI comprising a plurality of bits. In an example, the DCI may be a paging DCI, received by the wireless in a paging occasion and comprising scheduling information for a paging TB. In an example, the DCI may be a second DCI, different from the paging. For example, the DCI may be a paging early indication DCI received in a timing before the PO/timing of the paging DCI. In an example, the DCI may be received via a common search space/CORESET. For example, the DCI may comprise a field comprising a plurality of bits. The plurality of bits may comprise one or more first bits that correspond to a first paging group. The one or more first bits may have one of a plurality of values comprising a first value and a second value. The first value of the one or more first bits may indicate that paging information associated with the first paging group is present in a paging downlink transport block. The second value of the one or more first bits may indicate that paging information associated with the first paging group is not present in a paging downlink transport block. For example, the number of the one or more first bits may be one. A value of one for the one or more first bits may indicate that paging information associated with the first paging group is present in the paging TB. A value of zero for the one or more first bits may indicate that paging information associated with the first paging group is not present in the paging TB. In an example, the plurality of bits may further comprise one or more second bits that correspond to a second paging group. The one or more second bits may have one of a plurality of values comprising a first value and a second value. The first value of the one or more second bits may indicate that paging information associated with the second paging group is present in a paging downlink transport block. The second value of the one or more second bits may indicate that paging information associated with the second paging group is not present in a paging downlink transport block. For example, the number of the one or more second bits may be one. A value of one for the one or more second bits may indicate that paging information associated with the second paging group is present in the paging TB. A value of zero for the one or more second bits may indicate that paging information associated with the second paging group is not present in the paging TB.

Figure 25:
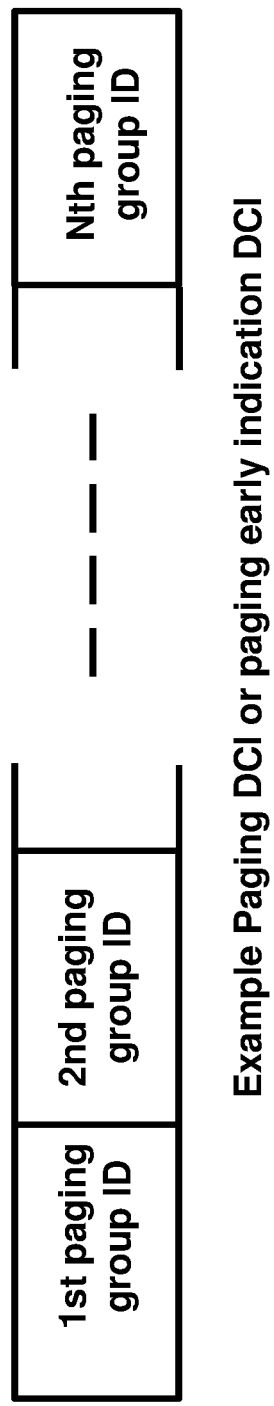
FIG. 25 shows an example content of a downlink control information in accordance with several of various embodiments of the present disclosure.

In an example as shown in FIG. 25, the DCI may comprise a plurality of fields indicating paging group identifiers of one or more paging groups. For example, the DCI may comprise paging group identifiers of one or more paging groups for which paging information is included in a paging TB. The DCI may be a paging DCI scheduling the paging TB or may be a paging early indication DCI received before the PO/timing of the paging DCI.

The wireless device may determine that the wireless device is associated with the first paging group (for example as described in the embodiments of this disclosure). The wireless device may further determine, based on a value of the one or more first bits being the first value, that the paging information associated with the first paging group is present in the paging TB. In an example, in response to determining, based on the DCI, that the paging information associated with the first paging group is present in the paging TB, the wireless device may monitor the paging occasion (PO) (e.g., a subsequent PO after the DCI) and may receive the paging information that includes the scheduling information/downlink assignment for the paging TB.

Figure 29:
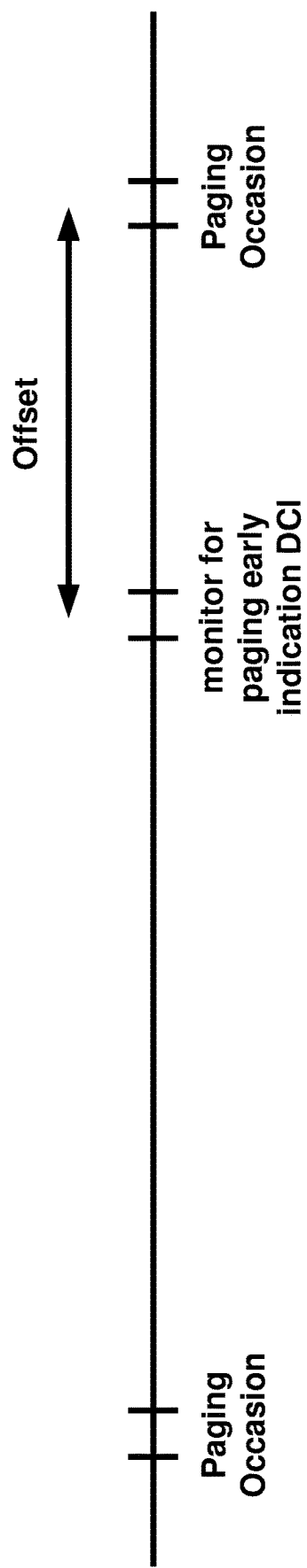
FIG. 29 shows an example process in accordance with several of various embodiments of the present disclosure.
Figure 30:
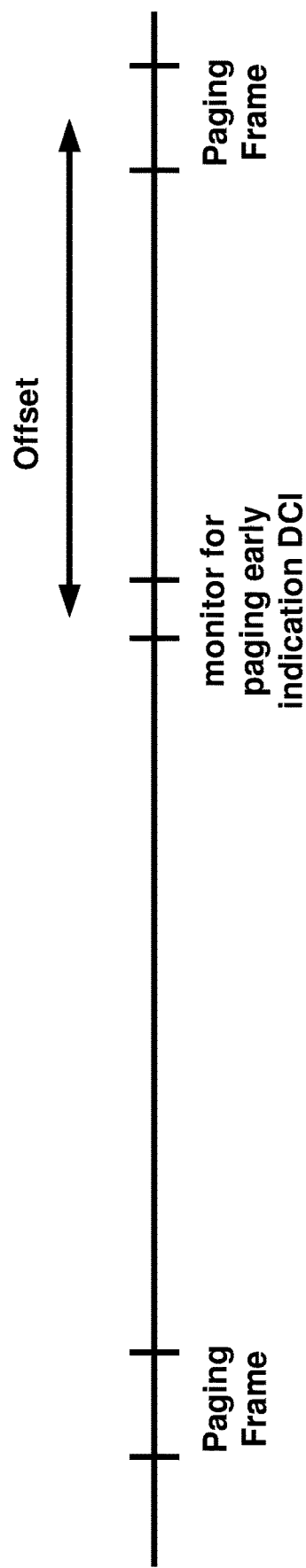
FIG. 30 shows an example process in accordance with several of various embodiments of the present disclosure.

In an example, the DCI may be a paging early indication DCI and may be received at a predetermined timing before the PO/timing of the paging DCI. For example, the timing of the DCI may be an offset before the PO or the PF (paging frame) comprising the PO or an offset before a timing of the paging DCI (e.g., as shown in FIG. 29 and FIG. 30). In an example, the offset may have a pre-determined/pre-configured value. In an example, the wireless device may receive a configuration parameter (e.g., via a dedicated RRC message such as the RRC release message (e.g., as shown in FIG. 26) or suspendconfig IE of the RRC release message (e.g., as shown in FIG. 27) or via a broadcast message such as a SIB message such as SIB1 or in a DownlinkConfigCommonSIB IE (e.g., as shown in FIG. 28)) indicating the offset value. In an example, the timing of the DCI may be based on a timing of a signal (e.g., SSB), for example, received before the timing of the PO/paging DCI.

The wireless device may receive/process the paging TB (e.g., scheduled by a paging DCI), based on determining that the paging TB includes first paging information associated with the first paging group and based on determining that the wireless device is associated with the first paging group. Based on the paging TB comprising a paging record comprising a user identifier of the wireless device, the wireless device may transition to a new RRC state, for example, transition from an RRC INACTIVE state or an RRC IDLE state to an RRC CONNECTED state. In an example, the transitioning from the RRC INACTIVE state or the RRC IDLE state to the RRC CONNECTED state may be based on a random access process. In an example, the wireless device may start an RRC resume procedure for transitioning from the RRC INACTIVE state to the RRC Connected state. In an example, the wireless device may start an RRC connection (re-)establishment process for transitioning from the RRC IDLE state to the RRC CONNECTED state.

In an example embodiment, a wireless device may receive a first configuration parameter for calculating a paging group of the wireless device. The wireless device may receive: scheduling information/downlink assignment for receiving a downlink transport block, via a downlink shared channel, comprising paging information; and an indication that the downlink transport block comprises first paging information associated with a first paging group. The wireless device may process the downlink transport block in response to determining, based on the first configuration parameter, that the wireless device is associated with the first paging group. The wireless device may transition, from a first RRC state to a second RRC state, based on the downlink transport block comprising a paging record comprising a user identifier of the wireless device.

In an example, the first configuration parameter may indicate a number of paging groups.

In an example, the wireless device may receive a second configuration parameter indicating a user identifier for the wireless device. In an example, the determining that the wireless device is associated with the first paging group may further be based on the user identifier.

In an example, the wireless device may receive: a second configuration parameter indicating the user identifier for the wireless device; a third configuration parameter indicating a paging cycle; a fourth configuration parameter indicating a number of paging frames in the paging cycle. The determining that the wireless device is associated with the first paging group may further be based on the user identifier and the number of the paging frames in the paging cycle. In an example, the wireless device may receive a fifth configuration parameter indicating a number of paging occasions for a paging frame, wherein the determining that the wireless device is associated with the first paging group may further be based on the number of paging occasions.

In an example, the wireless device may receive the first configuration parameter via a radio resource control message. For example, the wireless device may receive the first configuration parameter via an RRCrelease message or a suspendconfig field of the RRCrelease message.

In an example, the wireless device may receive the first configuration parameter via a broadcast message. For example, the wireless device may receive the first configuration parameter via a system information block (e.g., SIB1). For example, the wireless device may receive the first configuration parameter via a DownlinkConfigCommonSIB IE.

In an example, the first configuration parameter may indicate an identifier of the paging group.

In an example embodiment, a wireless device may receive a first configuration parameter indicating a number of paging groups and a second configuration parameter indicating a user identifier for the wireless device. The wireless device may receive: scheduling information/downlink assignment for receiving a downlink transport block, via a downlink shared channel, comprising paging information; and an indication that the downlink transport block comprises first paging information associated with a first paging group. The wireless device may process the downlink transport block in response to determining, based on the number of the paging groups and based on the user identifier, that the wireless device is associated with the first paging group. The wireless device may transition, from a first RRC state to a second RRC state, based on the downlink transport block comprising a paging record comprising the user identifier.

In an example embodiment, may receive a first configuration parameter indicating a number of paging groups and a second configuration parameter indicating a user identifier for the wireless device. The wireless device may receive: scheduling information/downlink assignment for receiving a downlink transport block, via a downlink shared channel, comprising paging information; and an indication that the downlink transport block comprises first paging information associated with a first paging group. The wireless device may determine, based on the number of the paging groups and based on the user identifier, whether the wireless device is associated with the first paging group. In response to determining that the wireless device is associated with the first paging group, the wireless device may process the downlink transport block. The wireless device may transition, from a first RRC state to a second RRC state, based on the downlink transport block comprising a paging record comprising the user identifier.

In an example, the wireless device may receive the first configuration parameter (e.g., the first configuration parameter indicating the number of paging groups) via a radio resource control message. For example, the wireless device may receive the first configuration parameter via an RRCrelease message or a suspendconfig field of an RRCrelease message.

In an example, the wireless device may receive the first configuration parameter (e.g., the first configuration parameter indicating the number of paging groups) via a broadcast message. For example, the wireless device may receive the first configuration parameter via a system information block (e.g., SIB1). For example, the wireless device may receive the first configuration parameter via a DownlinkConfigCommonSIB IE.

In an example, the wireless device may receive the second configuration parameter (e.g., the second configuration parameter indicating the user identifier for the wireless device) via a radio resource control message. For example, the wireless device may receive the second configuration parameter via an RRCrelease message or a suspendconfig field of an RRCrelease message. For example, the user identifier may be an I-RNTI (e.g., a fullI-RNTI or a shortI-RNTI).

In an example, the wireless device may receive the second configuration parameter (e.g., the second configuration parameter indicating the user identifier for the wireless device) from the core network. For example, the wireless device may receive the second configuration parameter via a non-access stratum (NAS) message. In an example, the user identifier may be a 5G-S-TMSI.

In an example, the first RRC state may be one of an RRC_IDLE state and an RRC_INACTIVE state.

In an example, the second RRC state may be an RRC_CONNECTED state. In an example, the wireless device may start a random access process, wherein the transitioning to the RRC_CONNECTED state may be based on the random access process. In an example, the wireless device may start an RRC resume procedure, wherein the transitioning to the RRC_CONNECTED state may be based on the RRC resume procedure.

In an example, the wireless device may receive the scheduling information/downlink assignment via a paging DCI. In an example, the paging DCI may be a DCI format 1_0. In an example, the wireless device may receive the indication may be via the paging DCI. In an example, the paging DCI may comprise a field, a value of the field indicating the indication. The value of the field may indicate that the downlink transport block comprises first paging information associated with a first paging group. In an example, the value of the field may indicate an identifier of the first paging group. In an example, the paging DCI may be associated a first RNTI indicating the indication. The first RNTI may indicate that the downlink transport block comprises first paging information associated with a first paging group. In an example, the wireless device may receive the paging DCI via a first CORESET/search space indicating the indication. The paging DCI may indicate that the downlink transport block comprises first paging information associated with a first paging group.

In an example, the wireless device may receive a second DCI (e.g., a paging early indication), wherein receiving the indication may be via the second DCI. In an example, the second DCI may comprise a field, a value of the field indicating the indication. The value of the field may indicate that the downlink transport block comprises first paging information associated with a first paging group. In an example, the value of the field may indicate an identifier of the first paging group. In an example, the second DCI may be associated a first RNTI indicating the indication. The first RNTI may indicate that the downlink transport block comprises first paging information associated with a first paging group. In an example, the wireless device may receive the second DCI via a first CORESET/search space indicating the indication. The second DCI may indicate that the downlink transport block comprises first paging information associated with a first paging group.

In an example, the wireless device may receive a signal (e.g., TRS/CSI-RS or SSS) wherein receiving the indication may be via the signal. In an example, the signal may be associated with a sequence indicating the indication. In an example, the sequence associated with the signal may indicate that the downlink transport block comprises first paging information associated with a first paging group.

In an example, the determining whether the wireless device is associated with the first paging group may comprise determining a paging group that the wireless device belongs to. In an example, the wireless device may determine the paging group that the wireless device belongs to and/or a paging group identifier of the paging group that the wireless device belongs to based on the number of paging groups. In an example, the wireless device may determine the paging group that the wireless device belongs to and/or a paging group identifier of the paging group that the wireless device belongs to based on (user identifier over the number of paging groups). In an example, the wireless device may determine the paging group that the wireless device belongs to and/or a paging group identifier of the paging group that the wireless device belongs to based on floor of (user identifier over the number of paging groups). In an example, the wireless device determines the paging group that the wireless device belongs to and/or a paging group identifier of the paging group that the wireless device belongs to based on or as floor of (user identifier over the number of paging groups) plus one. In an example, the wireless device may determine the paging group that the wireless device belongs to and/or a paging group identifier of the paging group that the wireless device belongs to based on or as mod (user identifier, number of paging groups).

In an example, the wireless device may further receive: a third configuration parameters indicating paging cycle; a fourth configuration parameters indicating a number of paging frames in the paging cycle; and wherein: the paging group that the wireless device belongs to may be based on a paging frame that the wireless device is associated with and the number of paging groups; and the paging frame that the wireless device is associated with may be based on the user identifier and the number of paging frames in the paging cycle.

In an example, the wireless device may receive: a third configuration parameter indicating paging cycle; a fourth configuration parameter indicating a number of paging frames in the paging cycle; a fifth configuration parameter indicating a number of paging occasions for a paging frame; and wherein: the paging group that the wireless device belongs to may be based on a paging occasion that the wireless device is associated with and the number of paging groups; and the paging occasion that the wireless device is associated with may be based on the user identifier, the number of paging frames in the paging cycle and the number of paging occasions for a paging frame.

In an example, the paging record may further comprise an identifier of the first paging group.

In an example embodiment, a wireless device may receive one or more configuration parameters indicating a plurality of values for a number of paging groups. The wireless device may receive: scheduling information/downlink assignment for receiving a downlink transport block, via a downlink shared channel, comprising paging information; a first indication that the downlink transport block comprises first paging information associated with a first paging group; and a second indication of a first value of the number of paging groups in the plurality of values of the number of paging groups. The wireless device may process the downlink transport block in response to determining, based on the first value of the number of paging groups, that the wireless device is associated with the first paging group. The wireless device may transition, from a first RRC state to a second RRC state, based on the downlink transport block comprising a paging record comprising a user identifier of the wireless device.

In an example, the wireless device may receive the one or more configuration parameters via a radio resource control message. For example, the wireless device may receive the one or more configuration parameters via RRCrelease message. For example, the wireless device may receive the one or more configuration parameters via a suspendconfig IE in the RRCrelease message.

In an example, the wireless device may receive the one or more configuration parameters via a broadcast message, for example a system information block (SIB, e.g., SIB1). For example, the wireless device may receive the one or more configuration parameters via a DownlinkConfigCommon-SIB IE.

In an example, the wireless device may receive a second configuration parameter indicating the user identifier for the wireless device. In an example, the wireless device may determine that the wireless device is associated with the first paging group further based on the user identifier.

In an example, the wireless device may receive a paging DCI wherein the wireless device receives the scheduling information/downlink assignment via the paging DCI.

In an example, receiving the first indication may be via a paging DCI.

In an example, the wireless device may receive a second DCI (e.g., a paging early indication DCI), wherein receiving the first indication may be via the second DCI.

In an example, the wireless device may receive a signal (e.g., TRS/CSI-RS or SSS) wherein receiving the first indication is via the signal.

In an example, receiving the second indication may be via a paging DCI. In an example, the paging DCI may comprise a field comprising an index to the first value of the number of paging groups in the plurality of values of the number of paging groups.

In an example, the wireless device may receive a second DCI (e.g., a paging early indication DCI), wherein receiving the second indication may be via the second DCI. In an example, the second DCI may comprise a field comprising an index to the first value of the number of paging groups in the plurality of values of the number of paging groups.

In an example, the wireless device may receive a signal (e.g., TRS/CSI-RS or SSS) wherein receiving the second indication may be via the signal. In an example, the signal nay be associated with a sequence indicating the first value of the number of paging groups in the plurality of values of the number of paging groups.

In an example, the wireless device may receive a paging TB wherein receiving the second indication may be via the paging. In an example, the paging TB may comprise a field indicating the first value of the number of paging groups in the plurality of values of the number of paging groups.

In an example embodiment, a wireless device may receive a DCI comprising a plurality bits, wherein: one or more first bits in the plurality of bits may correspond to a first paging group; a first value of the one or more first bits may indicate that paging information associated with the first paging group is present in a paging TB; and a second value of the one or more first bits may indicate that paging information associated with the first paging group is not present in the paging TB. The wireless device may determine that: the wireless device is associated with the first paging group; and the paging information associated with the first paging group is present in the paging TB based on the one or more bits having the first value. The wireless device may receive/process the paging TB in response to the determination. The wireless device may transition from a first RRC state to a second RRC state based on the paging TB comprising a paging record comprising an identifier of the wireless device.

In an example, the DCI may be a paging DCI comprising scheduling information/downlink assignment for the paging TB. In an example, the wireless device may receive the DCI in a paging occasion.

In an example, the DCI may be a paging early indication received in a first timing before a paging occasion (PO) (e.g., before a second timing of a paging DCI). The paging DCI may comprise scheduling information/downlink assignment for the paging TB.

In an example, the DCI may comprise one or more second bits in the plurality of bits correspond to a second paging group. A first value of the one or more second bits may indicate that paging information associated with the second paging group is present in a paging TB. A second value of the one or more second bits may indicate that paging information associated with the second paging group is not present in the paging TB.

In an example, a number of the one or more first bits may be one. A first value of the one or more first bits may be one. A second value of the one or more first bits may be zero.

In an example, receiving the DCI may be via a common search space/CORESET.

In an example, the wireless device may monitor a control channel in a paging occasion in response to the DCI indicating that paging information associated with the first paging group is present in the paging TB. The wireless device may receive a paging DCI based on monitoring the control channel; wherein: the DCI is a paging early indication; and the paging DCI may comprise scheduling information/downlink assignment for the paging TB. In an example, receiving the DCI (e.g., the paging early indication DCI) may be based on monitoring a control channel, in a timing that is an offset to a paging occasion. In an example, receiving the DCI (e.g., the paging early indication DCI) may be based on monitoring a control channel, in a timing that is an offset to a paging frame. In an example, the wireless device may receive a configuration parameter indicating the offset. In an example, the wireless device may receive the configuration parameter via an RRC message. For example, the wireless device may receive the configuration parameter via an RRCrelease message. For example, the wireless device may receive the configuration parameter via a suspendconfig field of the RRCrelease message. In an example, the wireless device may receive the configuration parameter via a broadcast message (e.g., a system information block (SIB), e.g., SIB1) or a DownlinkConfigCommon-SIB IE. In an example, the offset may have a predetermined/pre-configured value. In an example, the wireless device may receive the DCI (e.g., the paging early indication) based on monitoring a control channel, in a timing determined based on a first periodicity/cycle. In an example, the paging DCI may be received in a paging occasion determined based on a second periodicity/cycle different from the first periodicity/cycle. In an example, a timing of receiving the DCI may be based on a second timing of an SSB before a timing/PO for receiving the paging DCI.

Figure 31:
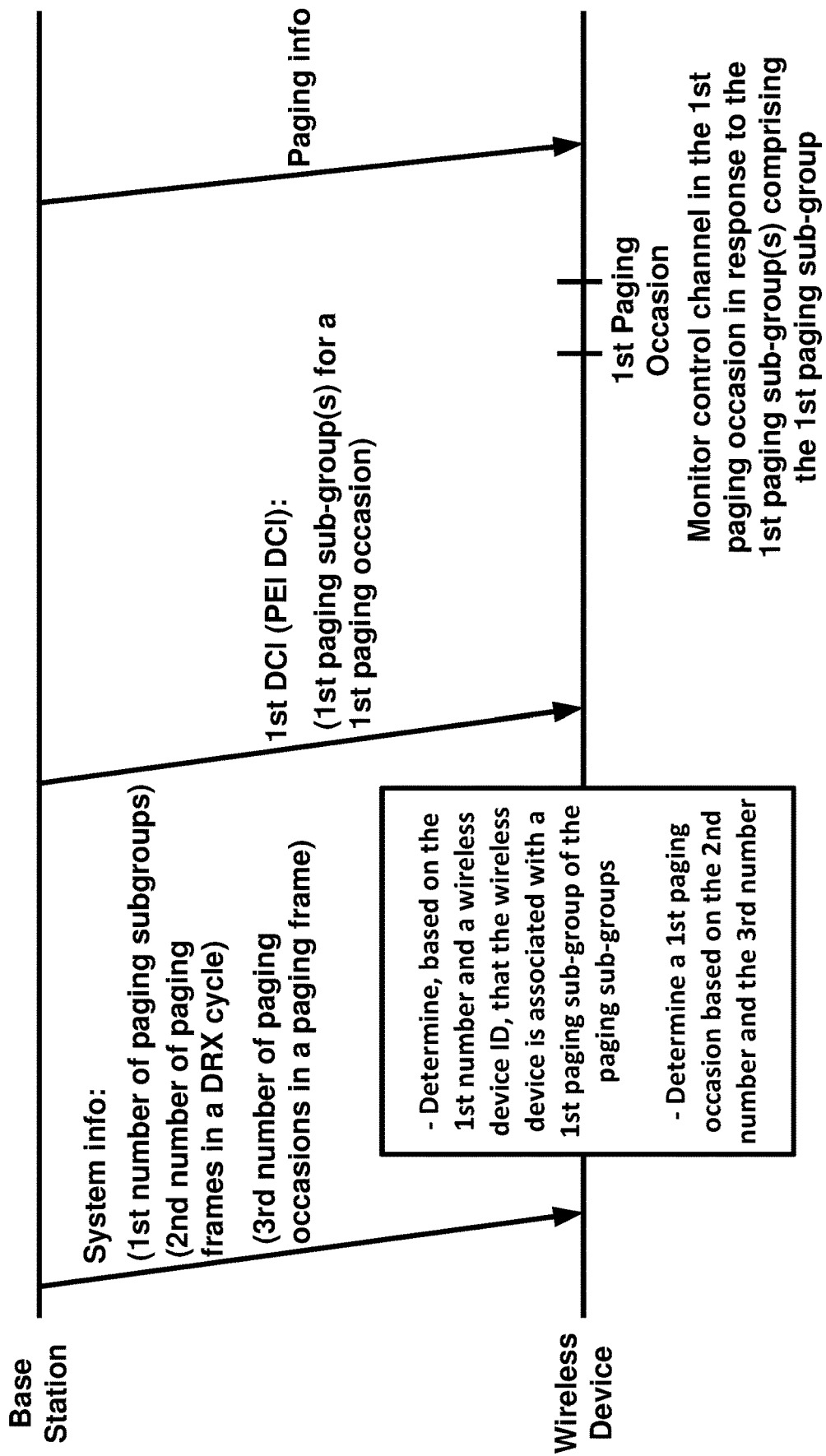
FIG. 31 shows an example process in accordance with several of various embodiments of the present disclosure.

In an example embodiment as shown in FIG. 31, a wireless device may receive system information. The wireless device may be in an RRC inactive state or an RRC idle state. In an example, the wireless device may receive the system information while in the RRC inactive state or the RRC idle state. In an example, the wireless device may receive one or more broadcast messages comprising the system information. For example, the one or more broadcast messages may comprise a system information block 1 (SIB1) message. The system information (e.g., received via the SIB1 messages, e.g., via a DownlinkConfigCommonSIB IE) may indicate (e.g., may comprise a first parameter indicating) a first number of a plurality of paging groups/subgroups. The system information (e.g., received via the SIB1 messages, e.g., via a DownlinkConfigCommonSIB IE) may indicate (e.g., may comprise a second parameter indicating) a second number of paging frames in a discontinuous reception (DRX) cycle. The system information (e.g., received via the SIB1 messages, e.g., via a DownlinkConfigCommonSIB IE) may indicate (e.g., may comprise a third parameter indicating) a third number of paging occasions for a paging frame.

The wireless device may determine a first paging occasion at least based on the second number (e.g., the second number of paging frames in the DRX cycle indicated by the second parameters in the system information) and the third number (e.g., the third number of paging occasions in a paging frame). In an example, the determination of the first paging occasion by the wireless device may further be based on the wireless device identifier (a UE ID, e.g., 5G-S-TMSI). In an example, the wireless device identifier may be indicated to/provided to the wireless device by the Core Network (e.g., via a core network signaling such as NAS signaling). In an example, the determination of the first paging occasion by the wireless device may further be based on the DRX cycle and a paging frame offset. The wireless device may receive a configuration parameter (e.g., via system information or via an RRC message) indicating the DRX cycle. In an example, the second parameter of the system information may further indicate the paging frame offset (e.g., in addition to indicating the second number of paging frames in a DRX cycle). For example, the second parameter may be nAndPagingFrameOffset indicating both of the second number and the paging frame offset. A paging occasion determination process used in this disclosure may be used to determine the first paging occasion.

The wireless device may determine to be associated with a first paging group/subgroup. For example, the wireless device may determine to be associated with the first paging group/subgroup in the first paging occasion. The wireless device may determine to be associated (e.g., associated in the first paging occasion) with the first paging group/subgroup based on at least the first number (e.g., the first number of paging groups/subgroups indicated by the system information, e.g., the first parameter of the system information) and based on a wireless device identifier (a UE ID, e.g., 5G-S-TMSI). In an example, the wireless device identifier may be indicated to/provided to the wireless device by the Core Network (e.g., via a core network signaling such as NAS signaling). In an example, the determination that the wireless device is associated with the first paging group/sub-group (e.g., associated with the first paging group/sub-group in the first paging occasion) may further be based on the second number and/or the third number indicated by the system information (e.g., by the second parameter and the third parameter of the system information, respectively).

The wireless may receive a paging early indication (PEI) DCI indicating one or more first paging groups/sub-groups for the first paging occasion. The wireless device may receive the PEI DCI before the paging occasion. The first timing of the PEI DCI may be prior to a second timing of the first paging occasion. The wireless device may use the information in the PEI DCI to determine whether to monitor the control channel in a paging occasion of the wireless device that corresponds to the PEI DCI. In an example, the reception of the PEI DCI may be via a search space/CORESET associated with/used for the paging early indication. For example, a first timing of the PEI DCI (e.g., the first timing of a PEI monitoring occasion) may be based on a second timing of the paging occasion, for example, based on an offset before the second timing of the paging occasion. For example, a frame that the PEI DCI is received may be an offset (e.g., an offset number of frames, e.g., 1 frame, 2 frames, etc.) before the second timing of the paging occasion. In an example, the offset may be configurable via a configuration parameter (e.g., via system information, e.g., broadcast system information, e.g., SIB1, e.g., a Downlink ConfigCommonSIB IE). In an example, a fourth parameter of the system information may indicate the offset. The RNTI associated with the PEI DCI may be P-RNTI or an RNTI specific for paging early indication such as a PEI RNTI.

In an example, the PEI DCI may comprise a plurality of fields, each field in the plurality of fields comprising one or more bits. Each field in the plurality of fields may correspond to a paging group/sub-group. A value of one or more bits of a field, that corresponds to a paging group/subgroup, may indicate whether the paging group/sub-group is being paged in the first paging occasion and/or whether the wireless device that corresponds to a paging group/sub-group should monitor a control channel in the corresponding paging occasion. A first value of the field may indicate the first paging group/sub-group for the first paging occasion (e.g., may indicate that the first paging group/sub-group is being paged in the first paging occasion) and/or that a wireless device associated with the first paging group/sub-group should monitor the control channel in the first paging occasion. The wireless device may monitor (e.g., monitor for a paging RNTI (P-RNTI)) a control channel in the first paging occasion based on the one or more first paging groups, that are indicated by the PEI DCI for the first paging occasion, comprise the first paging group/sub-group that is associated with the wireless device. In response to monitoring the control channel in the first paging occasion, the wireless device may receive a paging DCI comprising scheduling information for a transport block comprising paging information. The wireless device may receive the transport block comprising the paging information based on the scheduling information indicated by the paging DCI.

The paging information received via the transport block, scheduled by the paging DCI, may comprise a paging record associated with the wireless device. The paging record associated with the wireless device may comprise a wireless device identity (e.g., an I-RNTI or a 5G-S-TMSI UE ID). In response to the reception of the paging information and in response to the paging information comprising a paging record, for the wireless device, that comprises the wireless device identity, the wireless device may perform a state transition (e.g., may transition to an RRC Connected state, may transition to an RRC idle state, etc.).

In an example, the wireless device may receive a second PEI DCI associated with a second paging occasion. The second PEI DCI may indicate one or more second paging groups/sub-groups for the second paging occasion. The wireless device may not monitor the second paging occasion in response to the one or more second paging groups/sub-groups, indicated by the second DCI, not comprising the paging group/sub-group associated with the wireless device.

In accordance with various exemplary embodiments in the present disclosure, a device (e.g., a wireless device, a base station and/or alike) may include one or more processors and may include memory that may store instructions. The instructions, when executed by the one or more processors, cause the device to perform actions as illustrated in the accompanying drawings and described in the specification. The order of events or actions, as shown in a flow chart of this disclosure, may occur and/or may be performed in any logically coherent order. In some examples, at least two of the events or actions shown may occur or may be performed at least in part simultaneously and/or in parallel. In some examples, one or more additional events or actions may occur or may be performed prior to, after, or in between the events or actions shown in the flow charts of the present disclosure.

Figure 32:
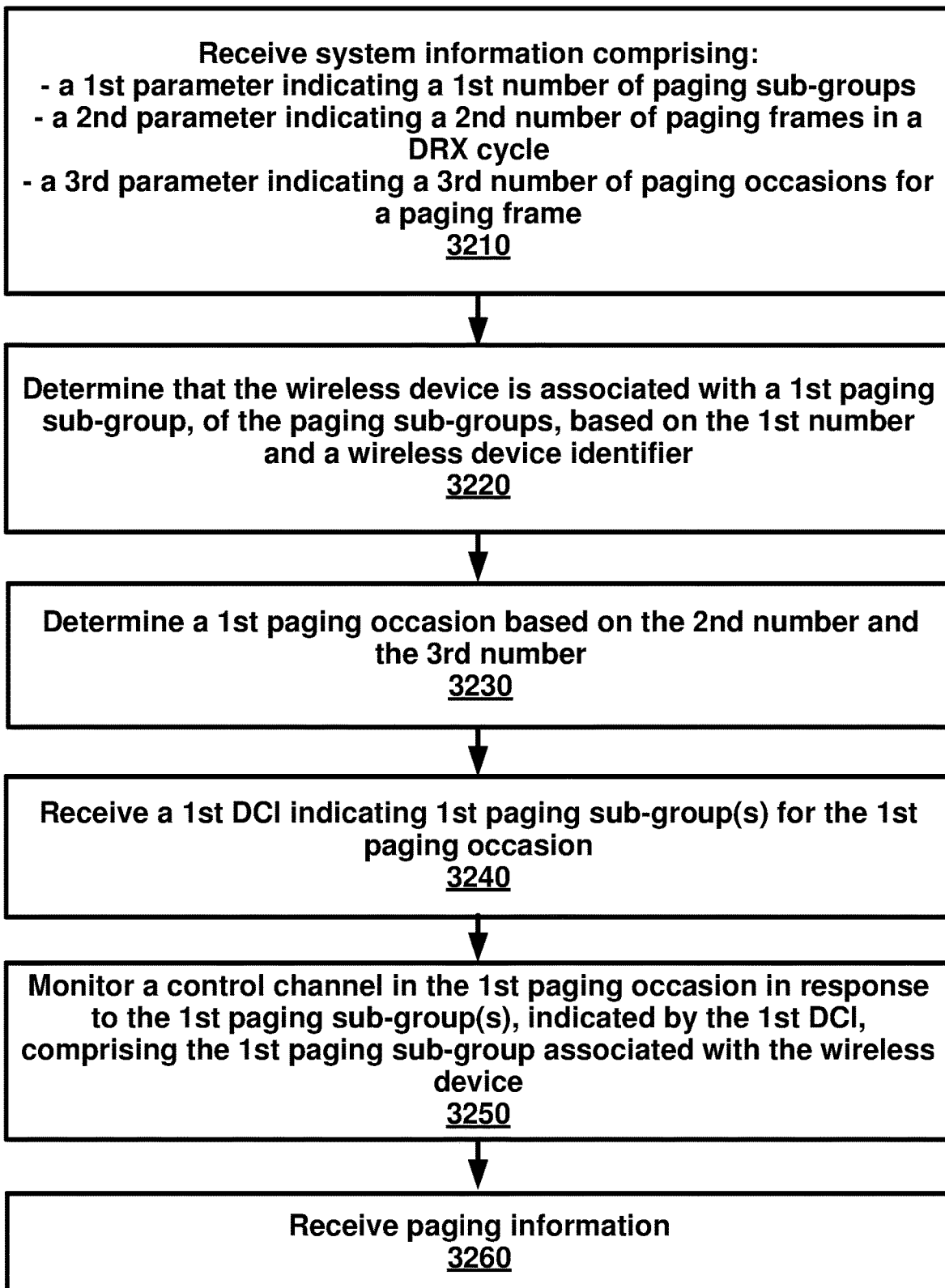
FIG. 32 shows an example flow diagram in accordance with several of various embodiments of the present disclosure.

FIG. 32 shows an example flow diagram in accordance with several of various embodiments of the present disclosure. At 3210, a wireless device may receive system information comprising: a first parameter indicating a first number of paging sub-groups; a second parameter indicating a second number of paging frames in a discontinuous reception (DRX) cycle; and a third parameter indicating a third number of paging occasions for a paging frame. At 3220, the wireless device may determine that the wireless device is associated with a first paging sub-group, of the paging sub-groups, based on the first number and a wireless device identifier. At 3230, the wireless device may determine a first paging occasion based on the second number and the third number. At 3240, the wireless device may receive a first downlink control information (DCI) indicating one or more first paging sub-groups for the first paging occasion. At 3250, the wireless device may monitor a control channel in the first paging occasion in response to the one or more first paging sub-groups, indicated by the first DCI, comprising the first paging sub-group associated with the wireless device. At 3260, the wireless device may receive paging information.

In an example embodiment, the wireless device identifier may be provided by a core network.

In an example embodiment, the receiving the system information, in 3210, may be via a broadcast message. In an example embodiment, the broadcast message may be a system information block 1 (SIB1) message.

an example embodiment, the determining the first paging occasion, in 3230, may further be based on the wireless device identifier. In an example embodiment, the determining the first paging occasion, in 3230, may further be based on a paging frame offset and the DRX cycle. In an example embodiment, the second parameter may further indicate the paging frame offset.

In an example embodiment, the determining, in 3220, that the wireless device is associated with the first paging sub-group may further be based on the second number and the third number.

In an example embodiment, the receiving the first DCI, in 3240, may be in a first timing. The first timing may be prior to a second timing of the first paging occasion.

In an example embodiment, the first DCI, received at 3240, may comprise a field with a value indicating the first paging sub-group in the first paging occasion.

In an example embodiment, the wireless device may receive, based on monitoring the control channel in 3250, a paging DCI comprising scheduling information of a transport block comprising the paging information received at 3260. In an example embodiment, the paging information, received at 3260, may comprise a paging record associated with the wireless device. In an example embodiment, the paging record may comprise a wireless device identity. In an example, the wireless device may perform a radio resource control (RRC) state transition in response to receiving the paging information at 3260.

In an example embodiment, the wireless device may receive a second DCI indicating one or more second paging sub-groups in a second paging occasion. The wireless device may not monitor the control channel in the second paging occasion in response to the one or more second paging subgroups, indicated by the second DCI, not comprising the first paging sub-group associated with the wireless device.

In an example embodiment, the first DCI, received at 3240, may be a paging early indication DCI. In an example embodiment, the wireless device may determine a timing of the paging early indication DCI based on a paging early indication offset. In an example embodiment, the system information, received at 3210, may comprise a fourth parameter indicating the paging early indication offset.

In an example embodiment, the wireless device may be in a radio resource control (RRC) idle state or an RRC inactive state.

In an example embodiment, the receiving the first DCI, in 3240, may be based on a search space associated with paging early indication.

FIG. 33 shows an example flow diagram in accordance with several of various embodiments of the present disclosure. At 3310, a wireless device may receive system information comprising a first parameter indicating a first number of paging sub-groups. At 3320, the wireless device may determine that the wireless device is associated with a first paging sub-group, of the paging sub-groups, based on the first number and a wireless device identifier. At 3330, the wireless device may receive a first downlink control information (DCI) indicating one or more first paging sub-groups in a first paging occasion. At 3340, the wireless device may monitor a control channel in the first paging occasion in response to the one or more first paging sub-groups, indicated by the first DCI, comprising the first paging sub-group associated with the wireless device. At 3350, the wireless device may receive paging information.

Figure 34:
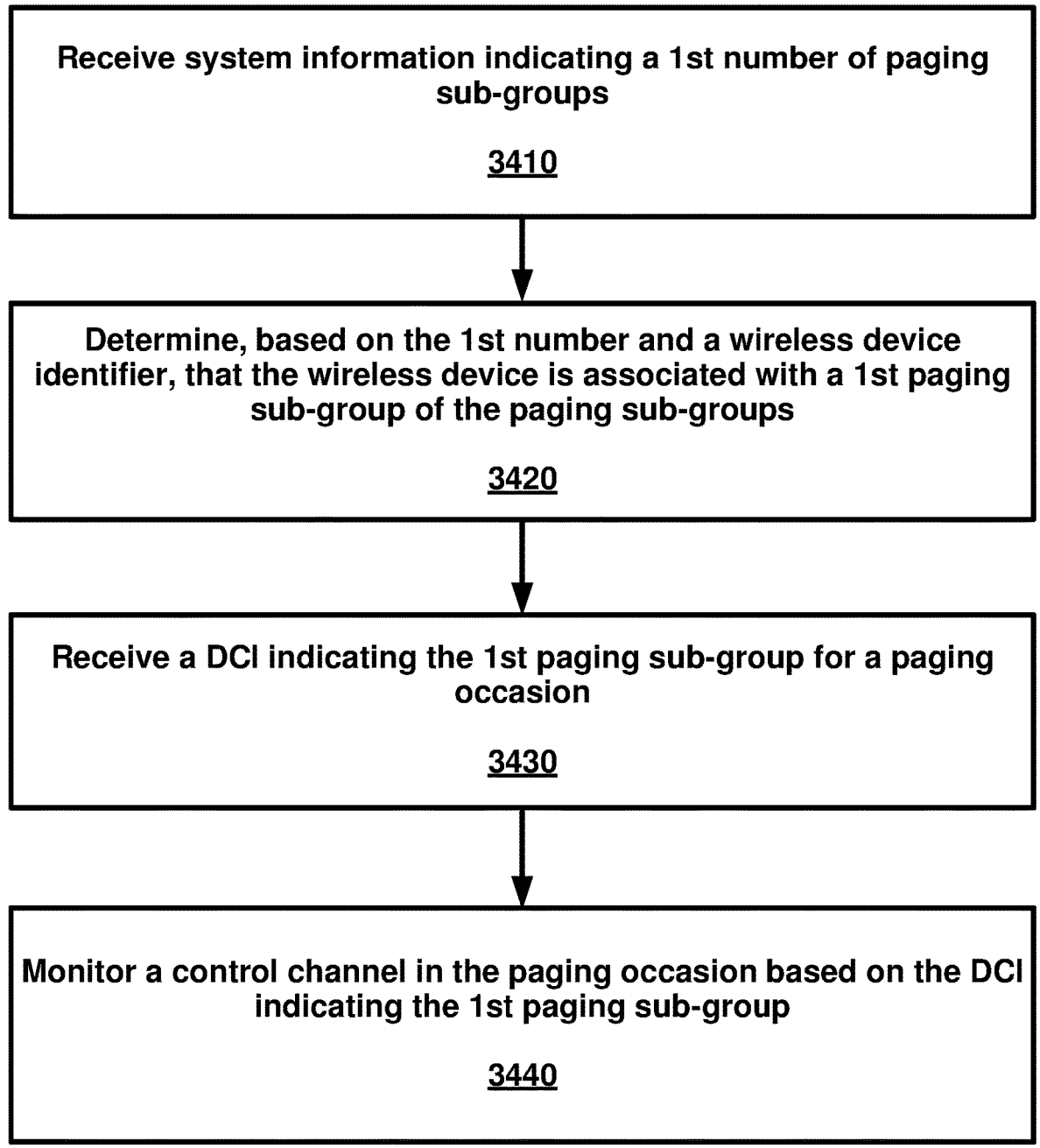
FIG. 34 shows an example flow diagram in accordance with several of various embodiments of the present disclosure.

FIG. 34 shows an example flow diagram in accordance with several of various embodiments of the present disclosure. At 3410, a wireless device may receive system information indicating a first number of paging sub-groups. At 3420, the wireless device may determine, based on the first number and a wireless device identifier, that the wireless device is associated with a first paging sub-group of the paging sub-groups. At 3430, the wireless device may receive a downlink control information (DCI) indicating the first paging sub-group for a paging occasion. At 3440, the wireless device may monitor a control channel in the paging occasion based on the DCI indicating the first paging sub-group.

In an example embodiment, the wireless device may receive paging information.

Figure 35:
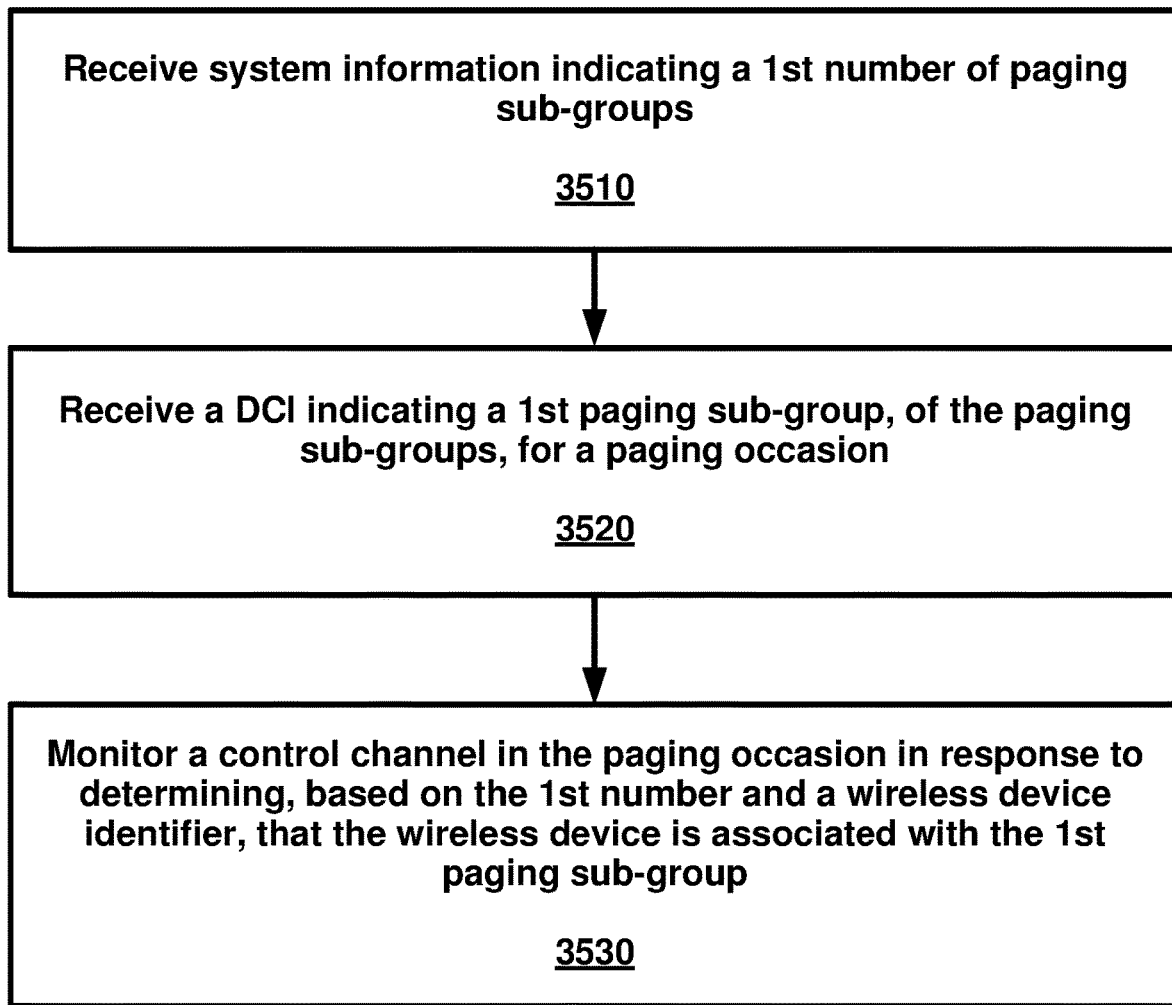
FIG. 35 shows an example flow diagram in accordance with several of various embodiments of the present disclosure.

FIG. 35 shows an example flow diagram in accordance with several of various embodiments of the present disclosure. At 3510, a wireless device may receive system information indicating a first number of paging sub-groups. At 3520, the wireless device may receive a downlink control information (DCI) indicating a first paging sub-group, of the paging sub-groups, for a paging occasion. At 3530, the wireless device may monitor a control channel in the paging occasion in response to determining, based on the first number and a wireless device identifier, that the wireless device is associated with the first paging sub-group.

In an example embodiment, the wireless device may receive paging information.

FIG. 36 shows an example flow diagram in accordance with several of various embodiments of the present disclosure. At 3610, a wireless device may receive, in a paging early indication monitoring occasion associated with a paging occasion, a downlink control information comprising a plurality of fields associated with a plurality of paging sub-groups. A first field in the plurality of fields may be associated with a first paging sub-group in the plurality of paging sub-groups. The first field may comprise one or more bits. The wireless device may be associated with the first paging sub-group. At 3620, the wireless device may monitor a control channel in the paging occasion based on a value of the one or more bits indicating the first paging sub-group in the paging occasion.

In an example embodiment, the wireless device may determine that the wireless device is associated with the first paging sub-group. In an example embodiment, the wireless device may receive system information indicating a first number of the plurality of paging subgroups. The determining may be based on the first number and a wireless device identifier.

Various exemplary embodiments of the disclosed technology are presented as example implementations and/or practices of the disclosed technology. The exemplary embodiments disclosed herein are not intended to limit the scope. Persons of ordinary skill in the art will appreciate that various changes can be made to the disclosed embodiments without departure from the scope. After studying the exemplary embodiments of the disclosed technology, alternative aspects, features and/or embodiments will become apparent to one of ordinary skill in the art. Without departing from the scope, various elements or features from the exemplary embodiments may be combined to create additional embodiments. The exemplary embodiments are described with reference to the drawings. The figures and the flowcharts that demonstrate the benefits and/or functions of various aspects of the disclosed technology are presented for illustration purposes only. The disclosed technology can be flexibly configured and/or reconfigured such that one or more elements of the disclosed embodiments may be employed in alternative ways. For example, an element may be optionally used in some embodiments or the order of actions listed in a flowchart may be changed without departure from the scope.

An example embodiment of the disclosed technology may be configured to be performed when deemed necessary, for example, based on one or more conditions in a wireless device, a base station, a radio and/or core network configuration, a combination thereof and/or alike. For example, an example embodiment may be performed when the one or more conditions are met. Example one or more conditions may be one or more configurations of the wireless device and/or base station, traffic load and/or type, service type, battery power, a combination of thereof and/or alike. In some scenarios and based on the one or more conditions, one or more features of an example embodiment may be implemented selectively.

In this disclosure, the articles "a" and "an" used before a group of one or more words are to be understood as "at least one" or "one or more" of what the group of the one or more words indicate. The use of the term "may" before a phrase is to be understood as indicating that the phrase is an example of one of a plurality of useful alternatives that may be employed in an embodiment in this disclosure.

In this disclosure, an element may be described using the terms "comprises", "includes" or "consists of" in combination with a list of one or more components. Using the terms "comprises" or "includes" indicates that the one or more components are not an exhaustive list for the description of the element and do not exclude components other than the one or more components. Using the term "consists of" indicates that the one or more components is a complete list for description of the element. In this disclosure, the term "based on" is intended to mean "based at least in part on". The term "based on" is not intended to mean "based only on". In this disclosure, the term "and/or" used in a list of elements indicates any possible combination of the listed elements. For example, "X, Y, and/or Z" indicates X; Y; Z; X and Y; X and Z; Y and Z; or X, Y, and Z.

Some elements in this disclosure may be described by using the term "may" in combination with a plurality of features. For brevity and ease of description, this disclosure may not include all possible permutations of the plurality of features. By using the term "may" in combination with the plurality of features, it is to be understood that all permutations of the plurality of features are being disclosed. For example, by using the term "may" for description of an element with four possible features, the element is being described for all fifteen permutations of the four possible features. The fifteen permutations include one permutation with all four possible features, four permutations with any three features of the four possible features, six permutations with any two features of the four possible features and four permutations with any one feature of the four possible features.

Although mathematically a set may be an empty set, the term set used in this disclosure is a nonempty set. Set B is a subset of set A if every element of set B is in set A. Although mathematically a set has an empty subset, a subset of a set is to be interpreted as a non-empty subset in this disclosure. For example, for set A={subcarrier1, subcarrier2}, the subsets are {subcarrier1}, {subcarrier2} and {subcarrier1, subcarrier2}.

In this disclosure, the phrase "based on" may be used equally with "based at least on" and what follows "based on" or "based at least on" indicates an example of one of plurality of useful alternatives that may be used in an embodiment in this disclosure. The phrase "in response to" may be used equally with "in response at least to" and what follows "in response to" or "in response at least to" indicates an example of one of plurality of useful alternatives that may be used in an embodiment in this disclosure. The phrase "depending on" may be used equally with "depending at least on" and what follows "depending on" or "depending at least on" indicates an example of one of plurality of useful alternatives that may be used in an embodiment in this disclosure. The phrases "employing" and "using" and "employing at least" and "using at least" may be used equally in this in this disclosure and what follows "employing" or "using" or "employing at least" or "using at least" indicates an example of one of plurality of useful alternatives that may be used in an embodiment in this disclosure.

The example embodiments disclosed in this disclosure may be implemented using a modular architecture comprising a plurality of modules. A module may be defined in terms of one or more functions and may be connected to one or more other elements and/or modules. A module may be implemented in hardware, software, firmware, one or more biological elements (e.g., an organic computing device and/or a neurocomputer) and/or a combination thereof and/or alike. Example implementations of a module may be as software code configured to be executed by hardware and/or a modeling and simulation program that may be coupled with hardware. In an example, a module may be implemented using general-purpose or special-purpose processors, digital signal processors (DSPs), microprocessors, microcontrollers, application-specific integrated circuits (ASICs), programmable logic devices (PLDs) and/or alike. The hardware may be programmed using machine language, assembly language, high-level language (e.g., Python, FORTRAN, C, C++ or the like) and/or alike. In an example, the function of a module may be achieved by using a combination of the mentioned implementation methods.

What is claimed is:

1. A method comprising:
   receiving, by a wireless device, system information comprising:
     a first parameter indicating a first number of paging sub-groups;
     a second parameter indicating a second number of paging frames in a discontinuous reception (DRX) cycle; and
     a third parameter indicating a third number of paging occasions for a paging frame; and
     a fourth parameter indicating a time offset that is associated with a paging early indication (PEI) occasion;
   determining that the wireless device is associated with a first paging sub-group, of the paging sub-groups, based on the first number and a wireless device identifier;
   determining a first paging occasion based on the second number and the third number;
   determining a time location of the PEI occasion based on the time offset;
   receiving, based on monitoring a control channel in the PEI occasion, a first downlink control information (DCI) indicating one or more first paging sub-groups for the first paging occasion;
   monitoring a control channel in the first paging occasion in response to the one or more first paging sub-groups, indicated by the first DCI, comprising the first paging sub-group associated with the wireless device; and
   receiving paging information.

2. The method of claim 1, wherein the wireless device identifier is provided by a core network.

3. The method of claim 1, wherein the receiving the system information is via a broadcast message.

4. The method of claim 3, wherein the broadcast message is a system information block 1 (SIB1) message.

5. The method of claim 1, the determining the first paging occasion is further based on the wireless device identifier.

6. The method of claim 5, wherein the determining the first paging occasion is further based on a paging frame offset and the DRX cycle.

7. The method of claim 6, wherein the second parameter further indicates the paging frame offset.

8. The method of claim 1, wherein the determining that the wireless device is associated with the first paging sub-group is further based on the second number and the third number.

9. The method of claim 1, wherein:
   the receiving the first DCI is in a first timing; and
   the first timing is prior to a second timing of the first paging occasion.

10. The method of claim 1, wherein the first DCI comprises a field with a value indicating the first paging sub-group in the first paging occasion.

11. The method of claim 1, further comprising receiving, based on monitoring the control channel, a paging DCI comprising scheduling information of a transport block comprising the paging information.

12. The method of claim 11, wherein the paging information comprises a paging record associated with the wireless device.

13. The method of claim 11, wherein the paging record comprises a wireless device identity.

14. The method of claim 13, further comprising performing a radio resource control (RRC) state transition in response to receiving the paging information.

15. The method of claim 1, further comprising:
   receiving a second DCI indicating one or more second paging sub-groups in a second paging occasion; and
   not monitoring the control channel in the second paging occasion in response to the one or more second paging subgroups, indicated by the second DCI, not comprising the first paging sub-group associated with the wireless device.

16. The method of claim 1, wherein the first DCI is a paging early indication DCI.

17. The method of claim 16, wherein a radio network temporary identifier (RNTI), associated with the first DCI, is associated with paging early indication.

18. The method of claim 1, wherein the monitoring the control channel in the first paging occasion is for a paging RNTI.

19. The method of claim 1, wherein the wireless device is in a radio resource control (RRC) idle state or an RRC inactive state.

20. The method of claim 1, wherein the receiving the first DCI is based on a search space associated with paging early indication.

21. A wireless device comprising:
   one or more processors; and
   memory storing instructions that, when executed by the one or more processors, cause the wireless device to:
     receive system information comprising:
       a first parameter indicating a first number of paging sub-groups;
       a second parameter indicating a second number of paging frames in a discontinuous reception (DRX) cycle;
       a third parameter indicating a third number of paging occasions for a paging frame; and
       a fourth parameter indicating a time offset that is associated with a paging early indication (PEI) occasion;

determine that the wireless device is associated with a first paging sub-group, of the paging sub-groups, based on the first number and a wireless device identifier;

determine a first paging occasion based on the second number and the third number; de ermine a time location of the PEI occasion based on the time offset;

receive, based on monitoring a control channel in the PEI occasion, a first downlink control information (DCI) indicating one or more first paging sub-groups for the first paging occasion;

monitor a control channel in the first paging occasion in response to the one or more first paging sub-groups, indicated by the first DCI, comprising the first paging sub-group associated with the wireless device; and receive paging information.

22. The wireless device of claim 21, wherein the wireless device identifier is provided by a core network.

23. The wireless device of claim 21, wherein receiving the system information is via a broadcast message.

24. The wireless device of claim 23, wherein the broadcast message is a system information block 1 (SIB1) message.

25. The wireless device of claim 21, wherein determining that the wireless device is associated with the first paging sub-group is further based on the second number and the third number.

26. The wireless device of claim 21, wherein:

receiving the first DCI is in a first timing; and the first timing is prior to a second timing of the first paging occasion.

27. The wireless device of claim 21, wherein the first DCI comprises a field with a value indicating the first paging sub-group in the first paging occasion.

28. The wireless device of claim 21, wherein receiving the first DCI is based on a search space associated with paging early indication.

29. A system comprising:

a base station; and a wireless device comprising: one or more processors; and memory storing instructions that, when executed by the one or more processors, cause the wireless device to: receive, from the base station, system information comprising: a first parameter indicating a first number of paging sub-groups; a second parameter indicating a second number of paging frames in a discontinuous reception (DRX) cycle; a third parameter indicating a third number of paging occasions for a paging frame; and a fourth parameter indicating a time offset that is associated with a paging early indication (PEI) occasion; determine that the wireless device is associated with a first paging sub-group, of the paging sub-groups, based on the first number and a wireless device identifier; determine a first paging occasion based on the second number and the third number; determine a time location of the PEI occasion based on the time offset; receive, based on monitoring a control channel in the PEI occasion, a first downlink control information (DCI) indicating one or more first paging sub-groups for the first paging occasion; monitor a control channel in the first paging occasion in response to the one or more first paging sub-groups, indicated by the first DCI, comprising the first paging sub-group associated with the wireless device; and receive paging information.

* * * * *